(12) United States Patent
Gallagher et al.

(10) Patent No.: US 8,064,907 B2
(45) Date of Patent: Nov. 22, 2011

(54) METHOD AND APPARATUS FOR NETWORK CONTROLLER SELECTION IN A VOICE OVER LONG TERM EVOLUTION VIA GENERIC ACCESS SYSTEM

(75) Inventors: Michael D. Gallagher, San Jose, CA (US); Patrick Tao, San Jose, CA (US); Subhash Kodnad, Fremont, CA (US); Sasidhar Padmanabhuni, Sunnyvale, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 340 days.

(21) Appl. No.: 12/431,747

(22) Filed: Apr. 28, 2009

(65) Prior Publication Data

US 2009/0270099 A1 Oct. 29, 2009

Related U.S. Application Data

(60) Provisional application No. 61/048,943, filed on Apr. 29, 2008, provisional application No. 61/104,690, filed on Oct. 10, 2008, provisional application No. 61/152,965, filed on Feb. 16, 2009, provisional application No. 61/153,052, filed on Feb. 17, 2009, provisional application No. 61/160,278, filed on Mar. 13, 2009, provisional application No. 61/171,738, filed on Apr. 22, 2009.

(51) Int. Cl.
*H04W 4/00* (2009.01)
(52) U.S. Cl. ................................. 455/435.1; 370/352
(58) Field of Classification Search ............... 455/435.1; 370/352
See application file for complete search history.

(56) References Cited

U.S. PATENT DOCUMENTS

| 6,549,775 | B2 * | 4/2003 | Ushiki et al. ............... 455/432.1 |
| 7,260,396 | B2 * | 8/2007 | Balachandran et al. .... 455/435.1 |
| 2006/0099935 | A1 | 5/2006 | Gallagher et al. |
| 2007/0184860 | A1 * | 8/2007 | Jansson ........................ 455/466 |
| 2007/0287459 | A1 * | 12/2007 | Diachina et al. ............. 455/436 |
| 2008/0037515 | A1 * | 2/2008 | Sander ......................... 370/352 |

FOREIGN PATENT DOCUMENTS

| WO | WO 2008/006774 | 1/2008 |
| WO | PCT/US2009/42186 | 4/2009 |

OTHER PUBLICATIONS

U.S. Appl. No. 12/431,742, filed Apr. 28, 2009, Gallagher, Michael D., et al.

(Continued)

*Primary Examiner* — Nick Corsaro
*Assistant Examiner* — Sowmini Nair
(74) *Attorney, Agent, or Firm* — Adeli & Tollen LLP

(57) ABSTRACT

Some embodiments provide a method of associating Mobile Management Entities (MMEs) of an evolved packet system (EPS) and Voice over long term evolution (LTE) via Generic Access (VoLGA) network controllers (VANCs). The method includes at a serving VANC, receiving a registration message from a user equipment (UE). The registration message includes an assigned Globally Unique Temporary Identity (GUTI) of the UE and the serving VANC is provisioned with MME-to-VANC mapping information. The method extracts an identification of a MME from the GUTI and determines an associated VANC based on the provisioned MME-to-VANC mapping information. The method then sends a message from the serving VANC to the associated VANC, the message indicating that the serving VANC is now serving the UE.

26 Claims, 35 Drawing Sheets

OTHER PUBLICATIONS

U.S. Appl. No. 12/431,744, filed Apr. 28, 2009, Gallagher, Michael D., et al.
U.S. Appl. No. 12/431,749, filed Apr. 28, 2009, Gallagher, Michael D., et al.
U.S. Appl. No. 12/431,748, filed Apr. 28, 2009, Gallagher, Michael D., et al.
International Search Report and Written Opinion of PCT/US2009/42186, Jun. 22, 2009 (mailing date), Kineto Wireless, Inc.

* cited by examiner

METHOD AND APPARATUS FOR NETWORK CONTROLLER SELECTION IN A VOICE OVER LONG TERM EVOLUTION VIA GENERIC ACCESS SYSTEM

CLAIM OF BENEFIT TO RELATED APPLICATIONS

This application claims the benefit of U.S. Provisional Application 61/048,943, entitled "Circuit Switched (CS) Domain Services Over the Evolved Packet System (EPS) Using Generic Access", filed Apr. 29, 2008; U.S. Provisional Application 61/104,690, entitled "Circuit Switched (CS) Domain Services Over the Evolved Packet System (EPS) Using Generic Access", filed Oct. 10, 2008; U.S. Provisional Application 61/152,965, entitled "Voice Over LTE Via Generic Access; Stage 2 Specification; Phase 1", filed Feb. 16, 2009; U.S. Provisional Application 61/153,052, entitled "Voice Over LTE Via Generic Access; Stage 2 Specification; Phase 1", filed Feb. 17, 2009; U.S. Provisional Application 61/160,278, entitled "TLS-Based Security for Voice over LTE via Generic Access (VoLGA)", filed Mar. 13, 2009; and U.S. Provisional Application 61/171,738, entitled "Macro Cell Re-mapping at Call setup for Voice over LTE via Generic Access (VoLGA)", filed Apr. 22, 2009. The contents of the above mentioned provisional applications, namely Application 61/048,943, Application 61/104,690, Application 61/152,965, Application 61/153,052, Application 61/160,278, and Application 61/171,738 are hereby incorporated by reference.

FIELD OF THE INVENTION

The invention relates to telecommunication. More particularly, this invention relates to a method of supporting voice over LTE using generic access network technology.

BACKGROUND OF THE INVENTION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Increasing demand for high data speeds and lower packet latency has required the mobile service operators to upgrade the existing Universal Mobile Telecommunication System (UMTS) cellular technology. Long Term Evolution (LTE) is one such upgrade which provides improved spectral efficiency, lower costs, and improved service.

The decision was made in the third generation partnership (3GPP) standards to not continue to define and support circuit switched (CS) services in LTE (i.e., to not support the use of the existing CS call control protocol and procedures for voice calls). Instead, the expectation was that operators would transition to the use of IP Multimedia Subsystem (IMS)-based voice service in tandem with their addition of LTE (i.e., "4G") air interface and network technology.

In order to make the best use of the existing resources, access from the legacy core network infrastructure and services should be possible to provide CS services (e.g., voice and short message service "SMS"). This will allow avoiding a major switch in the voice call control paradigm as well as retaining the currently provided functionalities. Therefore, there is a need in the art to reuse parts of an existing technology, such as Generic Access Network (GAN), to provide CS services over the LTE networks.

SUMMARY OF THE INVENTION

This specification discloses service description for "Voice" over long term evolution (LTE) via Generic Access (VoLGA). VoLGA supports two modes of operation: VoLGA A-mode and VoLGA Iu-mode. VoLGA A-mode supports an extension of GSM CS services that is achieved by tunneling Non Access Stratum (NAS) protocols between the UE and the Core Network over evolved packet system (EPS) bearers and the A interface to the MSC. VoLGA Iu-mode supports an extension of UMTS CS services that is achieved by tunneling Non Access Stratum (NAS) protocols between the UE and the Core Network over EPS bearers and the Iu-cs interface to the MSC.

In some embodiments, the architecture is comprised of a user equipment (UE), an access point (often an evolved UMTS terrestrial radio access network (E-UTRAN) cell) coupled to the UE, a mobility management entity (MME) coupled to the access point, a gateway entity coupled to the MME and the access point, a network controller capable of accessing VoLGA services (often a VoLGA Access Network Controller, or VANC) coupled to the MME and gateway entity, a policy and charging rules function (PCRF) coupled to the network controller and the gateway entity, and a Circuit Switched (CS) domain core network (CN) coupled to the network controller. In some embodiments several UEs are coupled to the access point. In some embodiments there are several access points coupled to the MME.

Some embodiments define a control plane architecture protocol stack. In some embodiments, there is a first set of protocol layers used with Internet Protocol (IP) for dividing data for transmission and reassembling data once it is received. A second set of protocol layers manages resources between the UE and the network controller. Some embodiments disclose a third set of protocol layers for establishing a secure communication path between the UE and the network controller.

Some embodiments define a user plane architecture protocol stack. In some embodiments, there is a first set of protocol layers used with Internet Protocol (IP) for dividing data for transmission and reassembling data once it is received. A second set of layers manages the transmission of multimedia data. Finally, some embodiments show a third set of protocol layers for sending and receiving user data.

Some embodiments of the present invention provide a method for UE registration for VoLGA services. The method sends a register request message from the UE to the VANC to register the UE with the VANC. The register request message includes location information that identifies an EPS cell upon which the UE has camped. The method receives a register response message at the UE from the VANC. The register response message indicates whether the UE is permitted to access services of the VANC.

Some embodiments disclose a UE architecture for the VoLGA control plane. In some embodiments, the architecture includes an access mode switch that allows switching between E-UTRAN RRC, UTRAN RRC, and Generic Access (GA) Layer 3 protocols. Some embodiments disclose a UE architecture for the VoLGA user plane. In some embodiments the architecture includes an access mode switch to switch between UTRAN RLC/MAC and RTP modes.

Some embodiments provide a communication system that includes (1) an evolved packet system (EPS) that includes an evolved packet core (EPC) and several evolved Universal Mobile Telecommunication System (UMTS) Terrestrial Radio Access Network (E-UTRANs) for communicatively coupling a user equipment (UE) to the EPC, where the EPC is not capable of providing circuit switched (CS) services for the UE and (2) a Voice over long term evolution (LTE) via Generic Access (VoLGA) network controller (VANC) communicatively coupling the UE through the EPS to a legacy circuit switched (CS) core network, where the legacy CS core network is capable of providing CS services to the UE.

Some embodiments provide a user equipment (UE) for providing circuit switched (CS) services in an evolved packet system (EPS). The UE includes (1) several EPS protocol layers for communicatively coupling the UE with an evolved packet core (EPC) of the EPS through an evolved Universal Mobile Telecommunication System (UMTS) Terrestrial Radio Access Network (E-UTRAN), (2) several generic access (GA) protocol layers over said EPS protocol layers, (3) several UTRAN protocol layers communicatively coupling the GA protocol layers and the EPS protocol layers through a plurality of interfaces, (4) and an access mode switch for switching several circuit switched (CS) protocol layers between the GA protocol layers and the UTRAN protocol layers.

Some embodiments provide a method of macro cell remapping at a Voice over LTE via Generic Access (VoLGA) access network controller (VANC). The method receives a service request message from a user equipment (UE). The service request message includes macro cell information that includes an identity of a current camping cell; and mapping the macro cell information provided by the UE into a corresponding service area identifier (SAI).

Some embodiments provide a method for updating registration information of a user equipment (UE) in a communication system that includes several evolved Universal Mobile Telecommunication System (UMTS) Terrestrial Radio Access Network (E-UTRANs) that communicatively couple the UE to a Voice over long term evolution (LTE) via Generic Access (VoLGA) network controller (VANC). The method receives a message at the UE from the VANC. The message includes a list of E-UTRAN tracking areas (TAs) served by the VANC, each tracking area identified by a tracking area identifier (TAI). The method stores the list of E-UTRAN tracking areas at the UE. The method sends a register update message that includes a TAI of a particular E-UTRAN tracking area from the UE to the VANC when the UE moves into the particular E-UTRAN tracking area and the particular E-UTRAN TAI is not in the list of E-UTRAN tracking areas (TAs) served by the VANC.

Some embodiments provide a computer readable medium of a Voice over long term evolution (LTE) via Generic Access (VoLGA) network controller (VANC) in a communication system that includes several evolved Universal Mobile Telecommunication System (UMTS) Terrestrial Radio Access Network (E-UTRANs) that are communicatively couple a User Equipment (UE) to the VANC. The computer readable storage medium stores a computer program. The computer program is executable by at least one processor. The computer program includes a set of instructions for sending a message to the UE from the VANC. The message includes a list of E-UTRAN tracking areas (TAs) served by the VANC, each tracking area identified by a tracking area identifier (TAI). The computer program also includes a set of instructions for receiving a register update message that includes a TAI of a particular E-UTRAN tracking area from the UE, when the UE moves into the particular E-UTRAN tracking area and the particular E-UTRAN TAI is not in the list of E-UTRAN tracking areas (TAs) served by the VANC.

Some embodiments describe a handover message routing procedure. Whenever the UE is assigned a new globally unique temporary identity (GUTI) by a serving MME (which may occur, for example, if the serving MME changes), the UE sends a message that includes the GUTI value to a first VANC which is the serving VANC for the UE. The first VANC extracts an MME identity from the GUTI. Using provisioned MME-to-VANC mapping information, the first VANC determines the identity of a second VANC. The first VANC sends a message to the second VANC, indicating that the first VANC is serving the UE. The second VANC stores this information. If the second VANC receives a handover request from a MME for a particular UE, it looks up the serving VANC information associated with the UE and forwards the handover request to the first VANC. In this way, the handover request message is routed to the correct serving VANC regardless of the movement of the UE between MMEs.

Some embodiments provide a computer readable storage medium of a Voice over long term evolution (LTE) via Generic Access (VoLGA) network controller (VANC) that stores a computer program for associating Mobile Management Entities (MMEs) of an evolved packet system (EPS) and VANCs. The computer program is executable by at least one processor. The computer program includes a set of instructions for receiving a registration message from a user equipment (UE). The registration message includes an assigned Globally Unique Temporary Identity (GUTI) of the UE. The VANC is provisioned with MME-to-VANC mapping information. The computer program includes a set of instructions for extracting an identification of a MME from the GUTI. The computer program includes a set of instructions for determining an associated VANC based on the provisioned MME-to-VANC mapping information. The computer program includes a set of instructions for sending a message from the VANC to the associated VANC, the message indicating that the VANC is now serving the UE.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
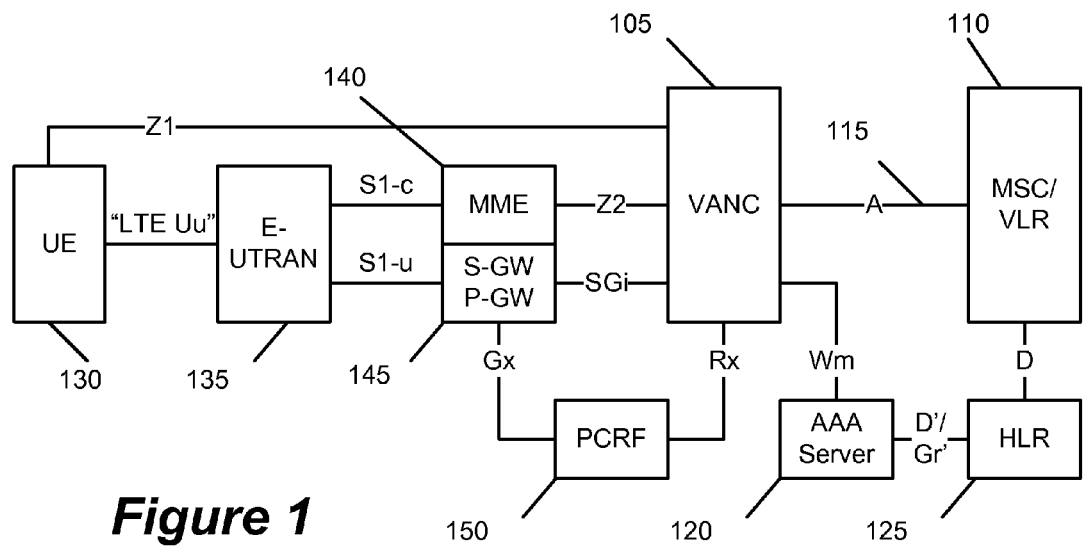
FIG. 1 illustrates a non-roaming architecture for VoLGA using A-Mode interface in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Throughout the following description, acronyms commonly used in the telecommunications industry for wireless services are utilized along with acronyms specific to the present invention. A table of acronyms and abbreviations used in this application is included in Section IX.

This specification discloses service description for "Voice" over long term evolution (LTE) via Generic Access (VoLGA). VoLGA supports two modes of operation: VoLGA A-mode and VoLGA Iu-mode. VoLGA A-mode supports an extension of GSM CS services that is achieved by tunneling Non Access Stratum (NAS) protocols between the UE and the Core Network over evolved packet system (EPS) bearers and the A interface to the MSC. VoLGA Iu-mode supports an extension of UMTS CS services that is achieved by tunneling Non Access Stratum (NAS) protocols between the UE and the Core Network over EPS bearers and the Iu-cs interface to the MSC.

In some embodiments, the architecture is comprised of a user equipment (UE), an access point (often an evolved UMTS terrestrial radio access network (E-UTRAN) cell) coupled to the UE, a mobility management entity (MME) coupled to the access point, a gateway entity coupled to the MME and the access point, a network controller capable of accessing VoLGA services (often a VoLGA Access Network Controller, or VANC) coupled to the MME and gateway entity, a policy and charging rules function (PCRF) coupled to the network controller and the gateway entity, and a Circuit Switched (CS) domain core network (CN) coupled to the network controller. In some embodiments several UEs are coupled to the access point. In some embodiments there are several access points coupled to the MME.

Some embodiments define a control plane architecture protocol stack. In some embodiments, there is a first set of protocol layers used with Internet Protocol (IP) for dividing data for transmission and reassembling data once it is received. A second set of protocol layers manages resources between the UE and the network controller. Some embodiments disclose a third set of protocol layers for establishing a secure communication path between the UE and the network controller.

Some embodiments define a user plane architecture protocol stack. In some embodiments, there is a first set of protocol layers used with Internet Protocol (IP) for dividing data for transmission and reassembling data once it is received. A second set of layers manages the transmission of multimedia data. Finally, some embodiments show a third set of protocol layers for sending and receiving user data.

Some embodiments of the present invention provide a method for UE registration for VoLGA services. The method sends a register request message from the UE to the VANC to register the UE with the VANC. The register request message includes location information that identifies an EPS cell upon which the UE has camped. The method receives a register response message at the UE from the VANC. The register response message indicates whether the UE is permitted to access services of the VANC.

Some embodiments disclose a UE architecture for the VoLGA control plane. In some embodiments, the architecture includes an access mode switch that allows switching between E-UTRAN RRC, UTRAN RRC, and Generic Access (GA) Layer 3 protocols. Some embodiments disclose a UE architecture for the VoLGA user plane. In some embodiments the architecture includes an access mode switch to switch between UTRAN RLC/MAC and RTP modes.

Some embodiments provide a communication system that includes (1) an evolved packet system (EPS) that includes an evolved packet core (EPC) and several evolved Universal Mobile Telecommunication System (UMTS) Terrestrial Radio Access Network (E-UTRANs) for communicatively coupling a user equipment (UE) to the EPC, where the EPC is not capable of providing circuit switched (CS) services for the UE and (2) a Voice over long term evolution (LTE) via Generic Access (VoLGA) network controller (VANC) communicatively coupling the UE through the EPS to a legacy circuit switched (CS) core network, where the legacy CS core network is capable of providing CS services to the UE.

Some embodiments provide a user equipment (UE) for providing circuit switched (CS) services in an evolved packet system (EPS). The UE includes (1) several EPS protocol layers for communicatively coupling the UE with an evolved packet core (EPC) of the EPS through an evolved Universal Mobile Telecommunication System (UMTS) Terrestrial Radio Access Network (E-UTRAN), (2) several generic access (GA) protocol layers over said EPS protocol layers, (3) several UTRAN protocol layers communicatively coupling the GA protocol layers and the EPS protocol layers through a plurality of interfaces, (4) and an access mode switch for switching several circuit switched (CS) protocol layers between the GA protocol layers and the UTRAN protocol layers.

Some embodiments provide a method of macro cell remapping at a Voice over LTE via Generic Access (VoLGA) access network controller (VANC). The method receives a service request message from a user equipment (UE). The service request message includes macro cell information that includes an identity of a current camping cell; and mapping the macro cell information provided by the UE into a corresponding service area identifier (SAI).

Some embodiments provide a method for updating registration information of a user equipment (UE) in a communication system that includes several evolved Universal Mobile Telecommunication System (UMTS) Terrestrial Radio Access Network (E-UTRANs) that communicatively couple the UE to a Voice over long term evolution (LTE) via Generic Access (VoLGA) network controller (VANC). The method receives a message at the UE from the VANC. The message includes a list of E-UTRAN tracking areas (TAs) served by the VANC, each tracking area identified by a tracking area identifier (TAI). The method stores the list of E-UTRAN tracking areas at the UE. The method sends a register update message that includes a TAI of a particular E-UTRAN tracking area from the UE to the VANC when the UE moves into the particular E-UTRAN tracking area and the particular E-UTRAN TAI is not in the list of E-UTRAN tracking areas (TAs) served by the VANC.

Some embodiments provide a computer readable medium of a Voice over long term evolution (LTE) via Generic Access (VoLGA) network controller (VANC) in a communication system that includes several evolved Universal Mobile Telecommunication System (UMTS) Terrestrial Radio Access Network (E-UTRANs) that are communicatively couple a User Equipment (UE) to the VANC. The computer readable storage medium stores a computer program. The computer program is executable by at least one processor. The computer program includes a set of instructions for sending a message to the UE from the VANC. The message includes a list of E-UTRAN tracking areas (TAs) served by the VANC, each tracking area identified by a tracking area identifier (TAI). The computer program also includes a set of instructions for receiving a register update message that includes a TAI of a particular E-UTRAN tracking area from the UE, when the UE moves into the particular E-UTRAN tracking area and the particular E-UTRAN TAI is not in the list of E-UTRAN tracking areas (TAs) served by the VANC.

Some embodiments describe a handover message routing procedure. Whenever the UE is assigned a new globally unique temporary identity (GUTI) by a serving MME (which may occur, for example, if the serving MME changes), the UE sends a message that includes the GUTI value to a first VANC which is the serving VANC for the UE. The first VANC extracts an MME identity from the GUTI. Using provisioned MME-to-VANC mapping information, the first VANC determines the identity of a second VANC. The first VANC sends a message to the second VANC, indicating that the first VANC is serving the UE. The second VANC stores this information. If the second VANC receives a handover request from a MME for a particular UE, it looks up the serving VANC information associated with the UE and forwards the handover request to the first VANC. In this way, the handover request message is routed to the correct serving VANC regardless of the movement of the UE between MMEs.

Some embodiments provide a computer readable storage medium of a Voice over long term evolution (LTE) via Generic Access (VoLGA) network controller (VANC) that stores a computer program for associating Mobile Management Entities (MMEs) of an evolved packet system (EPS) and VANCs. The computer program is executable by at least one processor. The computer program includes a set of instructions for receiving a registration message from a user equipment (UE). The registration message includes an assigned Globally Unique Temporary Identity (GUTI) of the UE. The VANC is provisioned with MME-to-VANC mapping information. The computer program includes a set of instructions for extracting an identification of a MME from the GUTI. The computer program includes a set of instructions for determining an associated VANC based on the provisioned MME-to-VANC mapping information. The computer program includes a set of instructions for sending a message from the VANC to the associated VANC, the message indicating that the VANC is now serving the UE.

Several more detailed embodiments of the invention are described in sections below. Section I provides a discussion of functional entities. The discussion in Section I is followed by a discussion of architecture models and reference points including non-roaming and roaming architectures in Section II. Section III discusses protocol architecture. Next, Section IV discusses the User Equipment including UE architecture and UE state description GA-RC, GA-CSR, and GA-RRC states.

Section V discusses procedures for VoLGA A-mode, including rove-in, rove-out, VoLGA registration update, mobile-originated call, mobile-terminated call, handovers, short message service, legal requirements including emergency services and lawful interception, and location services.

Next, Section VI discusses procedures for VoLGA Iu-Mode, including mobile-originated call, mobile-terminated call, handovers, short message service, legal requirements including emergency services and lawful interception, and location services.

Section VII covers additional information regarding VANC selection by MME and Section VIII discusses a computer system with which some embodiments of the invention are implemented. Finally, a list of definitions and a table of acronyms and abbreviations used in this application is included in Section IX.

I. FUNCTIONAL ENTITIES

The following is a list of the required network elements and their necessary functionality for supporting VoLGA in some embodiments.

A. User Equipment (UE)

In some embodiments, the UE is a standard device operating over the licensed spectrum of a licensed wireless system provider per the procedures specified in the 3GPP Long Term Evolution (LTE) standards (e.g., 3GPP TS 23.401: "GPRS enhancements for E-UTRAN access", incorporated herein by reference and hereinafter, TS 23.401) with the additional functionality described in this application.

B. eNodeB

In some embodiments, the eNodeB (also referred to as eNB or E-UTRAN NodeB) is a standard part of the E-UTRAN, as specified in the 3GPP Long Term Evolution (LTE) standards (e.g., TS 36.300). Throughout this application eNodeB may be represented as an E-UTRAN cell (or sometimes just E-UTRAN) both in text and in the figures.

C. VoLGA Access Network Controller (VANC)

The VANC is a network controller that provides network connectivity of the UE to the existing circuit switched (CS) domain core network (CN). The VANC entity appears as a legacy base station controller (BSC) or radio network controller (RNC) to the existing CN. Specifically, the VANC uses the existing A interface (VoLGA A-mode) or Iu-cs interface (VoLGA Iu-mode) for CN connectivity. In this manner, the VoLGA system may be integrated into the existing CN with no change to the CN. This allows licensed wireless system providers the ability to provide VoLGA system functionality to their users with no change to their existing network.

As noted above, the VANC connects to the MME using the Z2 interface. In some embodiments, the VANC connects to the MME through the Sv interface as defined for SRVCC in 3GPP TS 23.216: "Single Radio Voice Call Continuity (SRVCC); Stage 2", incorporated herein by reference and hereinafter TS 23.216. Additional interfaces of the VANC include the Rx interface to the Policy and Charging Rules Function (PCRF), the SGi interface to the packet data network (PDN) gateway (P-GW), the Wm interface to the Authorization, Authentication, and Accounting (AAA) server, and an interface either the A or Iu-cs interface depending on which type of network connection is present, with the core network. It should be apparent to one of ordinary skill in the art that in some embodiments, other interfaces may be used instead of or in addition to the above enumerated interfaces.

In some embodiments, the VANC connects to several different eNodeBs and services each of the corresponding service regions of each of the several eNodeBs. In this manner, a single VANC can communicatively couple multiple eNodeB service regions to the CN. The VANC performs key functionalities, such as the management of the legacy UTRAN identifiers (Location Area Identifiers (LAI), Service Area Identifiers (SAI), RNC-Id, etc) towards the CN.

In some embodiments, the VANC includes various software module sub-components and/or various hardware module sub-components that perform some of the above mentioned functionality. For example, the Security Gateway (SeGW) is a logical entity within the VANC. The SeGW provides the security functions including termination of secure access tunnels from the UE, mutual authentication, encryption and data integrity for signaling traffic. For another example, the Handover Selection Function (HOSF) is a logical entity within the VANC. The HOSF allows E-UTRAN to GERAN/UTRAN CS handover requests from the MME to be routed to the correct serving VANC, as described in the "Handover of Active Call to GERAN without DTM Handover Support)" Section and in FIG. 46 and accompanying description.

The VANC of some embodiments includes circuits for receiving, transmitting, generating, and processing the various messages that cause various physical transformations within the VoLGA network, core network, and licensed wireless radio access network. In some embodiments, the circuits of the network controller include a processor, memory, receiver, and transceiver. These circuits perform various physical transformations on the network controller as well as other elements within the VoLGA network, licensed wireless radio access network, and core network. For example, the processor and the memory generate context identifiers that when sent to a UE using the transceiver provide the UE with a unique identifier when operating within the VoLGA network. These and other physical components of the network controller of some embodiments are described with further detail below.

In some embodiments, VANC functionality is modified from previous standards as follows. VANC Security Gateway functionality is limited to the VoLGA control plane with standard Wm interface to AAA Server for EAP-AKA authentication present. Some embodiments support VoLGA service functionality only. Some embodiments support the reception and processing of EPS-specific information (e.g., cell information) in GA-RC Register Request messages. Additionally, some embodiments support E-UTRAN to GERAN/UTRAN CS handover signaling procedures using the Z2 interface towards the MME. Some embodiments support voice bearer control/establishment using the Rx interface towards the PCRF.

D. LTE Core Network

The Evolved Packet System (EPS) consists of the E-UTRAN (which includes a collection of E-NodeBs) and Evolved Packet Core (aka LTE core or System Architecture Evolution (SAE)). EPS is a pure packet system. For instance EPS does not have a voice media gateway. Services, like voice and SMS, are expected to be provided by application functions that make use of the EPS service. The relevant portions of the LTE core network required for VoLGA services are described below.

1. Mobility Management Entity (MME)

The MME functions as the key control-node for the LTE access-network. It handles tracking and paging procedures for idle mode UE (User Equipment) including retransmissions. It also handles the bearer activation/deactivation process and chooses the serving gateway for a UE at the intra-LTE handover involving LTE Core Network node relocation and during the initial attach. It authenticates the user (interacting with the home subscriber server (HSS)). LTE Non-Access Stratum (NAS) signaling terminates at the MME and it generates and allocates temporary identities to UEs. The MME checks the authorization of the UE to use a service provider's Public Land Mobile Network (PLMN) and enforces UE roaming restrictions. The MME is the end point for ciphering/integrity protection for LTE NAS signaling and handles security key management. The MME supports lawful interception of signaling and provides the control plane function for mobility between LTE and 2G/3G access networks with the S3 interface from the SGSN and terminating at the MME.

In some embodiments, the MME has certain 3GPP Release 8 standard functionality plus additional behaviors. Some embodiments require some or all of the present standard functionality, including: performing the PS bearer splitting function by separating the voice PS bearer from the non-voice PS bearers (i.e., as specified in TS 23.216); handling the non-voice PS bearer handover with the target cell according to the Inter RAT handover procedure defined in 3GPP TS 23.401; coordinating PS handover and CS handover procedures when both procedures are performed; and receiving "Handover VoIP bearer to CS" indication from eNodeB in S1AP Handover Required message. In some embodiments, information flow is merged with the SRVCC flow (i.e., the eNodeB provides a generic indication that the VoIP bearer should be handed over to CS).

In some embodiments, some or all of the required additional functionality to 3GPP Release 8 standard behaviors includes: receiving VoLGA information from HSS (e.g., VoLGA authorization in visited public land mobile network (VPLMN)); sending VoLGA information to eNodeB, e.g., VoLGA indication during bearer establishment (in some embodiments, this indication is not merged with the SRVCC information flow, i.e. a generic indication to eNodeB is that the VoIP bearer is subject to handover to CS, since the eNodeB would initiate PS handover of the voice bearer in the SRVCC case if the target radio access technology (RAT) supported VoIP over PS); supporting new E-UTRAN to GERAN/UTRAN CS handover signaling procedures using the S3-cs interface towards the VANC; receiving the VoLGA capability indication as part of the UE network capability in the Attach Request message (MME stores this information for VoLGA operation); initiating the VoLGA handover procedure for handover of the voice component to the target cell; and selecting the target VANC for VoLGA handover.

2. Serving Gateway (S-GW)

The Serving Gateway (S-GW) routes and forwards user data packets and acts as the mobility anchor for the user plane during inter-eNodeB handovers and between LTE and other 3GPP technologies. The S-GW terminates the DL data path and triggers paging when DL data arrives for the UE for UEs in idle state. It stores and manages UE contexts, such as parameters of the IP bearer service and network internal routing information. The S-GW performs replication of the user traffic for lawful interception. The S-GW and P-GW functions are shown as a single element in many of the diagrams in this application.

3. Packet Data Network (PDN) Gateway (P-GW)

The Packet Data Network Gateway (P-GW) provides connectivity to the UE to external packet data networks and performs policy enforcement, packet filtering for each user, charging support, lawful interception and packet screening. In some embodiments, A UE may access multiple P-GWs at single time to access different PDNs.

E. CS Domain Core Network (CN)

A person of ordinary skill in the art would realize that there are two instances of core network. One is the LTE CN that includes the MME, S-GW, P-GW, HSS, etc. (which are further described above). The other is the CS domain CN which the UE accesses via the VANC. The VANC provides network connectivity of the UE to the existing circuit switched (CS) domain CN. In some embodiments, the CN includes one or more home location registers (HLRs) and AAA servers for subscriber authentication and authorization. Once authorized, the UE may access the CS domain services of the CN through the VoLGA system. To provide such services, the CN includes a Mobile Switching Center (MSC) to provide circuit switched services (i.e., voice).

Location services are provided by the serving mobile location center (SMLC). The cell broadcast center (CBC) provides support for cell broadcast services.

In some embodiments, the network includes full serving MSC (and VLR) functionality required for CS services per existing standards. It should be noted that throughout this application core network is often used interchangeably with MSC/VLR terminology.

F. Other Components

Described below are some of the other main components and their functionality present in some embodiments of the VoLGA architecture. The Home Location Register (HLR) is a central database that contains details of each mobile phone that is authorized to access the core network through a particular network controller. The Policy and Charging Rules Function (PCRF) is the node designated in real-time for the determination of the policy rules, i.e. verifying access permission, checking and debiting credit balances, etc., all in real-time. The Base Station Controller (BSC) is a traditional part of the GERAN and handles allocation of radio channels, receives measurements from the mobile phones, and controls inter-BTS (Base Transceiver Station) handovers. The BSC additionally provides transcoding services. The Radio Network Controller (RNC) is a governing element in the UTRAN and controls the NodeBs connected to it. Among its functions are radio resource management, some mobility management, and encryption. The AAA Server is responsible for managing authentication, authorization, and accounting services.

II. ARCHITECTURE MODELS AND REFERENCE POINTS

A. Non-Roaming Architectures

In some embodiments, the mobile system operator reuses the existing CS domain entities (e.g., MSC/VLR) that control establishment of CS services under E-UTRAN coverage. This architecture applies when the user attempts to access the core network through a Home Public Land Mobile Network (HPLMN) that supports VoLGA. The VANC enables the UE to access the MSC/VLR using the generic IP connectivity provided by the EPS. In some embodiments, the VANC is connected to the MSC/VLR using either the A-interface ("VoLGA A-mode") or the Iu-cs interface ("VoLGA Iu-mode"). From the EPS point of view, the VANC is viewed, in some embodiments, as an Application Function and the "Z1" interface between the UE and the VANC is based on the Up interface defined in "3GPP TS 43.318: 'Generic Access Network (GAN); Stage 2'", incorporated herein by reference and hereinafter, TS 43.318. In some embodiments, several UEs are connected to a single access point (i.e. eNodeB) or to several access points.

FIG. 1 conceptually illustrates a non-roaming architecture for VoLGA using A-Mode interface in some embodiments.

Figure 2:
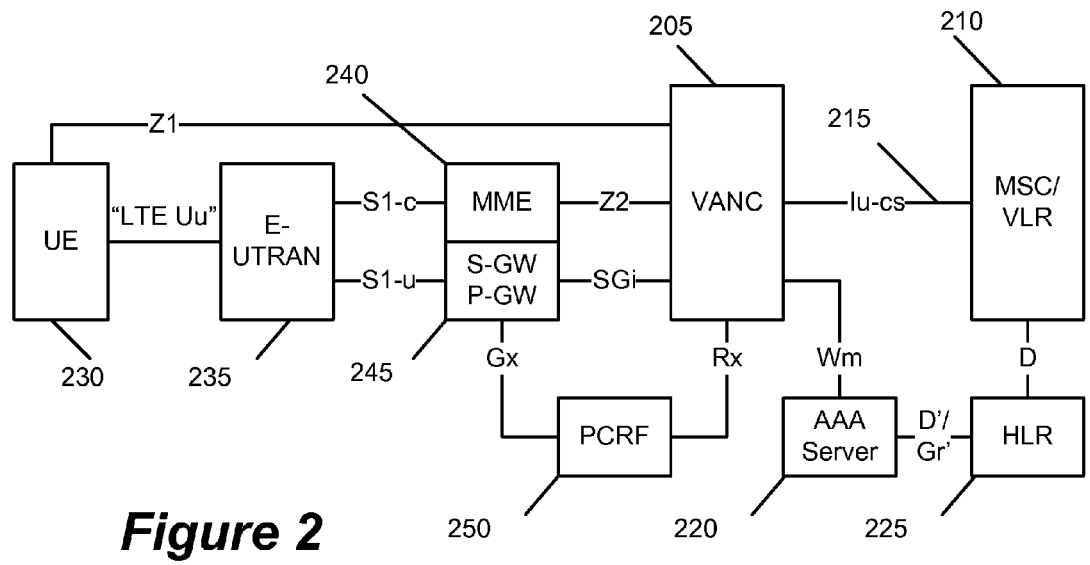
FIG. 2 illustrates a non-roaming architecture for VoLGA using Iu-Mode interface in some embodiments.

This figure includes: the UE 130; the E-UTRAN 135; the MME 140; S-GW/P-GW 145; PCRF 150; the VANC 105; MSC/VLR 110; A interface 115; AAA server 120; and HLR 125. As shown, the VANC 105 is connected to the MSC/VLR 110 using the A-interface 115 ("VoLGA A-mode"). The UE 130 accesses the VANC 105 through E-UTRAN 135 and S-GW/P-GW 145 (the link, Z1, between the UE and VANC is conceptually shown as a direct line in FIG. 1 for simplicity). The VANC appears as an Application Function to the PCRF 150. In some embodiments, AAA server 120 is optional and in some embodiments the HLR 125 can be replaced with a Home Subscriber Server (HSS) (not shown). FIG. 2 illustrates a non-roaming architecture for VoLGA using Iu-Mode interface in some embodiments. This figure includes: the UE 230; the E-UTRAN 235; the MME 240; S-GW/P-GW 245; PCRF 250; the VANC 205; MSC/VLR 210; Iu-cs interface 215; AAA server 220; and HLR 225. Here, the VANC 205 is connected to the MSC/VLR 210 using the Iu-cs interface 215 ("VoLGA Iu-mode"). The UE 230 accesses the VANC 205 through E-UTRAN 235, MME 240, and S-GW/P-GW 245. The VANC appears as an Application Function to the PCRF 250. In some embodiments, AAA server 220 is optional and in some embodiments the HLR 225 can be replaced with a Home Subscriber Server (HSS) (not shown).

B. Roaming Architectures

This roaming architecture applies when the UE attempts to register for VoLGA service in a Visited Public Land Mobile Network (VPLMN) through an eNodeB.

Figure 3:
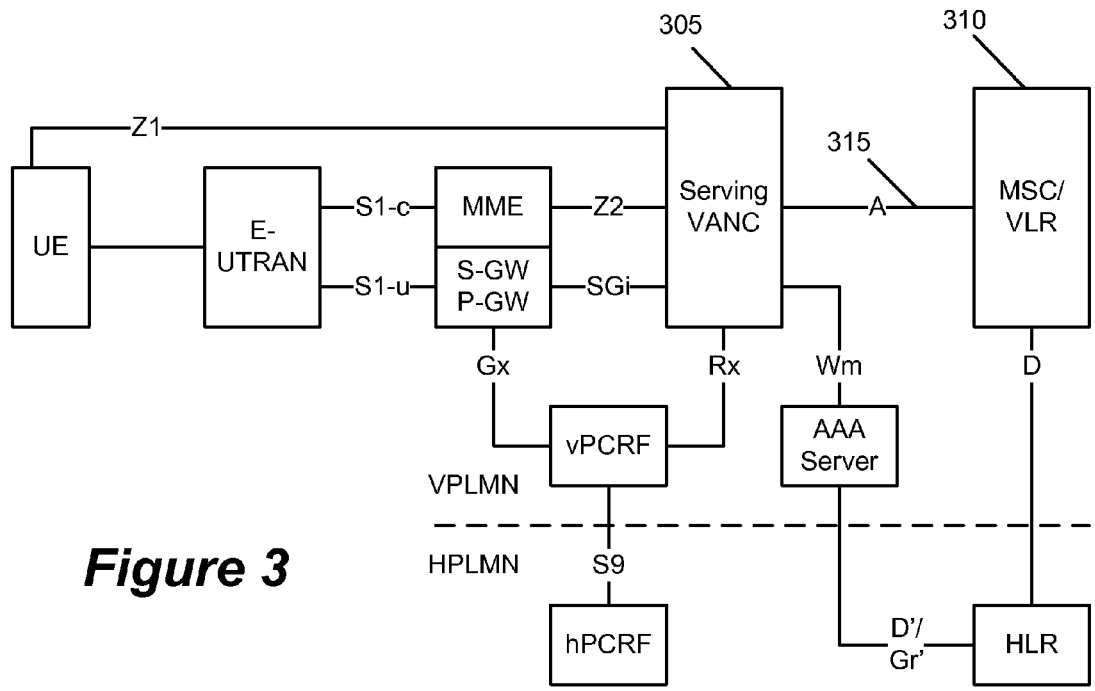
FIG. 3 illustrates a roaming architecture for VoLGA using A-mode interface in some embodiments.
Figure 4:
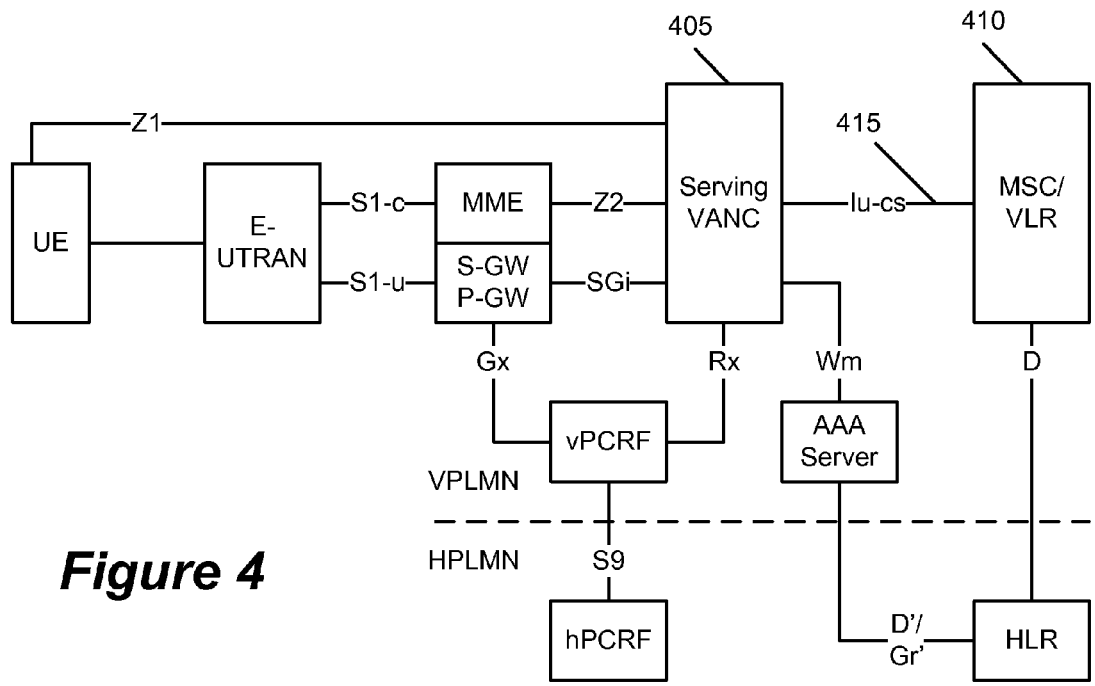
FIG. 4 illustrates a roaming architecture for VoLGA using Iu-mode interface in some embodiments.

FIG. 3 illustrates a roaming architecture for VoLGA using A-mode interface in some embodiments. As shown, the VANC 305 in the VPLMN is connected to the MSC/VLR 310 using the A-interface 315 ("VoLGA A mode"). FIG. 4 illustrates a roaming architecture for VoLGA using Iu-mode interface in some embodiments. Here, the VANC 405 in the VPLMN is connected to the MSC/VLR 410 using the Iu-cs interface 415 ("VoLGA Iu mode").

C. Reference Points

This section describes the different interfaces present in his application. The reference point between the UE and the VANC is labelled Z1. The reference point between the MME and the VANC is labelled Z2. In some embodiments, the Z2 reference point may be the same as the Sv reference point specified in 3GPP TS 23.216. See "VoLGA Access Network Controller (VANC)" Section, above, for more information about interfaces.

III. PROTOCOL ARCHITECTURE

There are two separate protocol architectures for the VoLGA system: control plane architecture and user plane architecture. Each figure representing the architecture consists of layers of protocol designed to relay specific types of information. The top layers are encapsulated in the lower layers. Control plane architecture covers the functionality related to all aspects of network signaling and control, such as call and connection control. User plane architecture deals with functionality associated with issues of user-to-user information transfer and associated controls.

Figure 5:
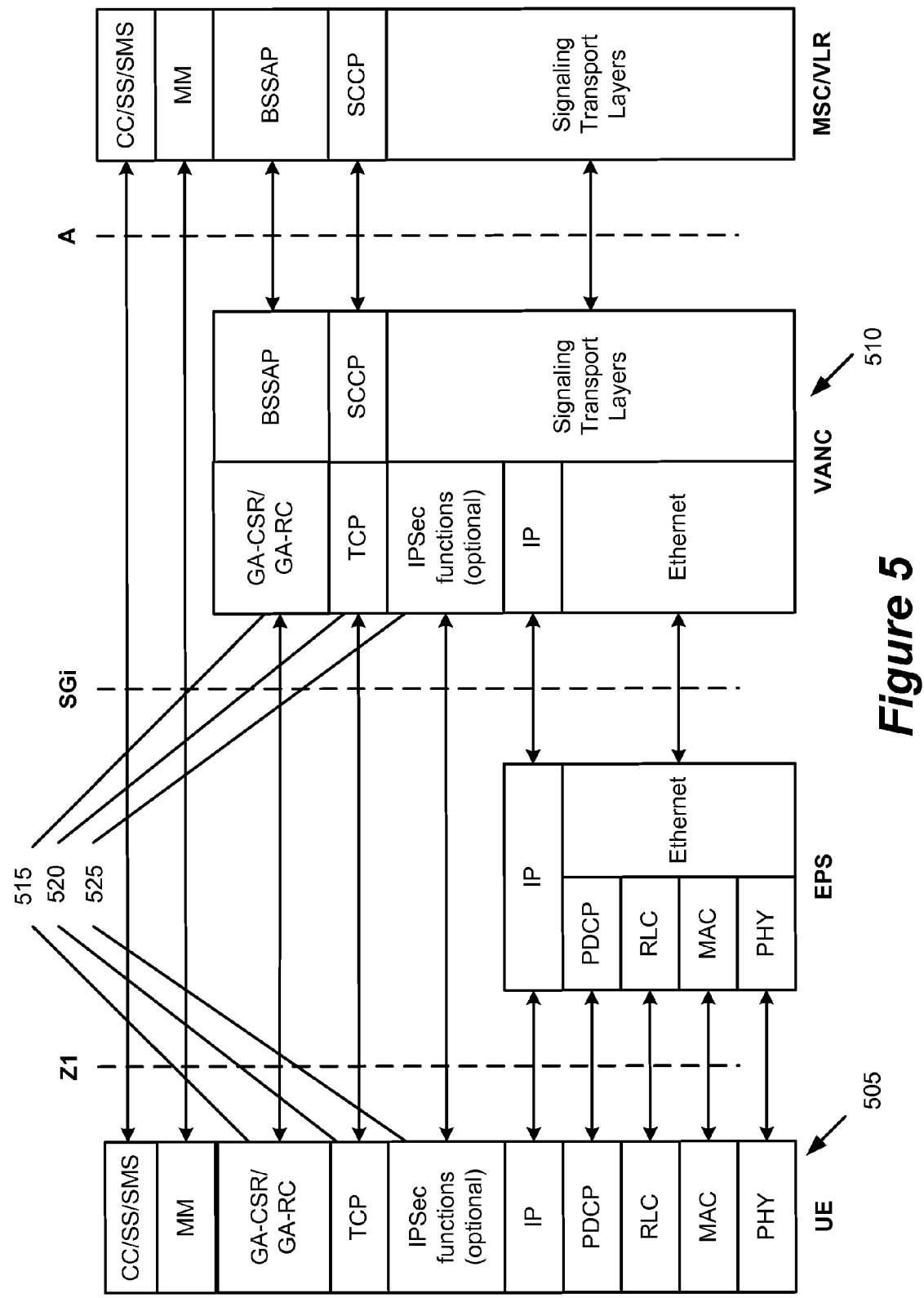
FIG. 5 illustrates the protocol architecture for the VoLGA control plane (VoLGA A-mode) in some embodiments.

The protocol architecture for the VoLGA control plane (VoLGA A-mode) in some embodiments is illustrated in FIG. 5 (assuming the VANC and MSC/VLR are connected using the A-interface). As shown, communication between the UE 505 and the VANC 510 uses the GA-RC/GA-CSR protocol layer 515, the TCP layer 520, and the IPSec layer 525. The GA-RC/GA-CSR protocol layer 515 is discussed in greater detail below (See "GA-RC State Description" Section, below and "GA-CSR State Description" Section, below). In some embodiments, the TCP layer 520 is used along with the internet protocol to send data in the form of message units between two points over the internet. TCP will break up data into smaller packets at one end point, transmit the packets, and resequence the packets when they arrive at the other end point. Here, it keeps track of individual units of data (packets) that a message is divided into for routing. The IPSec layer 525 establishes a secure communication path with the network controller to encrypt and provide data integrity for messages exchanged between the particular UE and the network controller.

Figure 6:
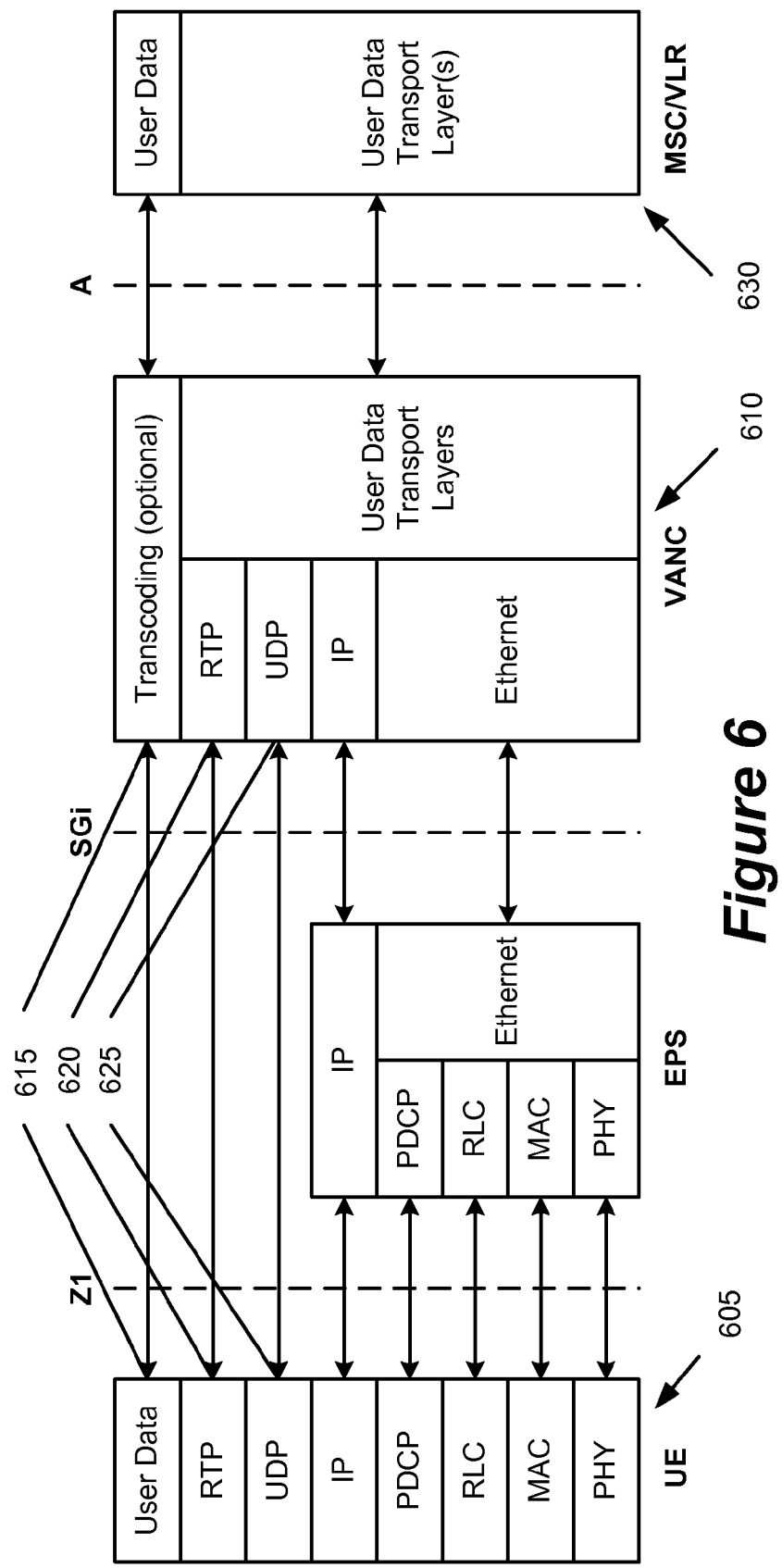
FIG. 6 illustrates the protocol architecture for the VoLGA user plane (VoLGA A-mode) in some embodiments.

FIG. 6 illustrates the protocol architecture for the VoLGA user plane (VoLGA A-mode) in some embodiments, assuming the VANC and MSC/VLR are connected using the A-interface. As shown, communication between the UE 605 and the VANC 610 uses the User Data/Transcoding protocol layer 615 (which is eventually sent to the core network 630), the real-time transport protocol (RTP) layer 620, and the user datagram protocol (UDP) layer 625. The User Data/Transcoding layer 615 takes user data from one end point and performs a transcoding function on it so it can be understood by the other end point. For example, voice data from the UE 615 encoded using the Adaptive Multi-Rate (AMR) voice codec is transcoded into the G.711 Pulse Code Modulation expected by the core network (and vice versa). The RTP layer 620 is an IP standard that specifies a way to manage the real-time transmission of multimedia data over the network. The UDP layer 625 is a communications protocol similar to the TCP protocol described above. The protocol communicates data between two end points using IP, however, it lacks the ability to break data into smaller pieces and reassemble them like TCP.

Figure 7:
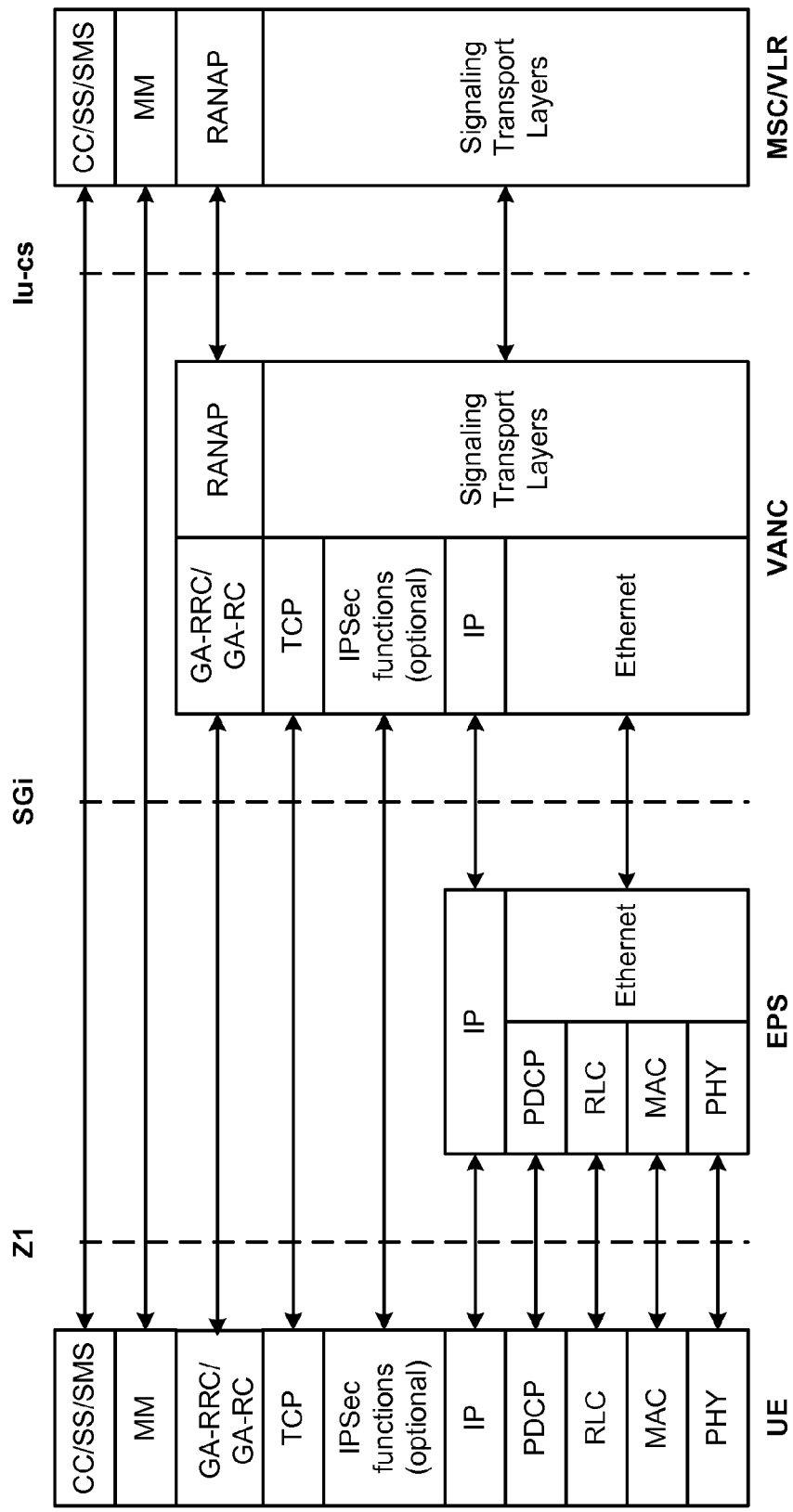
FIG. 7 illustrates the protocol architecture for the VoLGA control plane (VoLGA Iu-mode) in some embodiments.
Figure 8:
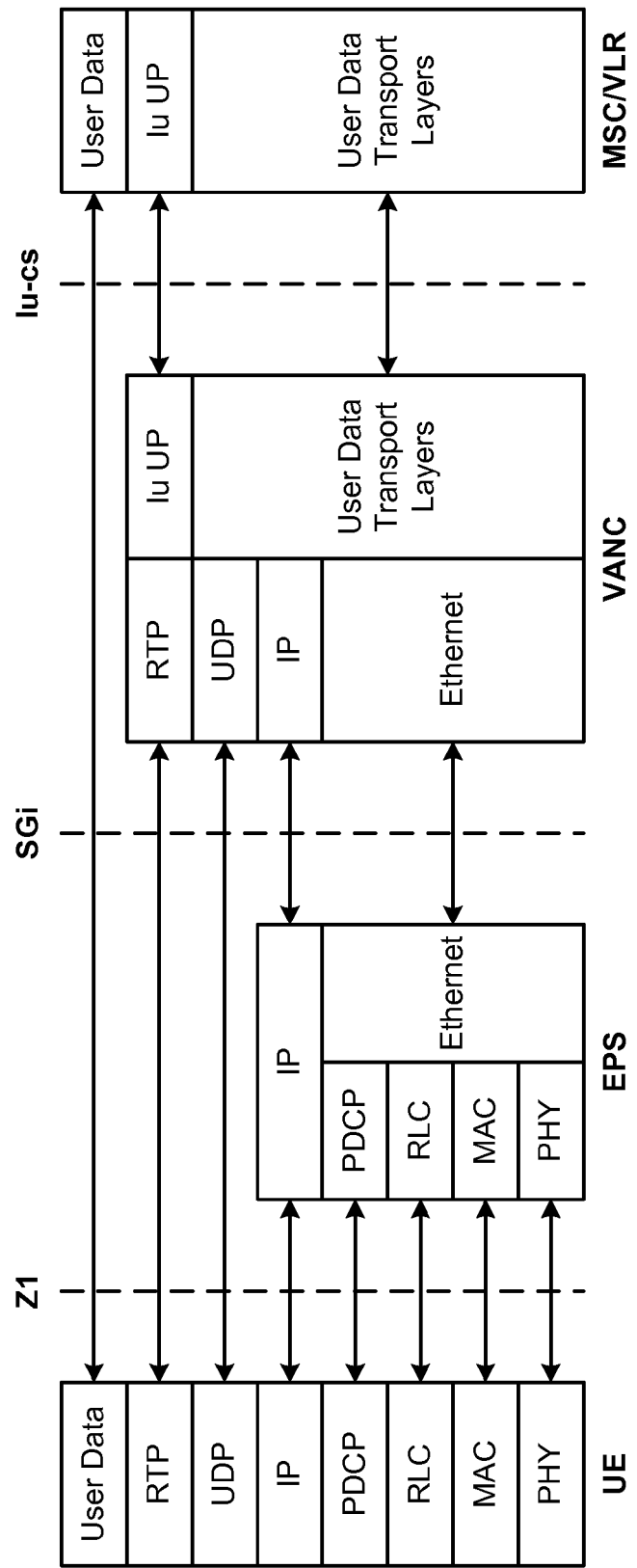
FIG. 8 illustrates the protocol architecture for the VoLGA user plane (VoLGA Iu-mode) in some embodiments.

The protocol architecture for the VoLGA control plane (VoLGA Iu-mode) in some embodiments is illustrated in FIG. 7 (assuming the VANC and MSC/VLR are connected using the Iu-interface). FIG. 8 illustrates the protocol architecture for the VoLGA user plane (VoLGA Iu-mode) in some embodiments, assuming the VANC and MSC/VLR are connected using the Iu-interface.

Figure 9:
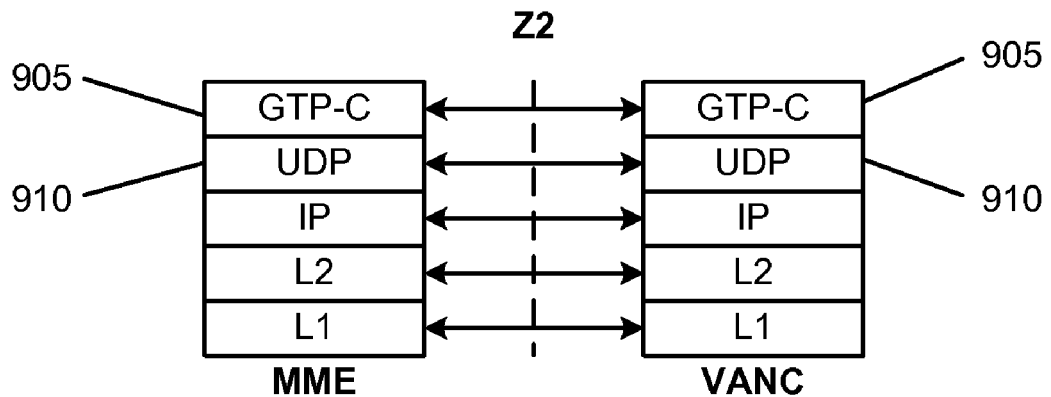
FIG. 9 illustrates the protocol architecture for the Z2 interface in some embodiments.

FIG. 9 illustrates the protocol architecture for the Z2 interface in some embodiments. In some embodiments, the VANC and MME communicate through the Z2 interface. As shown, the Z2 interface protocol architecture includes GPRS Tunneling Protocol for the control plane (GTP-C) 905, which tunnels signaling messages between the VANC and MME, and User Datagram Protocol (UDP) 910, which likewise transfers signaling messages and is defined in IETF RFC 768: "User Datagram Protocol", incorporated herein by reference and hereinafter, RFC 768.

IV. THE UE

A. UE Architecture

Figure 10:
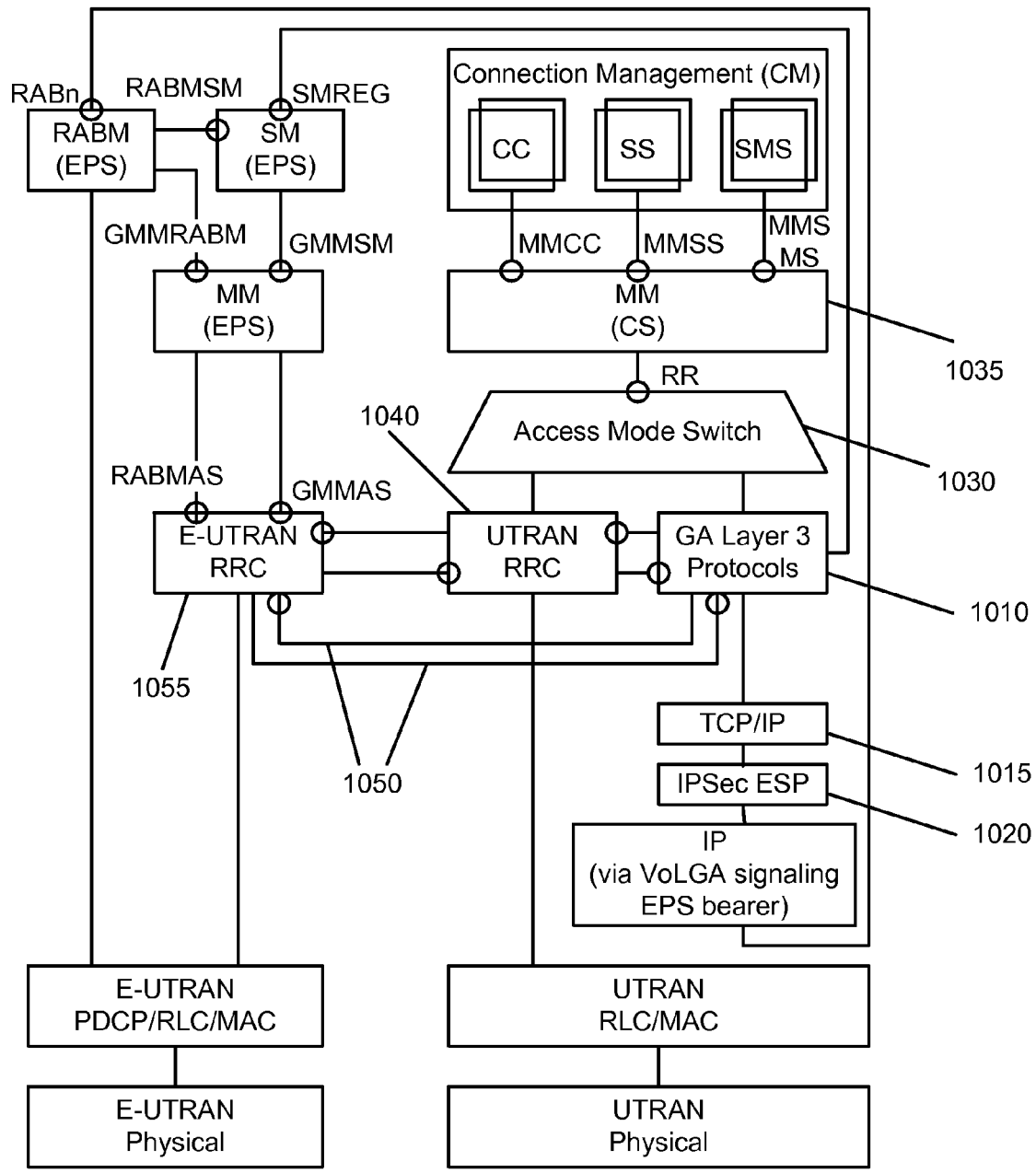
FIG. 10 illustrates another UE architecture for the VoLGA control plane, in some embodiments.

This section discusses and diagrams the necessary components required of a UE to register for VoLGA service, in some embodiments. FIG. 10 illustrates a UE architecture for the VoLGA control plane, in some embodiments. It is assumed the UE has E-UTRAN and UTRAN functionality. As shown, VoLGA service based on GAN functionality (access mode switch 1030, GA layer 3 protocols 1010, TCP/IP 1015, IPSec ESP 1020) is then added. The "GA Layer 3 Protocols" 1010 is GA-RC/GA-CSR (GAN A/Gb mode) or GA-RC/GA-RRC (GAN Iu mode). In some embodiments, TCP/IP layer 1015 and/or IPSec ESP layer 1020 are also added. The access mode switch 1030 switches the CS MM protocol layer 1035 to either the GA layer 3 protocols 1010 or UTRAN RRC 1040. As shown, there is a direct interface 1050 between the GA layer 3 protocols 1010 and the E-UTRAN RRC layer 1055. As described further below, this interface is used, for instance, when the GA layer 3 requests the current ECGI from the E-UTRAN RRC. The portion of the UE architecture responsible for PS service in UTRAN is not shown.

Figure 11:
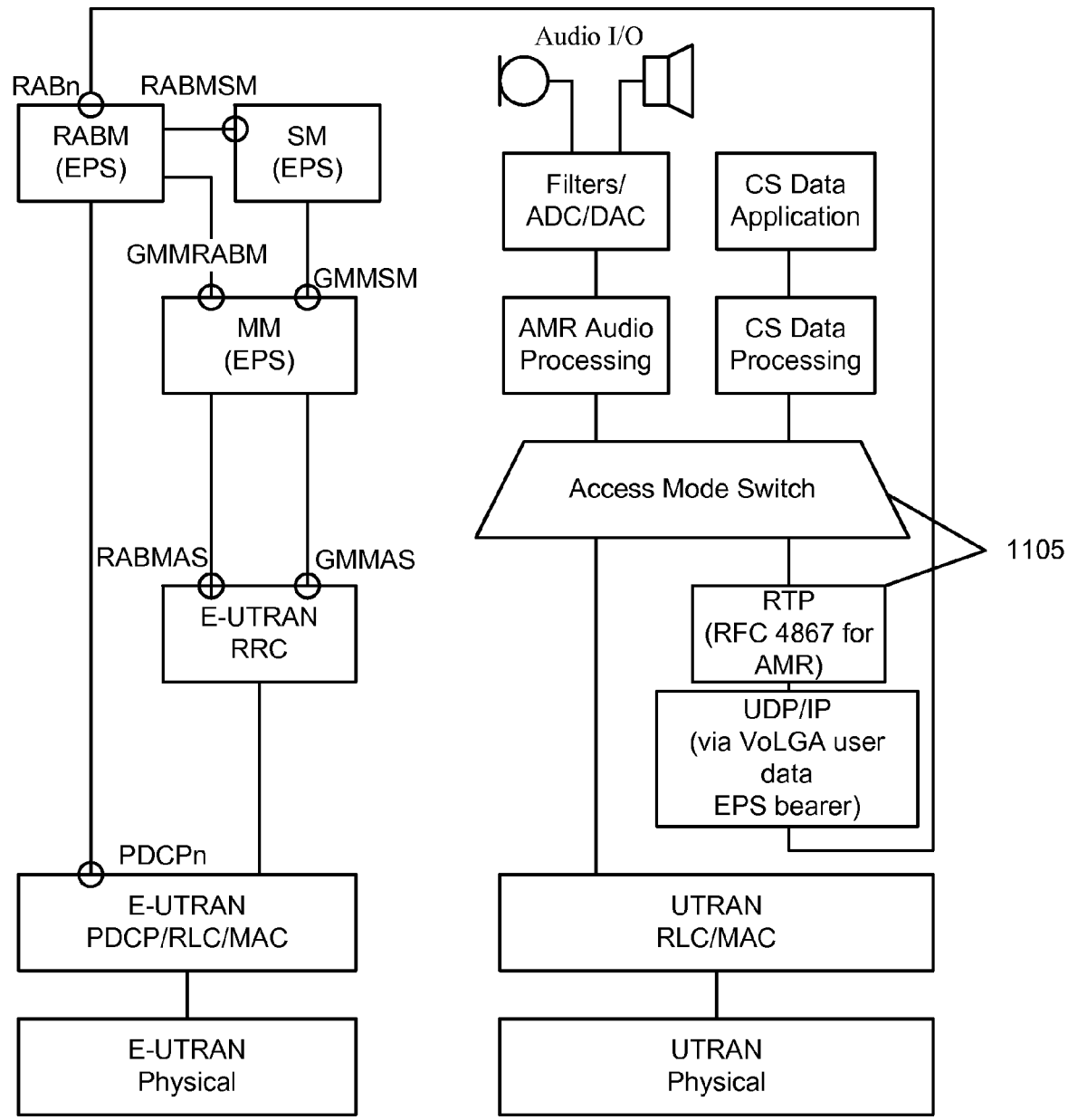
FIG. 11 illustrates a UE architecture for the VoLGA user plane in some embodiments.

FIG. 11 illustrates a UE architecture for the VoLGA user plane in some embodiments. This figure assumes that the baseline case is a UE with E-UTRAN and UTRAN functionality. As shown, the components enabling VoLGA service based on GAN functionality 1105 are then added. The portion of the UE architecture responsible for PS service in UTRAN is not shown.

B. UE State Description

The UE state represents the status of certain resource management protocol layer exchange between the UE and VANC and is described in terms of the possible GA-RC states, GA-CSR states, and GA-RRC states. Each of these states is discussed below.

1. GA-RC State Description

Figure 12:
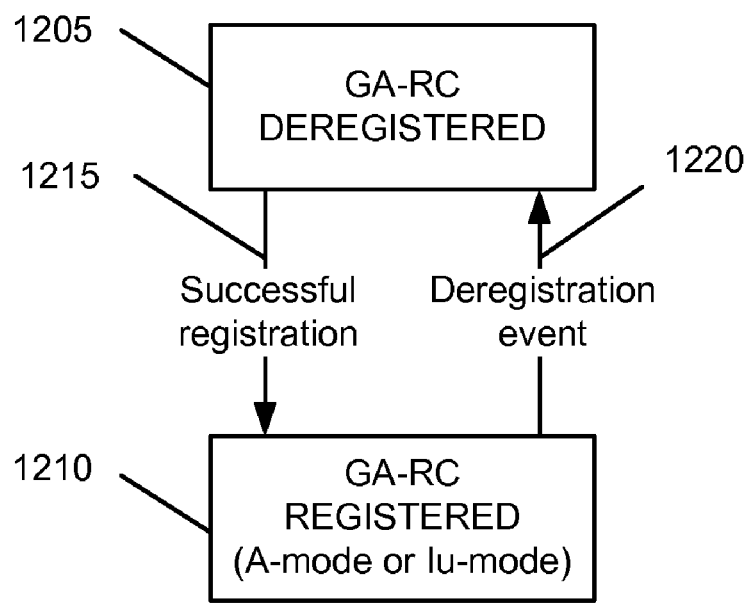
FIG. 12 illustrates the GA-RC states in some embodiments.

The GA-RC protocol provides a resource management protocol layer between the UE and the VANC responsible for the functions that include: (1) registration with VANC (including VoLGA mode selection, either VoLGA A-mode or VoLGA Iu-mode); (2) registration update with the VANC; (3) deregistration; and (4) application level keep-alive with the VANC. The GA-RC state diagram in some embodiments is shown in FIG. 12. As shown, the GA-RC entity in the UE can be in one of two states: GA-RC DEREGISTERED 1205 or GA-RC REGISTERED 1210. In the GA-RC DEREGISTERED state 1205, the UE may be camped on an E-UTRAN cell; however, the UE has not registered successfully with the VANC and cannot exchange GA-CSR messages (VoLGA A-mode) or GA-RRC messages (VoLGA Iu-mode) with the VANC. The UE may initiate the VoLGA Registration procedure when it is camped on an E-UTRAN cell and in the GA-RC DEREGISTERED state 1205.

Upon successful VoLGA registration 1215, the UE enters the GA-RC-REGISTERED state 1210 with either VoLGA A-mode or VoLGA Iu-mode selected. The GA-RC entity in the UE returns to GA-RC DEREGISTERED state 1205 when a deregistration event 1220 takes place; e.g., the UE receives a deregistration message from the VANC.

In some embodiments, the GA-RC entity in the UE is normally in the GA-RC DEREGISTERED state 1205 when the UE is operating in GERAN/UTRAN mode. The exception is when the UE moves to a GERAN/UTRAN cell while in the GA-RC REGISTERED state 1210; e.g., due to cell reselection, handover or network assisted cell change (NACC). In this case, the UE may only send a GA-RC DEREGISTER message to the VANC and, in some embodiments, will disregard all messages from the VANC except for the GA-RC DEREGISTER message.

2. GA-CSR State Description

Figure 13:
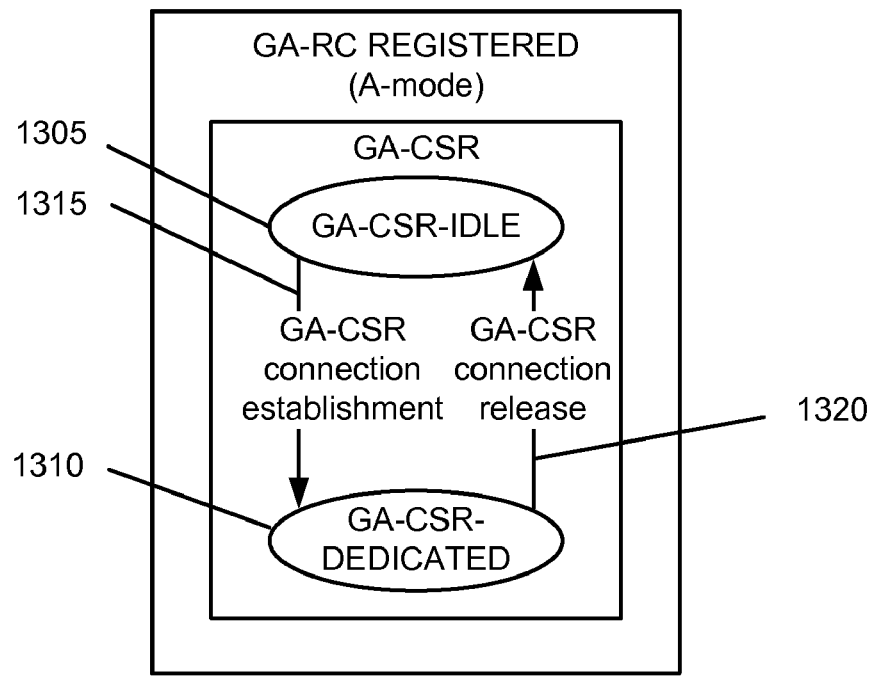
FIG. 13 illustrates the GA-CSR states in some embodiments.

The GA-CSR protocol provides a resource management layer, which is equivalent to the GERAN RR and provides the functions that include: (1) setup of bearer for CS traffic between the UE and VANC; (2) direct transfer of NAS messages between the UE and core network; and (3) functions such as paging, ciphering configuration and classmark change. FIG. 13 illustrates the GA-CSR states in some embodiments. Here, the GA-CSR entity in the UE enters the GA-CSR-IDLE state 1305 when the UE switches the serving RR entity to GA-CSR and the service access point (SAP) between the NAS and the GA-CSR is activated. This switch may occur only when the GA-RC entity is in the GA-RC REGISTERED state. The GA-CSR entity in the UE moves from the GA-CSR-IDLE state 1305 to the GA-CSR-DEDICATED state 1310 when the GA-CSR connection is established 1315 and returns to the GA-CSR-IDLE state when the GA-CSR connection is released 1320. Upon GA-CSR connection release 1320, an indication that no dedicated resources exist for the CS domain is passed to the upper layers.

In some embodiments, the GA-CSR entity in the UE enters a NULL state when the UE switches the serving RR from VoLGA A-mode to GERAN/UTRAN (i.e., while the UE is idle or after handover to GERAN/UTRAN is completed).

3. GA-RRC State Description

Figure 14:
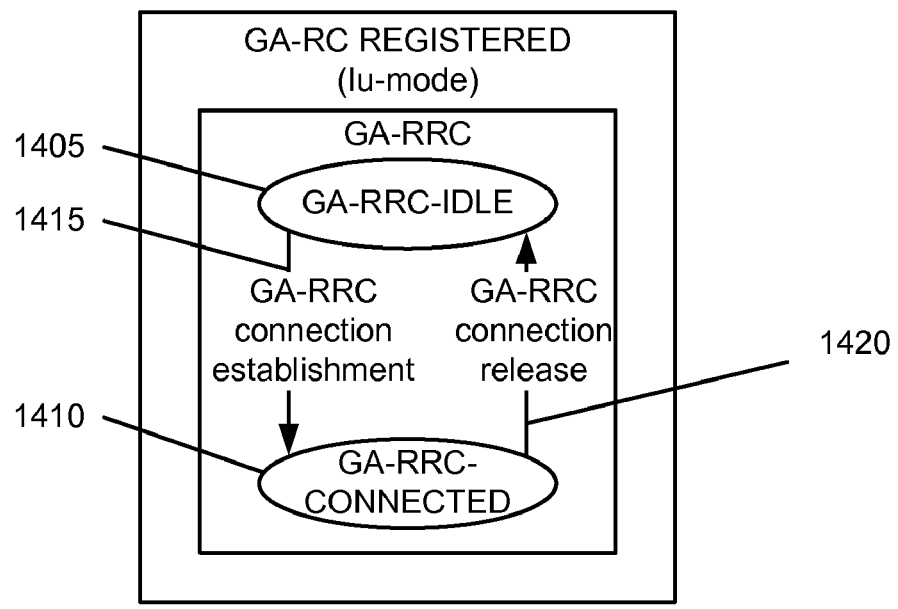
FIG. 14 illustrates the GA-RRC states in some embodiments.

The GA-RRC protocol provides a resource management layer which is equivalent to UTRAN RRC and supports the functions that include: (1) setup of transport channels for CS traffic between the UE and VANC; (2) direct transfer of NAS messages between the UE and core network; and (3) other functions such as CS paging and security configuration. FIG. 14 illustrates GA-RRC states in some embodiments.

As shown, the GA-RRC entity in the UE enters the GA-RRC-IDLE state 1405 from a NULL state when the UE switches the serving RR entity to GA-RRC and the SAP between the NAS and the GA-RRC is activated. This switch may occur only when the GA-RC entity is in the GA-RC REGISTERED state.

The GA-RRC entity in the UE moves from the GA-RRC-IDLE state 1405 to the GA-RRC-CONNECTED state 1410 when the GA-RRC connection is established 1415 and returns to the GA-RRC-IDLE state 1405 when the GA-RRC connection is released 1420. Upon GA-RRC connection release, an indication that no dedicated resources exist for the CS domain is passed to the upper layers.

The GA-RRC entity in the UE enters a NULL state when the UE switches the serving RR from VoLGA Iu-mode to GERAN/UTRAN (i.e., while the UE is idle or after handover to GERAN/UTRAN is completed).

V. PROCEDURES FOR VOLGA A-MODE

A. Rove-In

Before a UE may access VoLGA services, it must "Rove-in" to a network that supports VoLGA functionality, which usually requires the UE to be within a certain physical proximity to the necessary equipment. "Rove-in" is the process in which the UE switches the serving RR entity for CS domain services to GA-CSR (VoLGA A-mode) or GA-RRC (VoLGA Iu-mode). When preparing to rove-in, the UE performs (1) VANC discovery, and (2) VoLGA registration.

1. VANC Discovery

VANC discovery is required when a UE attaches to EPS and desires access to VoLGA service. The VANC discovery process consists of two parts: selection of the Packet Data Network (PDN) that the UE uses for VoLGA service (i.e. default PDN or VoLGA-specific PDN) and VANC discovery within the selected PDN.

The selection of the PDN that the UE uses for VoLGA service is based on the UE configuration. For roaming support, the UE is provisioned with a dedicated service APN for VoLGA service (e.g., APN-VoLGA-FOO). For VoLGA service in the HPLMN, the UE may be provisioned with a dedicated service APN in some embodiments or with an indication that the default PDN be used in other embodiments. In some embodiments, the dedicated service APN for VoLGA service does not have to be consistent among operators. However, in some embodiments, each VPLMN must support translations that result in local breakout (i.e., selection of a PDN GW in the VPLMN) for its roaming partners' dedicated service APNs for VoLGA service.

In some embodiments, VANC discovery is performed after IP connectivity in the selected PDN has been established using one of the following mechanisms: (1) in some embodiments, the UE may be configured (e.g. during initial provisioning) with the fully qualified domain name (FQDN) of a VANC or its IP address. In some embodiments, if the VANC FQDN is configured, DNS is used to obtain the IP address; (2) in some embodiments, the UE may use dynamic host configuration protocol (DHCP) to obtain the FQDN (or IP address) of a VANC and the address of a Domain Name System (DNS) server that is capable of resolving the VANC FQDN (if VANC IP address is not provided via DHCP), as described in "VANC Discovery in HPLMN using DHCP" Section, below, (non-roaming case) and "VANC Discovery in VPLMN using DHCP" Section, below (roaming case); and (3) in some embodiments, the UE may use DNS to obtain the VANC IP address using the procedure described in "VANC Discovery in HPLMN using DNS" Section, below, (non-roaming case) and "VANC Discovery in VPLMN using DNS" Section, below (roaming case). In some embodiments, the DNS-based procedure is dependent on an identifier that is agreed to be used by all VoLGA operators, i.e. a unique VoLGA service name for automatic VANC discovery (e.g., "vanc-discovery").

a. VANC Discovery in HPLMN i. VANC Discovery in HPLMN using DHCP

Figure 15:
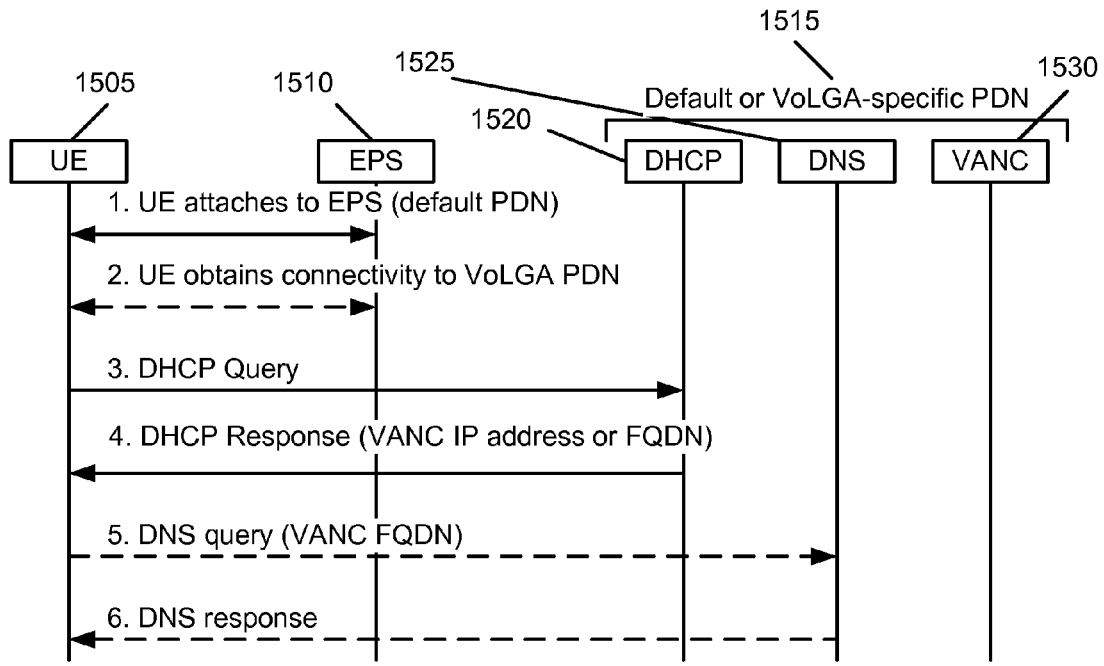
FIG. 15 illustrates VANC service discovery in HPLMN using DHCP in some embodiments.

FIG. 15 illustrates VANC service discovery in HPLMN using DHCP in some embodiments. The figure includes: UE 1505; EPS 1510; Default or VoLGA-specific PDN 1515, which is comprised of DHCP 1520; DNS server 1525; and VANC 1530.

As shown, the UE 1505 attaches (in step 1) to EPS 1510 and gains default PDN connectivity. In some embodiments, the attach procedure is as defined in TS 23.401, with the following Single-Radio Voice Call Continuity (SRVCC) functionality additions as described in TS 23.216: the UE includes the SRVCC capability indication as part of the UE Network Capability in the Attach Request message. In some embodiments, the MME stores this information for SRVCC operation (if authorized, see below). If the subscriber is authorized to use the EPS SRVCC capabilities then, in some embodiments, the HSS includes the session transfer number for SRVCC (STN-SR) and the mobile subscriber integrated services digital network (ISDN) (MSISDN) in the Insert Subscriber Data message to the MME. In some embodiments, the MME includes a "SRVCC operation possible" indication in the S1AP Initial Context Setup Request, meaning that both UE and MME are SRVCC-capable and SRVCC service is authorized.

If provisioned with a dedicated service APN for VoLGA service in the HPLMN (e.g., APN-VoLGA-FOO), the UE 1505 requests (in step 2) connectivity to the dedicated VoLGA PDN 1515. In some embodiments, the HSS provides the MME with the dedicated service APN used for VoLGA service in the subscriber profile, allowing the MME to authorize access to the PDN. The UE 1505 uses DHCP 1520 to obtain (in steps 3 and 4) the FQDN (or IP address) of a VANC 1530 and the address of a DNS server 1525 that is capable of resolving the VANC FQDN (if VANC IP address is not provided via DHCP).

In some embodiments, if a VANC FQDN is returned in step 4, the UE 1505 uses (in step 5) the DNS server 1525 to resolve the VANC FQDN. In step 6, if DNS resolution is successful, then, in some embodiments, the UE 1505 is ready to attempt registration on the selected VANC 1530; if DNS resolution is unsuccessful, then the UE 1505 concludes in some embodiments, that the HPLMN does not offer VoLGA service.

ii. VANC Discovery in HPLMN Using DNS

Figure 16:
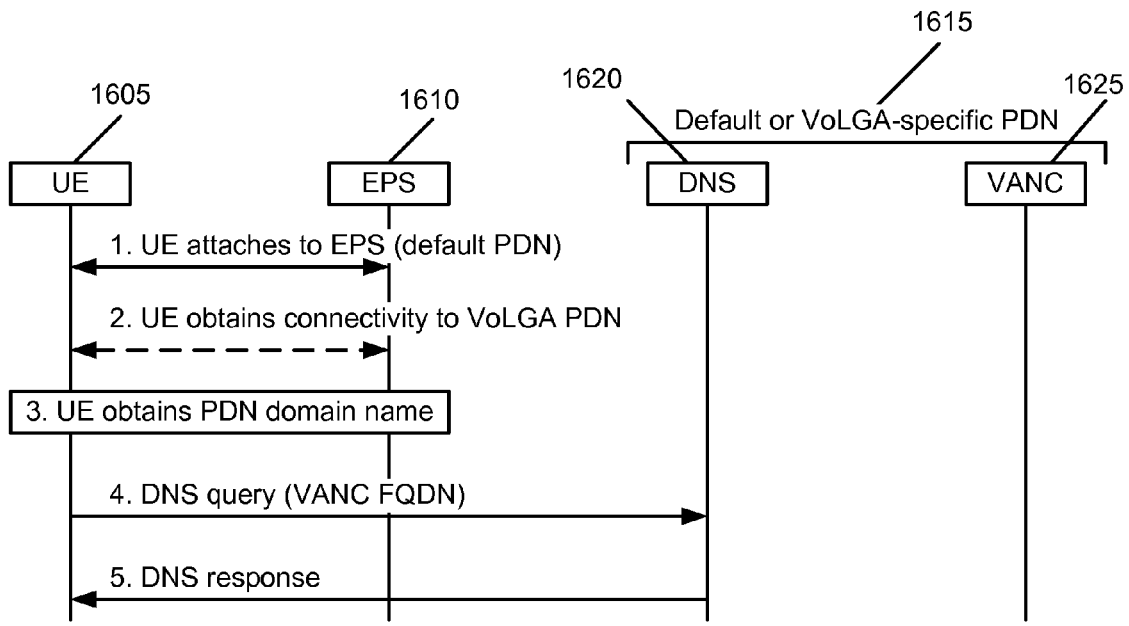
FIG. 16 illustrates VANC service discovery in HPLMN using DNS in some embodiments.

FIG. 16 illustrates VANC service discovery in HPLMN using DNS in some embodiments. This figure includes: UE 1605, EPS1610, and Default or VoLGA-specific PDN 1615, which is comprised of DNS server 1620 and VANC 1625.

Here, the UE 1605 attaches (in step 1) to EPS 1610 and gains default PDN connectivity. If provisioned with a dedicated service APN for VoLGA service in the HPLMN (e.g., APN-VoLGA-FOO), the UE 1605 requests (in step 2) connectivity to the dedicated VoLGA PDN 1615. (See "VANC Discovery in HPLMN Using DHCP" Section, above for additional information concerning steps 1 and 2; the steps are the same in both processes).

The UE 1605 obtains (in step 3) the domain name that the UE 1605 uses to resolve hostnames via DNS server 1620 in the selected PDN 1615 (e.g., "home-operator-pdn.com").

The UE 1605 uses (in step 4) DNS server 1620 to resolve the fully qualified domain name consisting of the unique VoLGA service name concatenated with the domain name (e.g., "vanc-discovery.home-operator-pdn.com"). In step 5, if DNS resolution is successful, then the UE 1605 is ready to attempt registration on the selected VANC 1625; if DNS resolution is unsuccessful, then the UE 1605 concludes that the HPLMN does not offer VoLGA service.

b. VANC Discovery in VPLMN i. VANC Discovery in VPLMN Using DHCP

Figure 17:
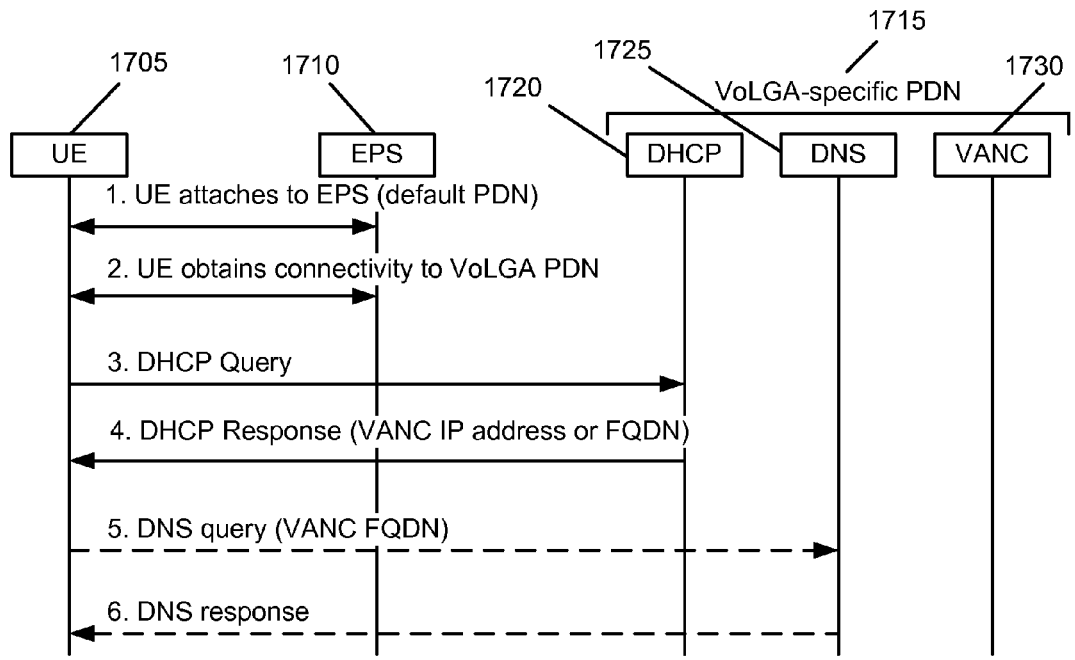
FIG. 17 illustrates VANC service discovery in VPLMN using DHCP in some embodiments.

FIG. 17 illustrates VANC service discovery in VPLMN using DHCP in some embodiments. The figure includes: UE 1705; EPS 1710; Default or VoLGA-specific PDN 1715, which is comprised of DHCP 1720; DNS server 1725; and VANC 1730.

As shown, the UE 1705 attaches (in step 1) to EPS 1710 and gains default PDN connectivity. In some embodiments, the attach procedure is as defined in TS 23.401, with the following SRVCC additions as described in TS 23.216: the UE includes the SRVCC capability indication as part of the UE Network Capability in the Attach Request message. In some embodiments, the MME stores this information for SRVCC operation (if authorized, see below). If the subscriber is authorized to use the EPS SRVCC capabilities then, in some embodiments, the HSS includes the SRVCC STN-SR and MSISDN in the Insert Subscriber Data message to the MME. In some embodiments, the MME includes a "SRVCC operation possible" indication in the S1AP Initial Context Setup Request, meaning that both UE and MME are SRVCC-capable and SRVCC service is authorized.

The UE 1705 requests (in step 2) connectivity to the dedicated VoLGA PDN 1715. In some embodiments, the HSS provides the MME with the dedicated service APN used for VoLGA service in the subscriber profile, allowing the MME to authorize access to the PDN. The UE 1705 uses DHCP 1720 to obtain (in steps 3 and 4) the FQDN (or IP address) of a VANC 1730 and the address of a Domain Name Server (DNS) 1725 that is capable of resolving the VANC FQDN (if VANC IP address is not provided via DHCP).

If a VANC FQDN is returned in step 4, the UE 1705 uses (in step 5) DNS 1725 to resolve the VANC FQDN. In step 6, if DNS resolution is successful, then the UE 1705 is ready to attempt registration on the selected VANC 1730; if DNS resolution is unsuccessful, then the UE 1705 concludes that the VPLMN does not offer VoLGA service.

ii. VANC Discovery in VPLMN Using DNS

Figure 18:
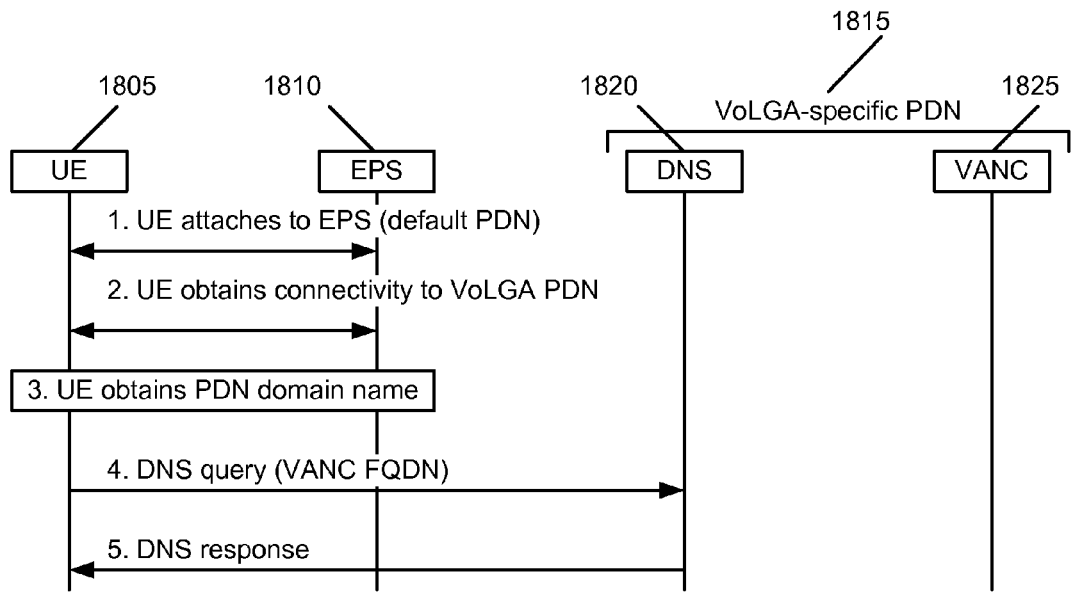
FIG. 18 illustrates VANC service discovery in VPLMN using DNS in some embodiments.

FIG. 18 illustrates VANC service discovery in VPLMN using DNS in some embodiments. This figure includes: UE 1805, EPS 1810, and Default or VoLGA-specific PDN 1815, which is comprised of DNS 1820 and VANC 1825.

As shown, the UE 1805 attaches (in step 1) to EPS 1810 and gains default PDN connectivity. If provisioned with a dedicated service APN for VoLGA service in the VPLMN (e.g., APN-VoLGA-FOO), the UE 1805 requests (in step 2) connectivity to the dedicated VoLGA PDN 1815. (See "VANC Discovery in HPLMN using DHCP" Section, above, steps 1 and 2 for additional information concerning steps 1 and 2 here; the steps are the same in both processes).

The UE 1805 obtains (in step 3) the domain name that the UE 1805 uses to resolve hostnames via DNS server 1820 in the selected PDN 1815 (e.g., "home-operator-pdn.com").

The UE 1805 uses (in step 4) DNS server 1820 to resolve the fully qualified domain name consisting of the unique VoLGA service name concatenated with the domain name (e.g., "vanc-discovery.home-operator-pdn.com"). In step 5, if DNS resolution is successful, then the UE 1805 is ready to attempt registration on the selected VANC 1825; if DNS resolution is unsuccessful, then the UE 1805 concludes that the VPLMN does not offer VoLGA service.

2. VoLGA Registration

Figure 19:
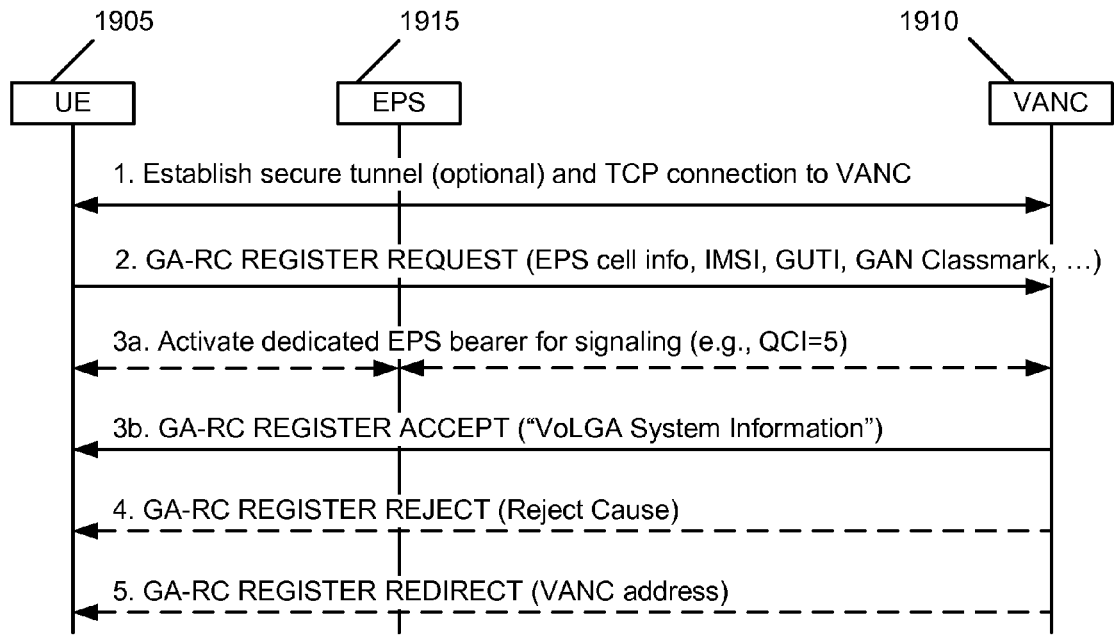
FIG. 19 illustrates VoLGA service registration in some embodiments.

If the UE has successfully completed the VANC discovery procedure (i.e., has the address of a VANC), the UE may attempt VoLGA registration to be assigned a Serving VANC. The VANC may accept or reject the registration or redirect the UE to another VANC (e.g., depending on the UE's location or roaming condition). FIG. 19 illustrates VoLGA registration in some embodiments. Prior to registering to VoLGA, however, the UE has to register with EPS, i.e., perform the attach procedure or the tracking area update, which informs the MME that the UE is available for receiving EPS services that require registration. These procedures are described in TS 23.401. The VoLGA registration shown in FIG. 19 is, therefore, performed after the UE registration with EPS.

Here, the UE 1905 establishes (in step 1) a secure tunnel (i.e., in some embodiments using IKEv2 and IPSec ESP as specified in TS 43.318) (optional) and TCP connection to a pre-defined port on the assigned VANC 1910. Although the connection is shown as a TCP connection in FIG. 19, other reliable transport connections (such as SCTP) can be used interchangeably throughout this Specification wherever the use of a TCP connection is disclosed. The UE 1905 registers (in step 2) with the VANC 1910, using the GA-RC REGISTER REQUEST message. In some embodiments, the message contains: EPS Cell information (i.e. the current camping EPS cell ID); UE IMSI; UE GUTI; and GAN Classmark, including indication of support for VoLGA service.

If the VANC 1910 accepts the registration attempt it may, in some embodiments, initiate (in step 3a) the activation of a dedicated EPS bearer for the VoLGA signaling channel (QCI=5) using the Rx interface to the PCRF, per the procedures in TS 23.401 and 3GPP TS 23.203: "Policy and charging control architecture", incorporated herein by reference and hereinafter, TS 23.203. In some embodiments, the activation of the dedicated EPS bearer allows the PCRF to verify the binding between the received UE IMSI and IP address, since these parameters are provided by the VANC 1910 to the PCRF in the Access Attempt (AA)-Request message per 3GPP TS 29.214, "Policy and Charging Control over Rx Reference Point", incorporated herein by reference and hereinafter, TS 29.214. The VANC 1910 then responds (in step 3b) with a GA-RC REGISTER ACCEPT message. In some embodiments, the message includes VoLGA specific system information, including one or more of the followings: (1) GAN Mode Indicator (A/Gb mode or Iu mode, i.e., VoLGA A-mode or Iu-mode, respectively); (2) location-area identification (LAI) comprising the mobile country code, mobile network code, and location area code corresponding to the VoLGA cell; (3) the GERAN (A-mode) or UTRAN (Iu-mode) cell identity identifying the cell within the location area corresponding to the VoLGA cell; (4) one or more applicable VoLGA system timer values; and (5) a list (i.e., containing one or more entries) of the E-UTRAN tracking areas (TAs) that are served by the VANC 1910. The UE stores the list of the E-UTRAN TAs that are served by the VANC. In some embodiments, the UE 1905 is required to notify the VANC 1910 (see "VoLGA Registration Update" Section, below) when the UE 1905 moves to a new serving E-UTRAN TA that is not in the list. The secure tunnel (optional) and TCP connection are not released and are maintained as long as the UE 1905 is registered to this VANC 1910. If the VoLGA LAI is not the same as the stored GERAN/UTRAN LAI, the UE 1905 performs, in some embodiments, the CS domain location area update procedure via the VoLGA control plane.

Alternatively, the VANC 1910 may reject (in step 4) the request. In this case, it responds with a GA-RC REGISTER REJECT message indicating the reject cause. In some embodiments, the secure tunnel (optional) and TCP connection are released; the UE 1905 may attempt re-discovery and re-registration under certain circumstances.

If the VANC 1910 wishes to redirect the UE 1905 to (another) VANC (not shown), it responds (in step 5) with a GA-RC REGISTER REDIRECT message providing the FQDN or IP address of the target VANC. In this case the secure tunnel (optional) and TCP connection are released and the UE 1905 attempts registration on the new VANC.

3. VoLGA Mode Selection

The UE transfers its VoLGA mode support to the VANC during registration procedure; in some embodiments, in the GAN Classmark IE. VoLGA mode support options are VoLGA A-mode supported, VoLGA Iu-mode supported, or both modes supported. In some embodiments, the VANC uses the received VoLGA mode support information to redirect the UE to a different VANC or a different TCP port on the current VANC. In some embodiments, the VANC also indicates the VoLGA mode to use for the current session. The following table enumerates the VoLGA mode selection procedures for the various combinations of UE and VANC VoLGA mode capabilities:

TABLE 1

VoLGA Mode Selection Procedures Associated with VoLGA Registration

| UE VoLGA mode capabilities | VANC VoLGA mode capabilities | | |
|---|---|---|---|
| | A-mode only | Iu-mode only | Both modes |
| A-mode only | VANC: Accept and indicate VoLGA A-mode UE: Proceed per | VANC: Reject registration UE: Handle per registration reject | VANC: Handle as normal VoLGA A-mode registration. If required, redirect UE |

TABLE 1-continued

VoLGA Mode Selection Procedures Associated with VoLGA Registration

| UE VoLGA mode capabilities | VANC VoLGA mode capabilities | | |
|---|---|---|---|
| | A-mode only | Iu-mode only | Both modes |
| | VoLGA A-mode procedures | procedures | to VoLGA A-mode capable VANC. UE: Proceed per VoLGA A-mode procedures |
| Iu-mode only | VANC: Reject registration UE: Handle per registration reject procedures | VANC: Accept and indicate VoLGA Iu-mode UE: Proceed per VoLGA Iu-mode procedures | VANC: Accept and indicate VoLGA Iu-mode UE: Proceed per VoLGA Iu-mode procedures |
| Both modes | VANC: Accept and indicate VoLGA A-mode UE: Proceed per VoLGA A-mode procedures | VANC: Accept and indicate VoLGA Iu-mode UE: Proceed per VoLGA Iu-mode procedures | VANC: Accept and indicate VoLGA Iu-mode or VoLGA A-mode*. If required, redirect UE to VoLGA Iu-mode or VoLGA A-mode capable VANC. UE: Proceed per VoLGA Iu-mode or VoLGA A-mode procedures |

*The VANC's choice of VoLGA Iu-mode versus VoLGA A-mode may be based on other information received in the VoLGA registration message from the UE, information stored in the VANC, and on operator policy.

B. Rove-Out

When a UE moves out of VANC service area it must rove-out from the VoLGA system. "Rove-out" is the process in which the UE switches the serving RR entity for CS domain services from GA-CSR (VoLGA A-mode) or GA-RRC (VoLGA Iu-mode) to GERAN RR or UTRAN RRC. When the UE roves out, depending on prevailing circumstances, the UE may be able to deregister with the VANC (see "VoLGA Deregistration" Section, below)

1. VoLGA Deregistration

In some embodiments, the VoLGA deregistration procedure allows the UE to explicitly inform the VANC that it is leaving VoLGA mode by sending a GA-RC DEREGISTER message to the VANC. In some embodiments, the VANC supports "implicit VoLGA deregistration"; e.g., when the TCP connection that is used for VoLGA signaling transport is abruptly lost or when the VANC receives the PS to CS Complete Acknowledge message from the MME after the UE has performed handover of the VoLGA voice bearer from EPS to GERAN without DTM support (e.g., see "Handover of Active Call to GERAN Without DTM Handover Support" Section, below).

In some embodiments, the VANC autonomously releases the UE registration context, and sends a GA-RC DEREGISTER message to the UE. In some embodiments, the VANC implicitly deregisters the UE by closing the TCP connection with the UE. In some embodiments, the VANC deletes the stored UE context information.

Some embodiments of VoLGA deregistration can be performed via the following five steps. The UE sends (in step 1) a GA-RC DEREGISTER message to the VANC. This may occur either because the UE performs the IMSI Detach procedure illustrated in the "IMSI Detach" Section below, or the UE has completed PS handover of the VoLGA signaling bearer from EPS to GERAN/UTRAN.

The VANC receives (in step 2) the Forward Relocation Complete Ack message from the MME after the UE has performed handover of the VoLGA voice bearer from EPS to GERAN/UTRAN. In some embodiments, the VANC may wait for a period of time for the GA-RC DEREGISTER message from the UE (i.e., sent from the UE in the new GERAN/UTRAN cell if the VoLGA signaling bearer has also been handed over); on receipt of the GA-RC DEREGISTER message or timeout, the VANC initiates the release of the VoLGA signaling bearer via the Rx interface to the PCRF.

Assume (in step 3) the VANC does not receive a GA-RC KEEPALIVE message from the UE for an extended period of time in some embodiments. This may occur if the UE is directed to move to a GERAN/UTRAN cell and PS handover is not supported (i.e., via EPS to GERAN External NACC). The PCRF signals (in step 4) the VANC (via the Rx interface) that the EPS bearer used for VoLGA signaling has been lost. The VANC decides (in step 5) to deregister the UE for some reason (e.g., OA&M related) and sends a GA-RC DEREGISTER message to the UE. In some embodiments, the VANC deletes the stored UE context information.

Figure 20:
FIG. 20 illustrates VoLGA deregistration initiated by the UE in some embodiments.

FIG. 20 illustrates VoLGA deregistration initiated by the UE in some embodiments. As shown, the UE 2005 sends (in step 1) the GA-RC DEREGISTER message to the VANC 2010, which removes the UE context in the VANC 2010.

Figure 21:
FIG. 21 illustrates VoLGA deregistration initiated by the VANC in some embodiments.

FIG. 21 illustrates VoLGA deregistration initiated by the VANC in some embodiments. Here, the VANC 2110 sends (in step 1) the GA-RC DEREGISTER message to the UE 2105.

2. IMSI Detach

The IMSI Detach procedure occurs when the UE is no longer using VoLGA service, for example, when it powers off. The UE is marked as IMSI detached when the UE completes the IMSI Detach procedure via the VoLGA service and the UE has not registered via GERAN/UTRAN at that time. In some embodiments, the MSC may also mark the UE as IMSI detached if the UE fails to perform the periodic location update procedure.

Figure 22:
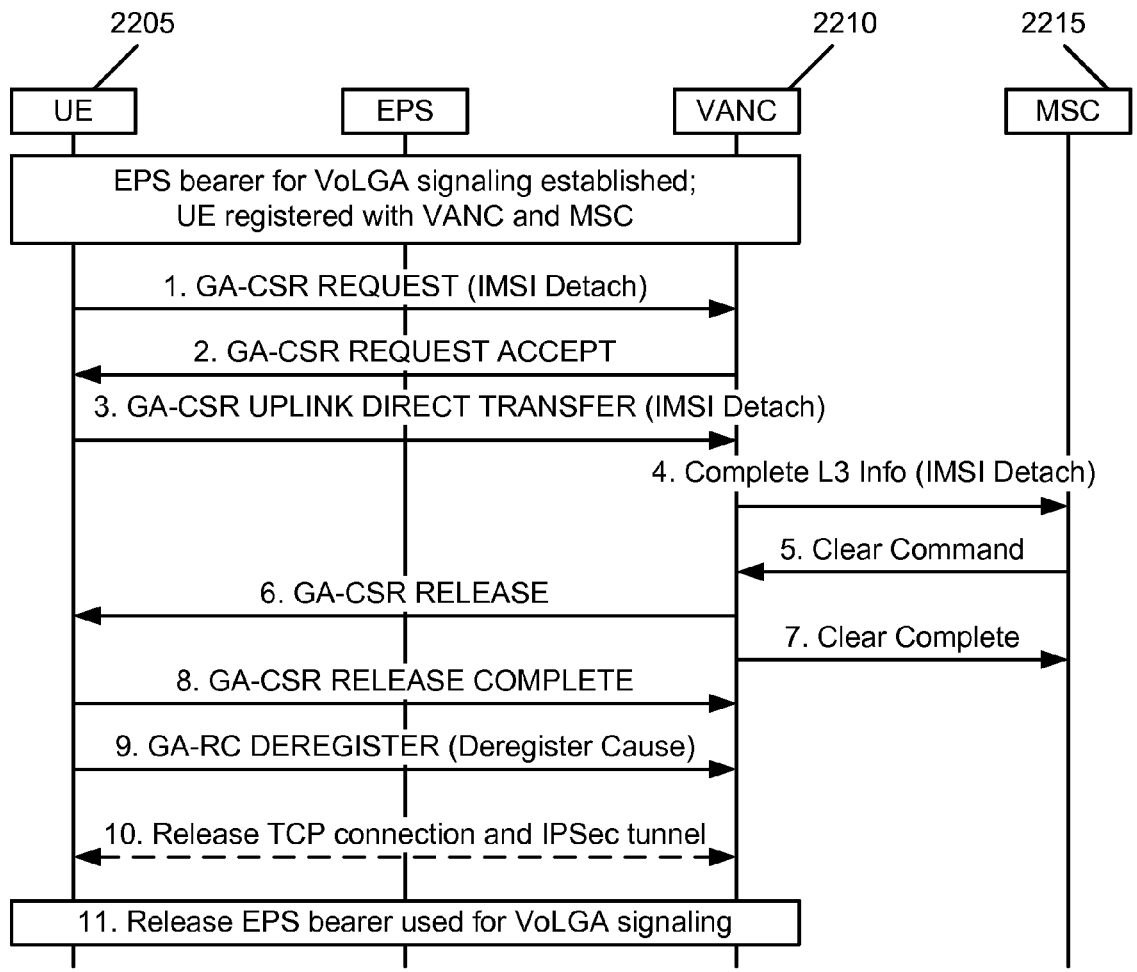
FIG. 22 illustrates an IMSI Detach procedure in some embodiments.

FIG. 22 illustrates an IMSI Detach procedure in some embodiments. Assume the UE is operating in E-UTRAN mode and is registered with the VANC and MSC. As shown, the UE 2205, VANC 2210 and MSC 2215 perform (in steps 1-8) the IMSI Detach procedure via the EPS using the procedures specified in TS 43.318. The UE 2205 sends (in step 9) the GA-RC DEREGISTER message to the VANC 2210 and the VANC 2210 deletes the stored UE context information. The UE 2205 and the VANC 2210 release (in step 10) the TCP connection and IPSec tunnel between them. The VANC 2210 initiates (in step 11) the release of the EPS bearer used for VoLGA signaling using the Rx interface to the PCRF.

C. VoLGA Registration Update

A VoLGA registration update may be necessary when the UE is moving in or out of a particular service area. The VoLGA registration update procedures allow the UE to update information in the VANC, generally location information, by sending a GA-RC REGISTER UPDATE UPLINK message to the VANC carrying the updated information. In some embodiments, this message is sent as a result of the following: The tracking area identity (TAI) of the selected EPS cell is not in the TAI list provided by the VANC in the last GA-RC REGISTER ACCEPT or GA-RC REGISTER UPDATE DOWNLINK message. This may result in (1) no action by the VANC, (2) the VANC redirecting the UE to another VANC, (3) the VANC providing new VoLGA system information (e.g., a new LAI) to the UE, or (4) the VANC deregistering the UE (e.g., based on operator policy).

In some embodiments, the VoLGA registration update procedures also allow the VANC to autonomously update the VoLGA system information in the UE, if needed, by sending a GA-RC REGISTER UPDATE DOWNLINK message to the UE carrying the updated information.

Figure 23:
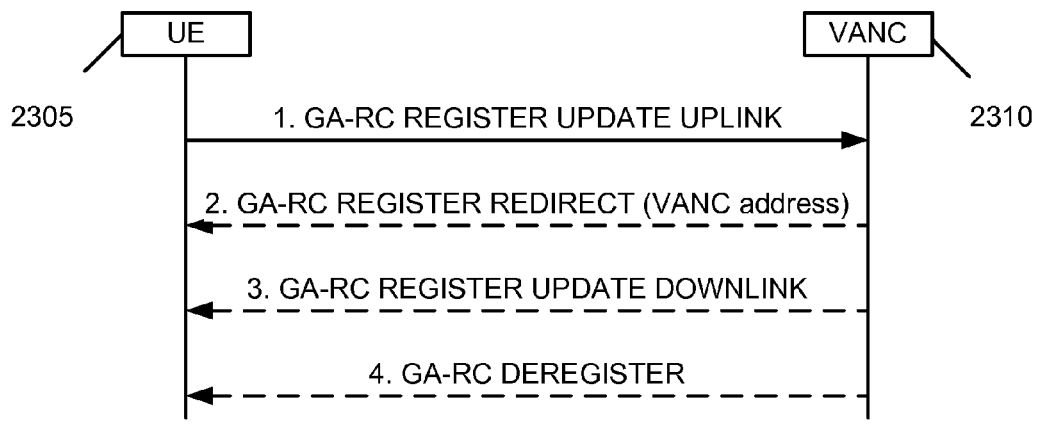
FIG. 23 illustrates the VoLGA registration update uplink in some embodiments.

FIG. 23 illustrates the VoLGA registration update uplink in some embodiments. As shown, when the UE 2305 detects any of the conditions listed above, it sends (in step 1) the GA-RC REGISTER UPDATE UPLINK message to the VANC 2310 with the updated information. The VANC 2310 may send the GA-RC REGISTER REDIRECT message (in step 2) when it wants to redirect the UE 2305 based on updated information, the GA-RC REGISTER UPDATE DOWNLINK message (in step 3) when it wants to provide new system information to the UE 2305, or the VANC 2310 may deregister (in step 4) the UE 2305 by sending the GA-RC DEREGISTER message to the UE 2305.

Figure 24:
FIG. 24 illustrates the VoLGA registration update downlink in some embodiments.

FIG. 24 illustrates the VoLGA registration update downlink in some embodiments. Here, the VANC 2410 sends (in step 1) the GA-RC REGISTER UPDATE DOWNLINK message with the updated system information to the UE 2405. The system information includes one or more of the followings: (1) GAN Mode Indicator (A/Gb mode or Iu mode, i.e., VoLGA A-mode or Iu-mode, respectively); (2) location-area identification (LAI) comprising the mobile country code, mobile network code, and location area code corresponding to the VoLGA cell; (3) the GERAN (A-mode) or UTRAN (Iu-mode) cell identity identifying the cell within the location area corresponding to the VoLGA cell; (4) applicable VoLGA system timer values; and (5) a list (i.e., containing one or more entries) of the E-UTRAN tracking areas (TAs) that are served by the VANC.

D. GA-CSR Connection Handling

The GA-CSR connection is a logical connection between the UE and the VANC for the CS domain. It is established when the upper layers in the UE request GA-CSR to enter dedicated mode. When a successful response is received from the network, GA-CSR replies to the upper layer that it has entered dedicated mode. The upper layers then have the possibility to request transmission of NAS messages to the network.

Figure 25:
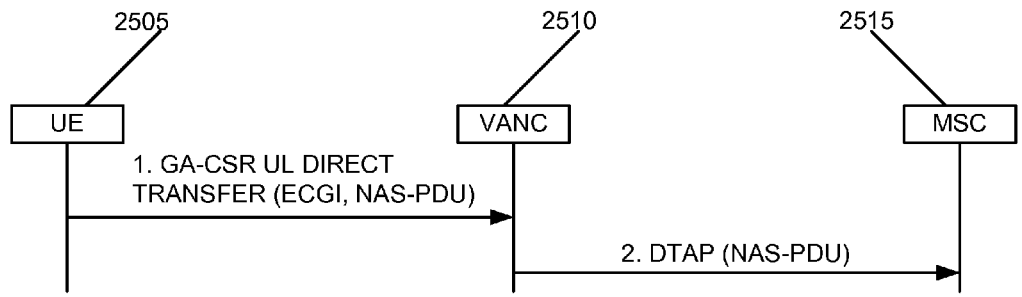
FIG. 25 illustrates UE-to-MSC NAS signaling in some embodiments.

FIG. 25 illustrates UE-to-MSC NAS signaling in some embodiments. As shown, for UE-initiated NAS signaling (including SMS), the UE GA-CSR entity 2505 receives a request from the NAS layer to transfer an uplink NAS Protocol Data Unit (PDU). The UE GA-CSR entity 2505 encapsulates (in step 1) the NAS PDU within a GA-CSR UPLINK (UL) DIRECT TRANSFER message and sends the message to the VANC 2510. If this is the first GA-CSR UPLINK (UL) DIRECT TRANSFER message sent by the UE to the VANC after the establishment of the GA-CSR connection, then the UE also includes the Evolved Cell Global Identifier (ECGI) (i.e., the identity of the serving E-UTRAN cell) in the message. As described in FIG. 10 above, there is a direct interface 1050 between the GA layer 3 protocols 1010 and the E-UTRAN RRC layer 1055 in the UE architecture. This interface is used, through this Specification, when the GA layer 3 requests the current ECGI from the E-UTRAN RRC. The VANC 2510 extracts (in step 2) the NAS PDU, encapsulates it within a DTAP message and sends the message to the MSC 2515. If the message includes the ECGI, in some embodiments, the VANC 2510 maps the ECGI value provided by the UE2505 into a corresponding GERAN CGI value and sends this CGI value to the MSC 2515.

E. Mobile-Originated (MO) Call (A-mode)

This section describes a call setup procedure when a UE operator makes a call. The description of the procedure in this section assumes the UE is in VoLGA A-mode; i.e., it has successfully registered with the VANC and GA-CSR is the serving RR entity for CS services in the UE. It also assumes that no GA-CSR signaling connection exists between the UE and the VANC; i.e., the GA-CSR entity in the UE is in the GA-CSR-IDLE state. If the GA-CSR entity in the UE is already in the GA-CSR-DEDICATED state, steps 1-2 are skipped.

Figure 26:
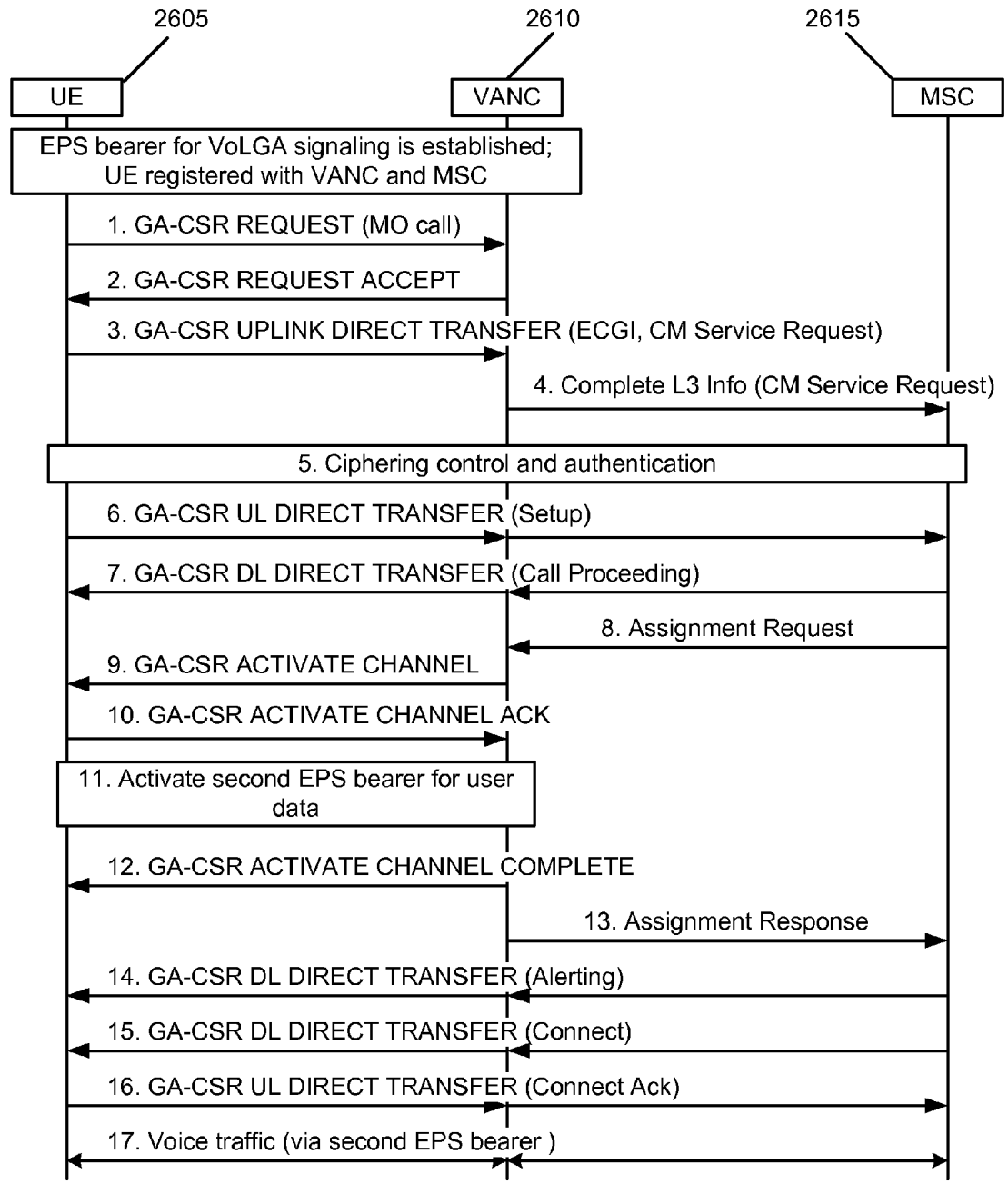
FIG. 26 illustrates the procedure for a mobile-originated call setup in A-mode in some embodiments.

FIG. 26 illustrates the procedure for a mobile-originated call setup in A-mode in some embodiments. As shown, the GA-CSR connection establishment procedure is performed (in step 1) as described in the "GA-CSR Connection Establishment" Section above. Upon request from the upper layers, the UE 2605 sends (in step 2) the CM Service Request to the VANC 2610 in the GA-CSR UL DIRECT TRANSFER message. The UE also includes the current ECGI value, as described in the "GA-CSR Connection Establishment" Section above. The VANC 2610 maps the ECGI value provided by the UE2605 into a corresponding GERAN CGI value, establishes (in step 3) an signaling connection control part (SCCP) connection to the MSC 2615 and forwards the CGI and CM Service Request to the MSC 2615 using the BSS-MAP Complete Layer 3 Information message. In some embodiments, subsequent layer 3 messages between the UE 2605 and the MSC 2615 are sent between the VANC 2610 and MSC 2615 via DTAP. In some embodiments, the MSC 2615 authenticates (in step 4) the UE 2605 using standard GSM authentication procedures. In some embodiments, the MSC 2615 initiates (in step 5) a Ciphering Configuration procedure as described in TS 43.318.

The UE 2605 sends (in step 6) the Setup message providing details on the call to the MSC 2615 and its bearer capability and supported codecs. In some embodiments, this message is contained within the GA-CSR UL DIRECT TRANSFER message between the UE 2605 and the VANC 2610. In some embodiments, the VANC 2610 forwards the Setup message to the MSC 2615. The MSC 2615 indicates (in step 7) it has received the call setup and it will accept no additional call-establishment information using the Call Proceeding message to the VANC 2610. In some embodiments, the VANC 2610 forwards this message to the UE 2605 in the GA-CSR DL DIRECT TRANSFER message. The MSC 2615 requests (in step 8) the VANC 2610 to assign call resources using the BSSMAP Assignment Request message.

The VANC 2610 sends (in step 9) the GA-CSR ACTIVATE CHANNEL message to the UE 2605 including, in some embodiments, bearer path setup information such as: channel mode; multi-rate codec configuration; UDP port and the IP address for the uplink real-time transport protocol (RTP) stream; and voice sample size.

The UE 2605 establishes (in step 10) the RTP path to the VANC 2610. In some embodiments, the UE 2605 sends idle RTPJUDP packets to the VANC 2610 but has not connected the user to the audio path. In some embodiments, the UE 2605 sends the GA-CSR ACTIVATE CHANNEL ACK to the VANC 2610 indicating the UDP port for the downlink RTP stream. On receipt of the GA-CSR ACTIVATE CHANNEL ACK message from the UE 2605, the VANC 2610 initiates (in step 11) the activation of a second EPS bearer for the CS voice call using the Rx interface to the PCRF. The VANC 2610 establishes (in step 12) the downlink RTP path between the VANC 2610 and the UE 2605. In some embodiments, the VANC 2610 starts sending idle RTP/UDP packets to the UE 2605. In some embodiments, the VANC 2610 signals the completion of the bearer path to the UE 2605 with the GA-CSR ACTIVATE CHANNEL COMPLETE message. The VANC 2610 signals (in step 13) to the MSC 2615 that the call resources have been allocated by sending a BSSMAP Assignment Complete message.

The MSC 2615 signals (in step 14) to the UE 2605, with the Alerting message, that the called party is ringing. In some embodiments, the message is transferred to the VANC 2610 and the VANC 2610 forwards the message to the UE 2605 in the GA-CSR DL DIRECT TRANSFER. In some embodiments, if the UE 2605 has not connected the audio path to the user, it generates ring back to the calling party. Otherwise, the network-generated ring back will be returned to the calling party. The MSC 2615 signals (in step 15) that the called party has answered, via the Connect message. In some embodiments, the message is transferred to the VANC 2610 and the VANC 2610 forwards the message to the UE 2605 in the GA-CSR DL DIRECT TRANSFER. The UE 2605 connects the user to the audio path. In some embodiments, if the UE 2605 is generating ring back, it stops and connects the user to the audio path.

The UE 2605 sends (in step 16) the Connect Ack in response, and the two parties are connected for the voice call. In some embodiments, this message is contained within the GA-CSR UL DIRECT TRANSFER between the UE 2605 and the VANC 2610. The VANC 2610 forwards the Connect Ack message to the MSC 2615. Bi-directional voice traffic flows (in step 17) between the UE 2605 and MSC 2615 through the VANC 2610.

F. Mobile-Terminated (MT) Call (A-mode)

Figure 27:
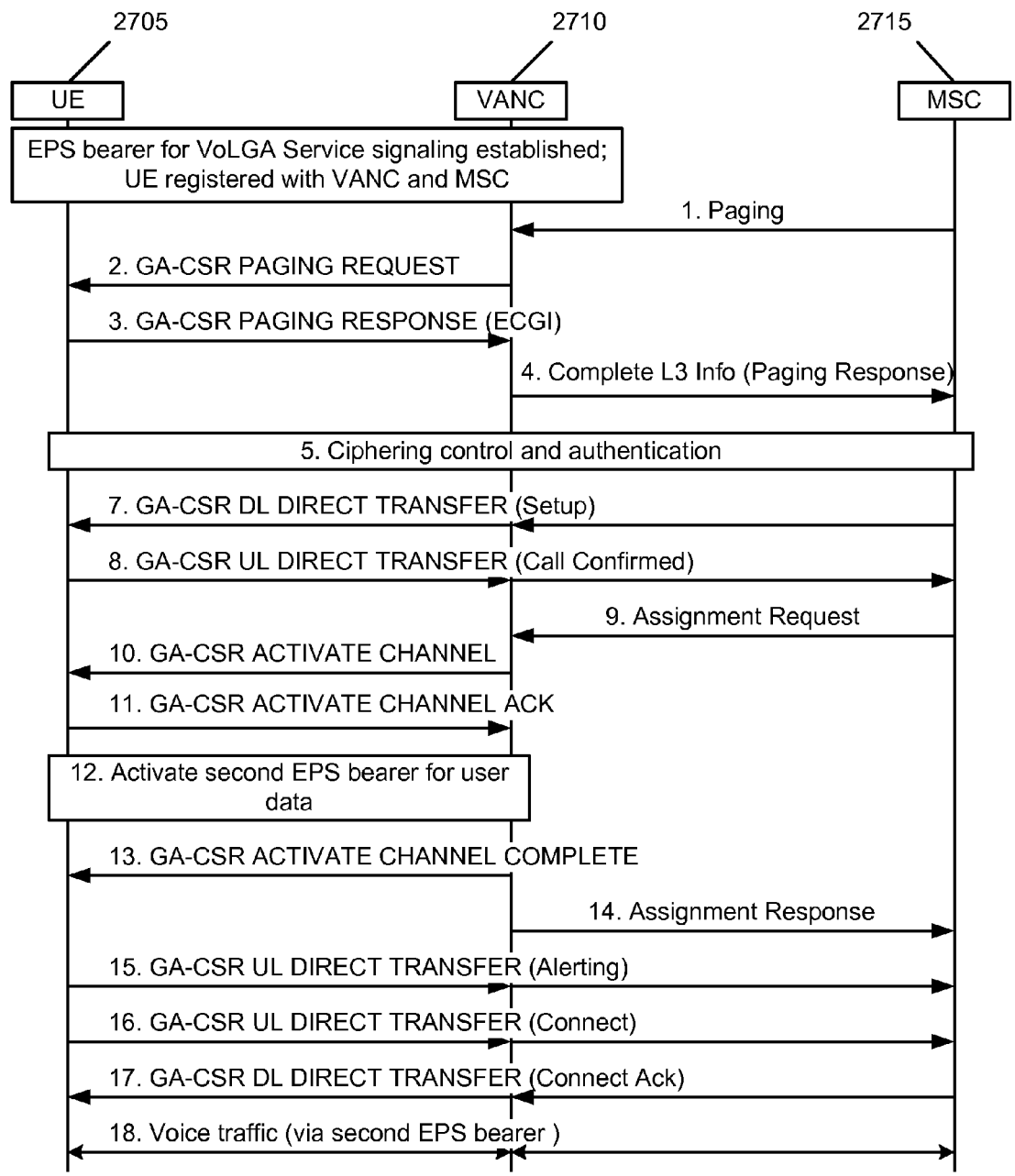
FIG. 27 illustrates the mobile-terminated call setup procedure in A-mode, in some embodiments.

This section discusses the call setup procedure when a UE receives a call originating from the core network. The description of the procedure in this section assumes the UE is in VoLGA A-mode; i.e., it has successfully registered with the VANC and GA-CSR is the serving RR entity for CS services in the UE. FIG. 27 illustrates the mobile-terminated call setup in A-mode procedure in some embodiments.

As shown, a mobile-terminated call arrives (in step 1) at the MSC 2715. In some embodiments, the MSC 2715 sends a BSSMAP Paging message to the VANC 2710 identified through the last Location Update received by the MSC 2715 and includes the temporary mobile subscriber identity (TMSI) if available. In some embodiments, the IMSI of the UE being paged is always included in the request. The VANC 2710 identifies (in step 2) the UE registration context using the IMSI provided by the MSC 2715. In some embodiments, it then pages the UE 2705 using the GA-CSR PAGING REQUEST message. The message includes the TMSI, if available in the request from the MSC 2715; otherwise, the MSC 2715 includes only the IMSI of the UE 2705.

The UE 2705 responds (in step 3) with a GA-CSR PAGING RESPONSE message including, in some embodiments, the Evolved Cell Global Identifier (ECGI) (i.e., the identity of the serving E-UTRAN cell), the MS Classmark and Ciphering Key Sequence Number. The UE 2705 enters dedicated mode and the GA-CSR state changes to GA-CSR-DEDICATED. The VANC 2710 maps the ECGI value provided by the UE2605 into a corresponding GERAN CGI value, establishes (in step 4) an SCCP connection to the MSC 2715. The VANC 2710 then forwards the paging response and the CGI value to the MSC 2715 using the BSSMAP Complete Layer 3 Information message. In some embodiments, the MSC 2715 may authenticate (in step 5) the UE 2705 using standard GSM authentication procedures. In some embodiments, the MSC 2715 may optionally update (in step 6) the ciphering configuration in the UE 2705, via the VANC 2710 as described in TS 43.318.

The MSC 2715 initiates (in step 7) call setup using the Setup message sent to the UE 2705 via the VANC 2710. In some embodiments, the VANC 2710 forwards this message to the UE 2705 in the GA-CSR DL DIRECT TRANSFER message. The UE 2705 responds (in step 8) with Call Confirmed in the GA-CSR UL DIRECT TRANSFER message after checking its compatibility with the bearer service requested in the Setup and modifying the bearer service as needed. In some embodiments, if the Setup included the signal information element, the UE 2705 alerts the user using the indicated signal; otherwise, the UE 2705 alerts the user after the successful configuration of the user plane. In some embodiments, the VANC 2710 forwards the Call Confirmed message to the MSC 2715.

The MSC 2715 initiates (in steps 9-14) the assignment procedure with the VANC 2710, which triggers the setup of the RTP stream (voice bearer channel) between the VANC 2710 and UE 2705, same as steps 8-13 in the MO call scenario in the "Mobile-Originated (MO) Call (A-mode)" Section above. The UE 2705 signals (in step 15) that it is alerting the user, via the Alerting message contained in the GA-CSR UL DIRECT TRANSFER. In some embodiments, the VANC 2710 forwards the Alerting message to the MSC 2715. The MSC 2715 sends a corresponding alerting message to the calling party. The UE 2705 signals (in step 16) that the called party has answered, via the Connect message contained in the GA-CSR UL DIRECT TRANSFER. The VANC 2710 forwards the Connect message to the MSC 2715. The MSC 2715 sends a corresponding Connect message to the calling party and through connects the audio. The UE 2705 connects the user to the audio path.

The MSC 2715 acknowledges (in step 17) via the Connect Ack message to the VANC 2710. The VANC 2710 forwards this message to the UE 2705 in the GA-CSR DL DIRECT TRANSFER. The two parties on the call are connected on the audio path. Bi-directional voice traffic flows (in step 18) between the ULE 2705 and MSC 2715 through the VANC 2710.

G. Call Clearing (A-Mode)

Figure 28:
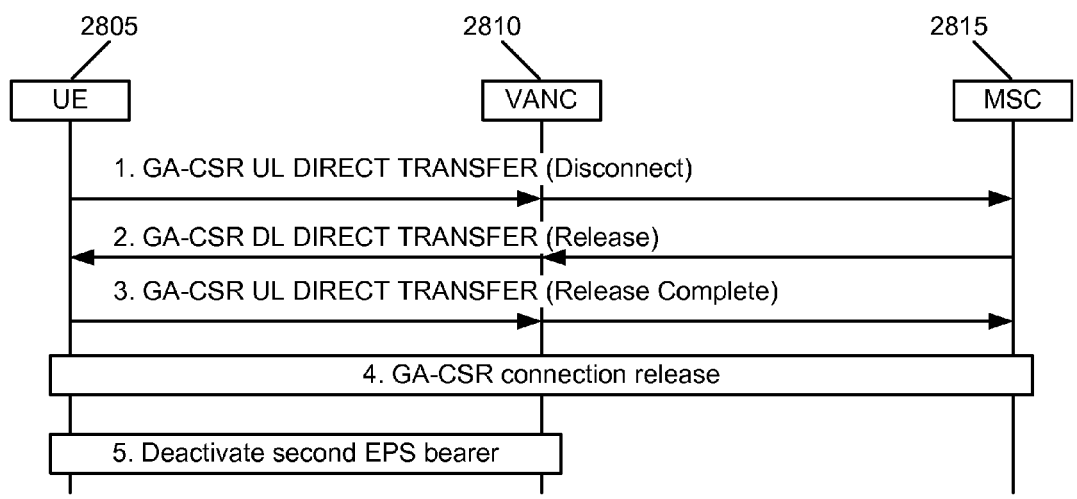
FIG. 28 illustrates the call clearing initiated by the UE in A-mode procedure in some embodiments.

This section describes how the system disconnects the UE from the core network at the termination of a call. FIG. 28 illustrates the call clearing initiated by the UE in A-mode procedure in some embodiments. Here, the UE 2805 sends (in step 1) the Disconnect message to the MSC 2815 to release the call. This message is contained in the GA-CSR UL DIRECT TRANSFER message between the UE 2805 and the VANC 2810. The VANC 2810 forwards the Disconnect message to the MSC 2815. The MSC 2815 responds (in step 2) with a Release message to the VANC 2810. The VANC 2810 forwards this message to the UE 2805 using the GA-CSR DL DIRECT TRANSFER message.

The UE 2805 responds (in step 3) with the Release Complete message. This message is contained within the GA-CSR UL DIRECT TRANSFER message between the UE 2805 and the VANC 2810. The VANC 2810 forwards the Release Complete message to the MSC 2815. The MSC 2815 triggers (in step 4) the release of connection. The VANC 2810 initiates (in step 5) the deactivation of the second EPS bearer for the CS voice call using the Rx interface to the PCRF.

H. Handover (A-Mode)

1. Handover From E-UTRAN to GERAN

Handover is the switching of an in-progress call from one radio channel to another which is done to ensure that the most suitable radio path is allocated through the life of the call. It should be noted that DTM stands for Dual-Transfer Mode, which is a protocol that allows for simultaneous transfer of CS and PS data over the same GERAN radio channel (notably the absolute radio frequency channel number [ARFCN]). The following table summarizes the eNodeB behavior related to handover and cell change to GERAN:

TABLE 2

Scenarios for Handover and Cell Change to GERAN

| Scenario | VoIP bearer active for VoLGA? | Target GERAN supports: PS HO? | DTM HO? | Source eNodeB initiates: |
|---|---|---|---|---|
| 1 | No | No | No | NACC |
| 2 | No | No | Yes | n/a |
| 3 | No | Yes | No | PS Handover |
| 4 | No | Yes | Yes | PS Handover |
| 5 | Yes | No | No | CS Handover (VoIP bearer only) |
| 6 | Yes | No | Yes | n/a |
| 7 | Yes | Yes | No | CS Handover (VoIP bearer only) |
| 8 | Yes | Yes | Yes | CS + PS Handover (All bearers) |

Scenario 1 is illustrated in the "Network Assisted Cell Change (NACC) from E-UTRAN to GERAN" Section, below. Scenarios 2 and 6 are not possible since the target GERAN must support PS handover if it supports DTM handover. Scenarios 3 and 4 are described in the "Handover with No Active Call" Section, below. Scenarios 5 and 7 are illustrated in the "Handover of Active Call to GERAN without DTM Handover Support" Section, below. Scenario 8 is illustrated in the "Handover of Active Call with DTM Handover Support" Section, below.

a. Handover of Active Call to GERAN without DTM Handover Support

Figure 29:
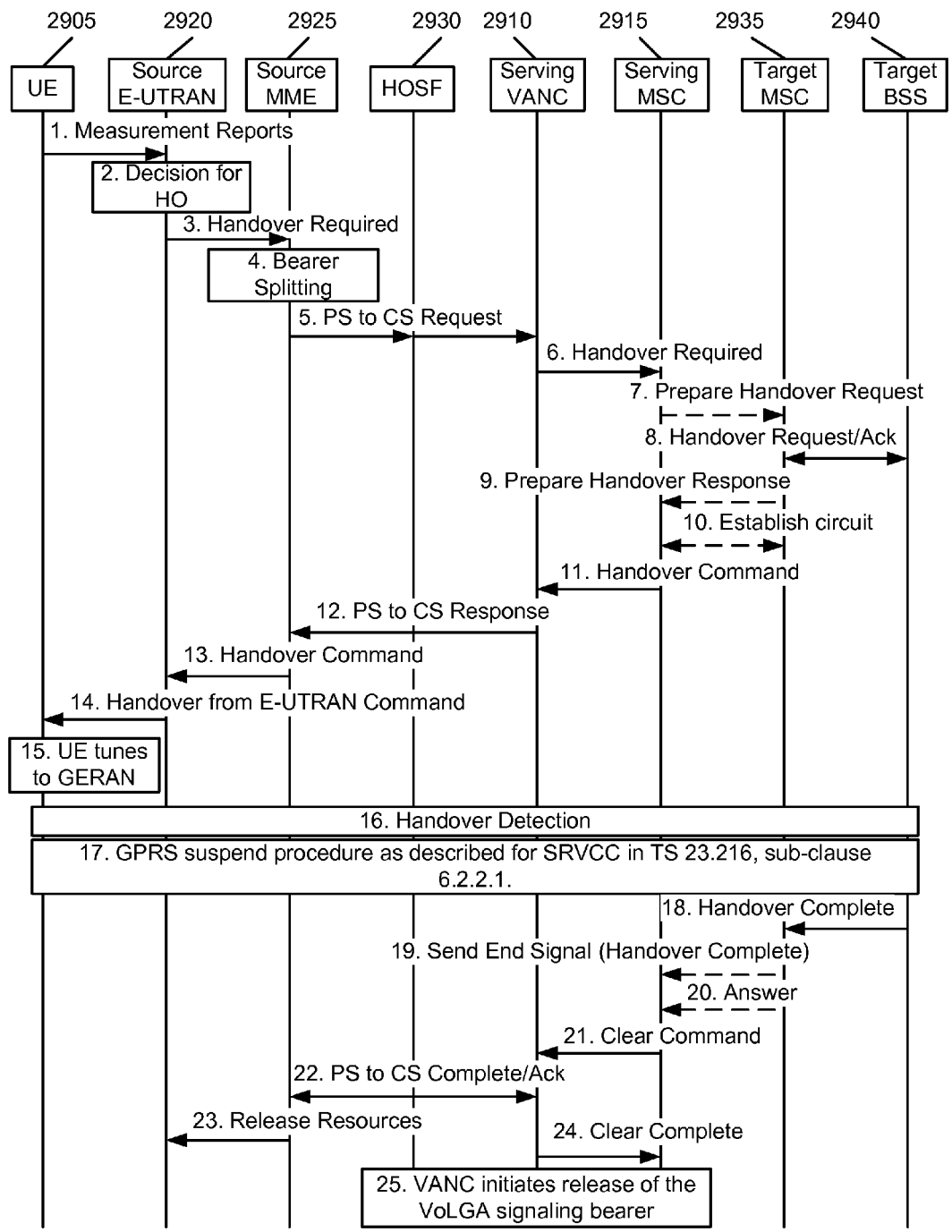
FIG. 29 illustrates another VoLGA call handover from E-UTRAN to GERAN procedure, assuming DTM handover is not supported in the target GERAN, in some embodiments.

FIG. 29 illustrates another VoLGA call handover from E-UTRAN to GERAN procedure, assuming DTM handover is not supported in the target GERAN, in some embodiments. This figure includes: the UE 2905; the (source) E-UTRAN 2920; the Serving VANC 2910; the Serving MSC 2915; the Source MME 2925, Handover Selection Function (HOSF) 2930; Target MSC 2935; and Target BSS 2940. It is assumed a VoLGA call is established.

As shown, the UE 2905 sends (in step 1) measurement reports to E-UTRAN 2920. Based on UE measurement reports, the source E-UTRAN 2920 decides (in step 2) to trigger an SRVCC handover to GERAN. The Source E-UTRAN 2920 sends (in step 3) a Handover Required (Target ID, generic Source to Target Transparent Container) message to the source MME 2925. In some embodiments, the E-UTRAN 2920 places the "old BSS to new BSS transparent container" for the CS domain in the generic Source to Target Transparent Container. In some embodiments, the container type also indicates to the MME 2925 that this is a SRVCC handover operation only towards the CS domain.

Based on the QCI associated with the voice bearer (QCI 1) and the SRVCC handover indication, the source MME 2925 splits (in step 4) the voice bearer from the non voice bearers and initiates the PS-CS handover procedure for the voice bearer only towards the HOSF 2930. The MME 2925 sends (in step 5) a SRVCC PS to CS Request (in some embodiments, comprising STN-SR, MSISDN, generic Source to Target Transparent Container, MM Context) message to the HOSF 2930. In some embodiments, the HOSF is selected based on the Target ID received in the Handover Required message. In some embodiments, the MME received STN-SR and MSISDN from the HSS as part of the subscription profile downloaded during the E-UTRAN attach procedure. The MM Context contains security related information. The CS security key is derived by the MME from the E-UTRAN/EPS domain key as defined in 3GPP TS 33.401, "System Architecture Evolution (SAE); Security Architecture", incorporated herein by reference, and hereinafter, TS 33.401. The CS security key is sent in the MM Context. In some embodiments, the HOSF 2930 forwards the SRVCC PS to CS Request to the current serving VANC 2910, without modifying the message content. The procedure by which the HOSF 2930 determines the current serving VANC 2910 is described in FIG. 46 and accompanying description.

The VANC 2910 converts (in step 6) the SRVCC PS to CS Request into a CS handover request by sending a BSSMAP Handover Required message to the Serving MSC 2915. If the target MSC 2935 is not the same as the serving MSC 2915, the serving MSC 2915 initiates (in step 7) a CS inter-MSC handover request by sending a Prepare Handover Request message to the target MSC 2935. If the target MSC 2935 is the same as the serving MSC 2915, then the inter-MSC signaling shown in the figure is not used.

The target MSC 2935 performs (in step 8) resource allocation with the target BSS 2940 by exchanging Handover Request/Acknowledge messages. The target MSC 2935 sends (in step 9) a Prepare Handover Response message to the serving MSC 2915. A circuit connection is established (in step 10) between the target MSC 2935 and the serving MSC 2915; e.g., using ISUP IAM and ACM messages. The serving MSC 2915 sends (in step 11) a BSSMAP Handover Command message to the VANC 2910, containing the GERAN RRC Handover Command message encapsulated in the "Layer 3 Information" IE.

The VANC 2910 sends (in step 12) a SRVCC PS to CS Response (Target to Source Transparent Container) message to the source MME 2925. In some embodiments, the VANC 2910 gets the source MME address from the IE 'MME/SGSN Sv Address for Control Plane' received in the SRVCC PS to CS Request. In some embodiments, the VANC 2910 includes its Sv interface IP address in the IE 'MSC Server Sv Address for Control Plane'; this allows subsequent Sv messaging for the handover to bypass the HOSF 2930. In some embodiments, the source MME 2925 knows that at the end of the PS-CS handover the non-GBR bearers should be preserved.

The source MME 2925 sends (in step 13) a Handover Command (Target to Source Transparent Container) message to the source E-UTRAN 2920. In some embodiments, the message includes information about the voice component only. The source E-UTRAN 2920 sends (in step 14) a Handover from E-UTRAN Command message to the UE 2905. The UE 2905 tunes (in step 15) to the target GERAN cell (not shown). Handover detection at the target BSS 2940 occurs (in step 16).

The UE 2905 performs (in step 17) the GPRS Suspend procedure specified in TS 23.216 sub-clause 6.2.2.1. The target BSS 2940 sends (in step 18) a Handover Complete message to the target MSC 2935. The target MSC 2935 sends (in step 19) a Send End Signal (Handover Complete) message to the serving MSC 2915. The speech circuit is through connected in the serving MSC 2915 according to 3GPP TS 23.009, "Handover Procedures", incorporated herein by reference, and hereinafter, TS 23.009. The establishment procedure is completed (in step 20) with the ISUP Answer message to the serving MSC 2915 according to TS 23.009.

The serving MSC 2915 sends (in step 21) a Clear Command message to the VANC 2910 to request release of the resources allocated for the call. The VANC 2910 sends (in step 22) a SRVCC PS to CS Complete Notification message to the source MME 2925, informing it that the UE 2905 has arrived on the target side. In some embodiments, the source MME 2925 acknowledges the information by sending a SRVCC PS to CS Complete Acknowledge message to the VANC 2910.

The source MME 2925 releases (in step 23) the E-UTRAN resources allocated to the UE 2905. The VANC 2910 sends (in step 24) the Clear Complete message to the serving MSC 2915 indicating that the VANC 2910 has released the resources allocated for the call. The VANC 2910 initiates (in step 25) the release of the VoLGA signaling bearer via the Rx interface to the PCRF, which is done according to the "IP-CAN Session Modification; PCRF initiated" procedure as specified in TS 23.203.

In some embodiments, after the CS voice call is terminated and if the UE is still in GERAN, then (as specified in TS 23.060) the UE resumes PS services by sending a Routing Area Update Request message to the SGSN. In some embodiments, the Update Type depends on the mode of operation of the GERAN network; e.g., in mode I a Combined routing area/location area (RA/LA) Update is used and in mode II or III Routing Area Update is used. In some embodiments, from the perspective of the UE, the E-UTRAN and the MME, this flow is identical to the SRVCC handover flow as specified in 3GPP TS 23.216.

b. Handover of Active Call to GERAN with DTM Handover Support

Figure 30:
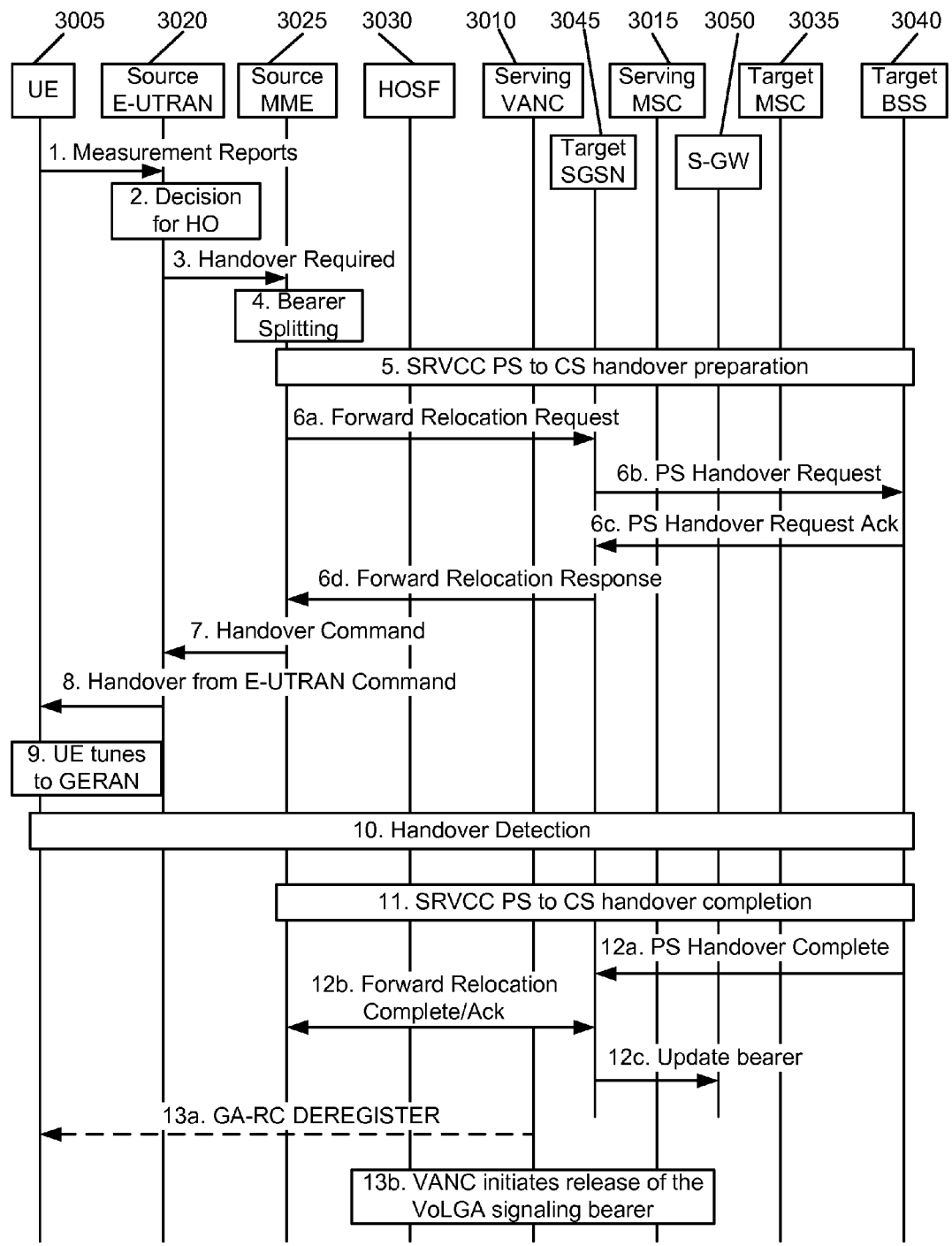
FIG. 30 illustrates a VoLGA call handover from E-UTRAN to GERAN procedure, assuming DTM handover is supported in the target GERAN, in some embodiments.

FIG. 30 illustrates a VoLGA call handover from E-UTRAN to GERAN procedure, assuming DTM handover is supported in the target GERAN, in some embodiments. This figure includes: the UE 3005; the (source) E-UTRAN 3020; the Serving VANC 3010; the Serving MSC 3015; the Source MME 3025, HOSF 3030; Target MSC 3035; Target BSS 3040; Target SGSN 3045; and S-GW 3050. It is assumed a VoLGA call is established.

As shown, Steps 1-2 are the same as for the procedure illustrated in FIG. 29 found in the "Handover of Active Call to GERAN without DTM Handover Support" Section, above. The source E-UTRAN 3010 sends (in step 3) a Handover Required message (In some embodiments, comprising Target ID, generic Source to Target Transparent Container, additional Source to Target Transparent Container) to the source MME 3025. In some embodiments, the E-UTRAN 3020 places the "old BSS to new BSS transparent container" for the CS domain in the additional Source to Target Transparent Container.

Based on the QCI associated with the voice bearer (QCI 1) and the handover indication (e.g. number of containers and HO indication), the source MME 3025 splits (in step 4) the voice bearer from all other PS bearers and initiates their relocation towards the HOSF 3030 and SGSN 3045, respectively. The SRVCC PS to CS handover preparation procedure is performed (in step 5), as described in TS 23.216.

In parallel with the SRVCC PS to CS handover preparation procedure, the source MME 3025 initiates (in step 6) relocation of the remaining non-voice PS bearers. In some embodiments, the following four steps are performed (for details see TS 23.401 clauses 5.5.2.1 and 5.5.2.3). Source MME 3025 sends (in step 6*a*) a Forward Relocation Request (in some embodiments comprising Source to Target Transparent Container, MM Context, PDP Context) message to the target SGSN 3045. The PDP Context includes information for the non-voice component only. The handling of security keys for PS handover of the remaining non-voice PS bearers is specified in TS 33.401. Target SGSN 3045 requests (in step 6*b*) resource allocation for the PS relocation by sending the PS Handover Request (Source to Target Transparent Container) message to the target BSS 3040. After the target BSS 3040 receives both the CS handover request with the PS handover request, it assigns (in step 6*c*) the appropriate CS and PS resources. In some embodiments, the target BSS 3040 acknowledges the prepared PS handover by sending the PS Handover Request Acknowledge (Target to Source Transparent Container) message to the target SGSN 3045. The target SGSN 3045 sends (in step 6*d*) a Forward Relocation Response (Target to Source Transparent Container) message to the source MME 3025.

The source MME 3025 synchronizes (in step 7) the two prepared relocations and sends a Handover Command (Target to Source Transparent Container) message to the source E-UTRAN 3020. In some embodiments, when the target cell is GERAN, the MME may receive different Target to Source Transparent Containers from the VANC and from the SGSN, i.e. a "New BSS to Old BSS Information" (see 3GPP TS 48.008, "Mobile-Services Switching Centre—Base State System, (MSC-BSS) Interface; Layer 3 Specification", incorporated herein by reference, and hereinafter TS 48.008) may be received from the VANC and a "Target BSS to Source BSS Transparent Container" (see 3GPP TS 48.018, "GPRS; Base Station System (BSS)-Serving GPRS Support Node; BSS GPRS Protocol", incorporated herein by reference, and hereinafter, TS 48.018) may be received from the SGSN.

The E-UTRAN 3020 sends (in step 8) a Handover from E-UTRAN Command message to the UE 3005. The UE 3005 tunes (in step 9) to the target GERAN cell (not shown). Handover detection at the target BSS 3040 occurs (in step 10). The SRVCC PS to CS handover completion procedure is performed (in step 11), as described in steps 18-24 related to FIG. 29 in the, "Handover of Active Call to GERAN without DTM Handover Support" Section, above.

In some embodiments, parallel to the previous step, the PS handover is completed and the following 3 steps are performed. The target BSS 3040 sends (in step 12*a*) a PS Handover Complete message to the target SGSN 3045. The target SGSN 3045 sends (in step 12*b*) a Forward Relocation Complete message to the source MME 3025. The source MME 3025 acknowledges the information by sending a Forward Relocation Complete Acknowledge message to the target SGSN 3045. The target SGSN 3045 updates (in step 12*c*) the bearer with the S-GW 3050 as specified in TS 23.401. The VANC 3010 may deregister (in step 13) the UE 3005 immediately or after some period of time. If so, the VANC 3010 sends the GA-RC DEREGISTER message to the UE 3005 and initiates the release of the VoLGA signaling bearer via the Rx interface to the PCRF.

C. Handover with No Active Call (A-Mode)

If the UE moves from E-UTRAN to GERAN/UTRAN while there is no active VoIP bearer for a VoLGA call, the VoLGA signaling bearer path may be handed over (e.g., if PS handover is supported) or may be released. In either case, the VANC performs VoLGA service deregistration for the UE.

Figure 31:
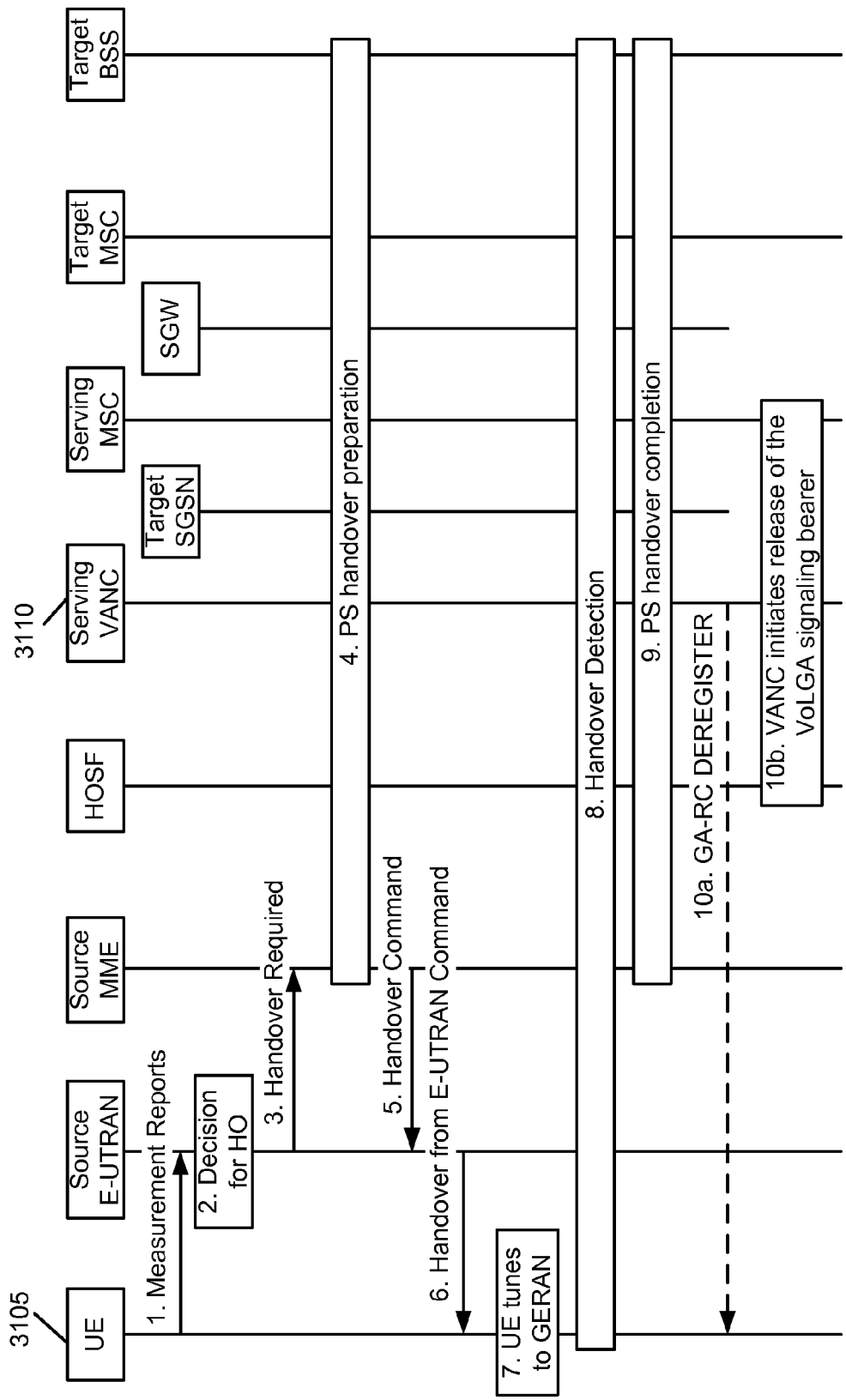
FIG. 31 illustrates the handover of the VoLGA signaling channel from E-UTRAN to GERAN (i.e. no active call), in some embodiments.

FIG. 31 illustrates the handover of the VoLGA signaling channel from E-UTRAN to GERAN (i.e. no active call), in some embodiments. As shown, the active PS bearers are relocated (in steps 1-9) to GERAN per the procedures described in TS 23.401. The VANC 3110 may deregister (in step 10) the UE 3105 immediately or after some period of time. If so, the VANC 3110 sends (in step 10*a*) the GA-RC DEREGISTER message to the UE 3105 and initiates (in step 10*b*) the release of the VoLGA signaling bearer via the Rx interface to the PCRF.

d. Network Assisted Cell Change (NACC) from E-UTRAN to GERAN

Figure 32:
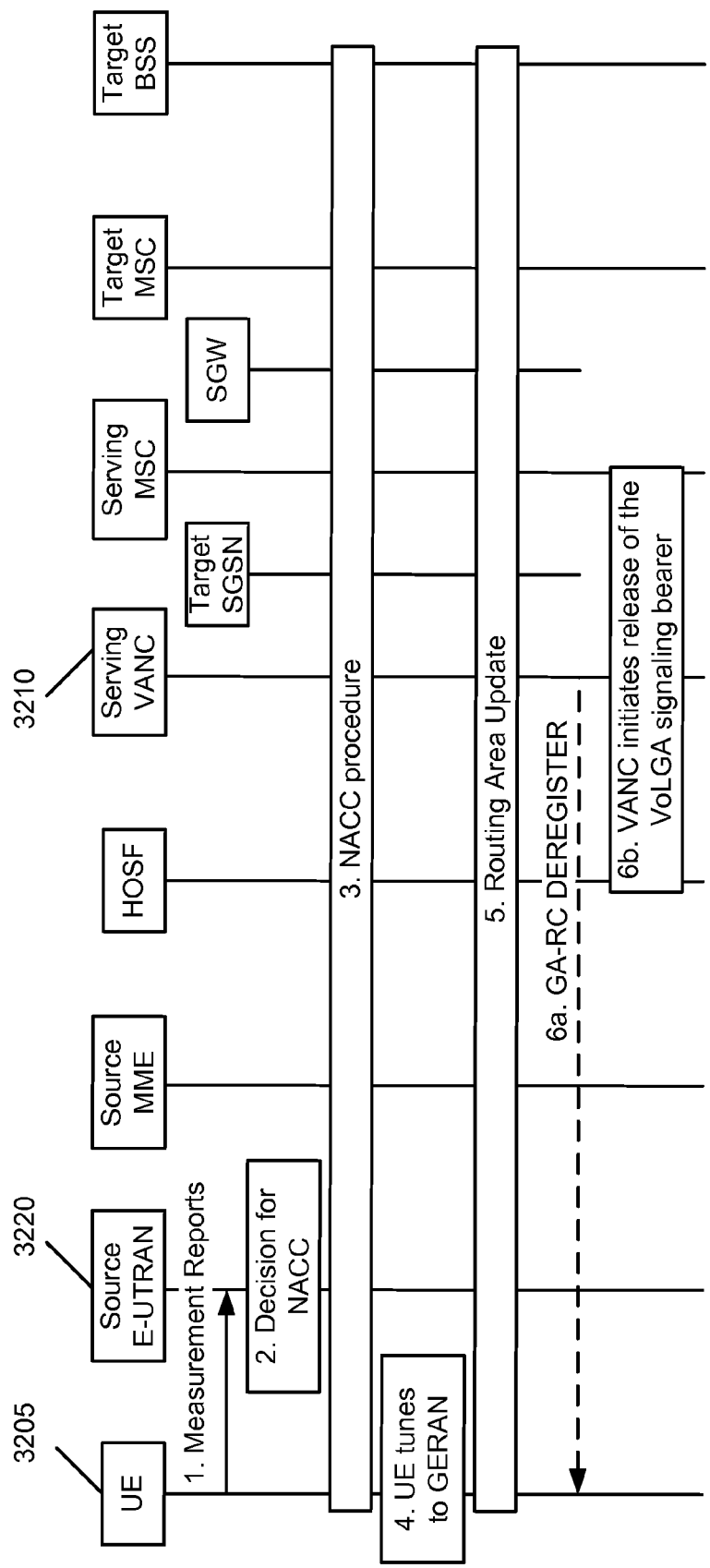
FIG. 32 illustrates a Network Assisted Cell Change (NACC) from E-UTRAN to GERAN, in some embodiments.

In order to reduce transmission times between handovers, networks have developed special cell change protocols termed network assisted cell change (NACC). FIG. 32 illustrates a Network Assisted Cell Change (NACC) from E-UTRAN to GERAN, in some embodiments. As shown, the UE 3205 sends (in step 1) measurement reports to source E-UTRAN 3220. Based on UE measurement reports the source E-UTRAN 3220 decides (in step 2) to trigger Network Assisted Cell Change (NACC) to GERAN. The NACC procedures are executed (in step 3) per 3GPP standards. The UE 3205 tunes (in step 4) to the selected GERAN cell. The UE 3205 performs (in step 5) the Routing Area Update procedure. The VANC 3210 may deregister (in step 6) the UE 3205 immediately or after some period of time. If so, the VANC 3210 sends (in step 6*a*) the GA-RC DEREGISTER message to the UE 3205 and initiates (in step 6*b*) the release of the VoLGA signaling bearer via the Rx interface to the PCRF.

2. Handover from GERAN to E-UTRAN

Figure 33:
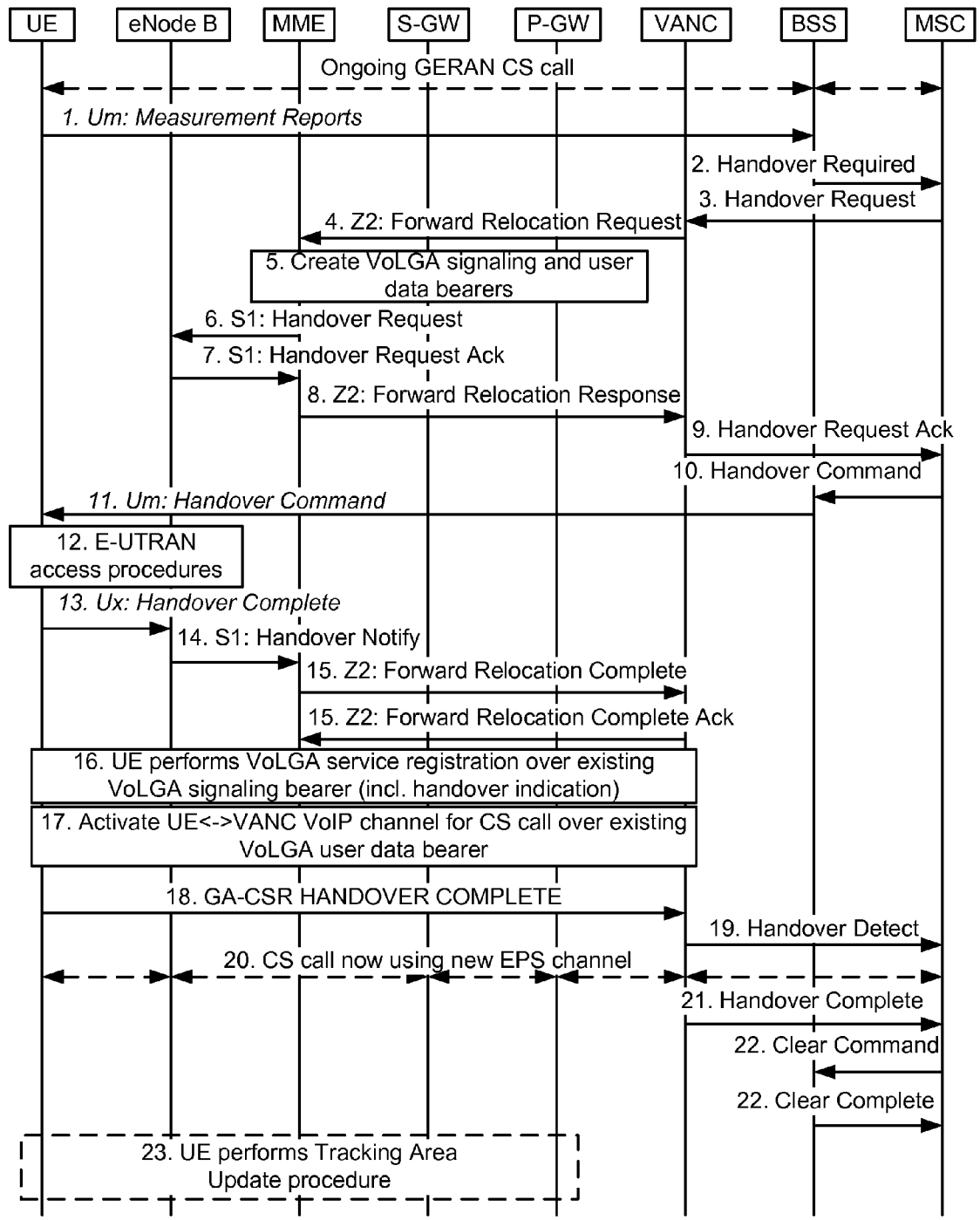
FIG. 33 illustrates a handover from GERAN to E-UTRAN procedure, in some embodiments.

FIG. 33 illustrates a handover from GERAN to E-UTRAN procedure, in some embodiments.

I. Short Message Service (A-Mode)

SMS (i.e. texting) support in VoLGA A-mode is based on the same mechanism that is utilized for GSM mobility management and call control. On the UE side, the SMS layers (including the supporting CM sub layer functions) utilize the services of the MM layer to transfer SMS messages per standard circuit switched GSM implementation. In some embodiments, the short message control protocol (SM-CP) is effectively tunneled between the UE and the MSC, using GA-CSR messages from the UE to the VANC, where the VANC relays the SM-CP to BSSAP DTAP messages for transport over the A interface.

As with GSM mobility management and call control procedures, in some embodiments, the secure IPsec tunnel and TCP session are used to provide secure and reliable SMS delivery over the IP network.

1. MO SMS

Figure 34:
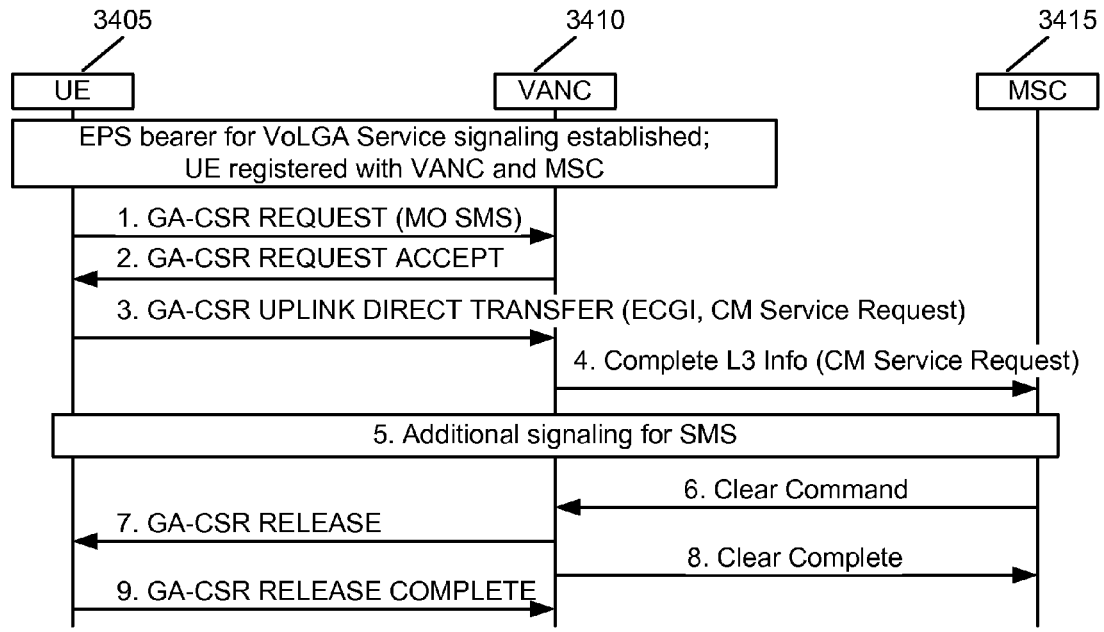
FIG. 34 illustrates a mobile-originated short message service procedure in some embodiments.

FIG. 34 illustrates a mobile-originated short message service procedure in some embodiments. It is assumed the UE 3405 is operating in E-UTRAN mode and is registered with the VANC 3410 and MSC 3415. Here, the UE 3405, VANC 3410 and MSC 3415 perform the MO SMS procedure via the EPS using the procedures specified in TS 43.318. In addition to the procedures specified in TS 43.318, the UE 3405 also includes the Evolved Cell Global Identifier (ECGI) (i.e., the identity of the serving E-UTRAN cell) in the message in step 3 and the VANC %5910 maps the ECGI value provided by the UE %5905 into a corresponding GERAN CGI value and sends this CGI value to the MSC %5915 in step 4.

2. MT SMS

Figure 35:
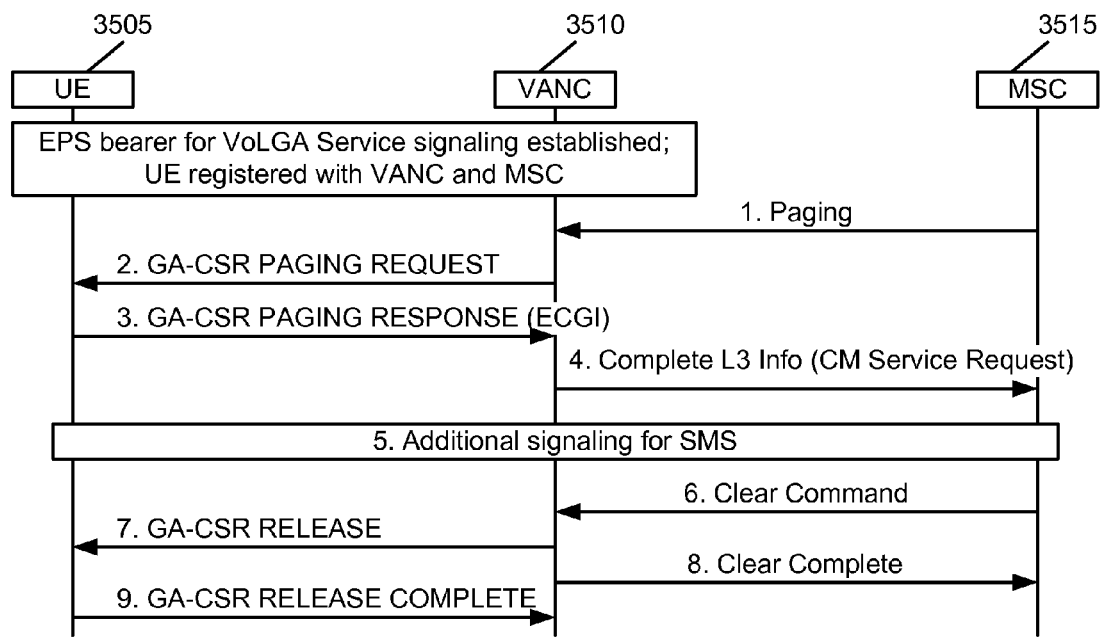
FIG. 35 illustrates a mobile-terminated short message service procedure in some embodiments.

FIG. 35 illustrates a mobile-terminated short message service procedure in some embodiments. As shown, the UE 3505, VANC 3510 and MSC 3515 perform the MT SMS procedure via the GAN using the procedures specified in TS 43.318. In addition to the procedures specified in TS 43.318, the UE 3505 also includes the Evolved Cell Global Identifier (ECGI) (i.e., the identity of the serving E-UTRAN cell) in the message in step 3 and the VANC %6010 maps the ECGI value provided by the UE %6005 into a corresponding GERAN CGI value and sends this CGI value to the MSC %6015 in step 4.

J. Supplementary Services (A-Mode)

GSM has a large number of standardized supplementary services, such as call waiting, call forwarding, etc. These supplementary services involve procedures that operate end-to-end between the UE and the MSC. In some embodiments, the NAS messages used for the supplementary service are relayed between the UE and MSC in the same manner as in the other call control and mobility management scenarios described in this specification.

K. Location Services (A-Mode)

Location Services (LCS) relate to information giving provided to clients, and includes value added services (i.e. route planning information), legal and lawful interception services (such as could be used as evidence in legal proceedings), and emergency services.

In some embodiments, the VANC uses the LCS architecture that is currently under study in the "LCS Control Plane solutions for EPS" work item (refer to TR 23.891, "Evaluation of LCS Control Plane Solutions", incorporated herein by reference, and hereinafter, TR 23.891).

In some embodiments, since the UE is registered on EPS, most location based services would be via EPS, independent of VoLGA. The exception is emergency calls made via VoLGA. In some embodiments, for emergency calls via VoLGA, the VANC acts as an LCS client (e.g., using the OMA Mobile Location Protocol) to the gateway mobile location center (GMLC), which would then initiate a user plane-based position determination.

1. Emergency Services (A-Mode)

Emergency services here relate to the requirements that networks provide specific functionality to both authorized and unauthorized users in the case of an emergency call (i.e. 911). In some embodiments, emergency services can be used in the MSC with no changes, in both HPLMN and VPLMN. SIM-less emergency calls require the support of SIM-less access to the EPS. The VANC must ensure that the MSC gets a proper Cell Global ID (CGI) for routing of the emergency call.

In some embodiments, the emergency call attachment procedures for EPS (including the SIM-less case) will be specified to enable IMS emergency calls, and these procedures can be re-used for CS Domain services over EPS. In the following it is assumed that the UE is already attached in EPS.

In some embodiments, the VANC can indicate, in the registration procedure, an Access Network preference (i.e., E-UTRAN, GERAN or UTRAN) for the placement of emergency calls. In some embodiments, the Access Network preference may include one or more Access Network types, in priority order (e.g., GERAN, UTRAN, E-UTRAN). If the Access Network preference is for GERAN or UTRAN, and if any GERAN or UTRAN coverage is available, the UE switches from VoLGA mode to GERAN/UTRAN mode and places the emergency call over GERAN/UTRAN to leverage the location determination infrastructure in GERAN/UTRAN. After the emergency call is completed, the UE may perform the normal registration procedure to re-enter VoLGA mode, if E-UTRAN coverage is still available. Alternatively, in some embodiments, there may be a timer configured to ensure that the MS remains in GERAN/UTRAN for call-back purposes. On expiry of the timer the UE may perform the normal registration procedure to re-enter VoLGA mode, if E-UTRAN coverage is still available.

VI. PROCEDURES FOR VOLGA Iu-MODE

A. Rove-In
See, "Rove-In" Section, above.
B. Rove-Out
See, "Rove-Out" Section, above.
C. VoLGA Registration Update
See, "VoLGA Registration Update" Section, above.
D. GA-RRC Connection Handling The GA-RRC connection is a logical connection between the UE and the VANC that functions similarly to the GA-CSR connection used in VoLGA A-mode (See the "GA-CSR Connection Handling" Section, above). A GA-RRC connection is established when the upper layers in the UE request the establishment of a signaling connection for the CS domain and the UE is in the GA-RRC-IDLE state; i.e., no GA-RRC connection exists. When a successful response is received from the network, GA-RRC replies to the upper layer that the UE has entered the RRC connected mode (i.e., the GA-RRC-CONNECTED state). In some embodiments, the upper layers then have the possibility to request transmission of NAS messages to the network.

In some embodiments, and in the case of a network-initiated CS session, the GA-RRC connection is implicitly established when the UE responds to the GA-RRC PAGING REQUEST message from the VANC with the GA-RRC INITIAL DIRECT TRANSFER containing the paging response. This is illustrated in the "Mobile-Terminated Call (Iu)" Section, below.

E. NAS Signaling (Iu)

Figure 36:
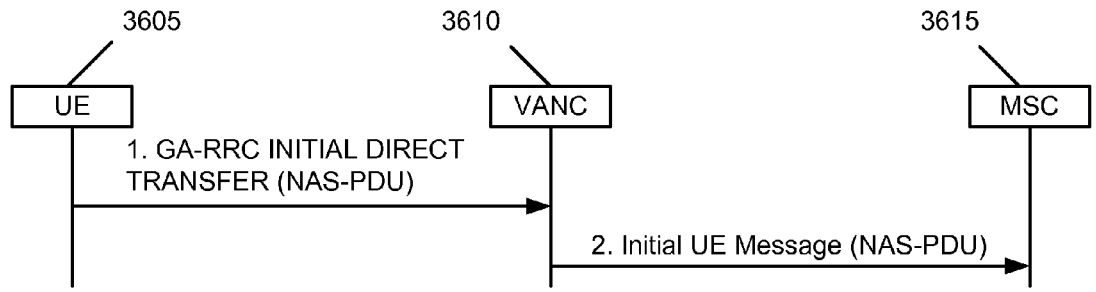
FIG. 36 illustrates the initial NAS PDU from the UE to the MSC transferred in the GA-RRC INITIAL DIRECT TRANSFER, in some embodiments.

After GA-RRC connection establishment, NAS PDUs may be transferred from MSC-to-UE and from UE-to-MSC. FIG. 36 illustrates the initial NAS PDU from the UE to the MSC transferred in the GA-RRC INITIAL DIRECT TRANSFER, in some embodiments. This scenario assumes that a GA-RRC connection already exists between the UE 3605 and VANC 3610; if not, the GA-RRC Connection Establishment procedure is performed before step 1.

As shown, the UE 3605 receives (in step 1) a request from the NAS layer to establish a signaling connection to a core network domain. In some embodiments, the request also includes a request to transfer an uplink NAS PDU. The UE 3605 encapsulates the NAS PDU within a GA-RRC INITIAL DIRECT TRANSFER message and sends the message to the VANC 3610. The UE also includes the Evolved Cell Global Identifier (ECGI) (i.e., the identity of the serving E-UTRAN cell) in the message. In some embodiments, the message includes the CN Domain identity (CS). It also includes the Intra Domain NAS Node Selector (IDNNS) to be used by the VANC 3610 to route the establishment of a signaling connection to a MSC 3615 within the indicated CN domain (i.e., using Iu Flex). In some embodiments, the VANC 3610 maps the ECGI value provided by the UE3605 into a corresponding UTRAN SAI value. The VANC 3610 establishes (in step 2) a signaling connection to the indicated MSC 3615 and relays the received NAS PDU and the SAI value to the MSC 3615 via the RANAP Initial UE message.

Figure 37:
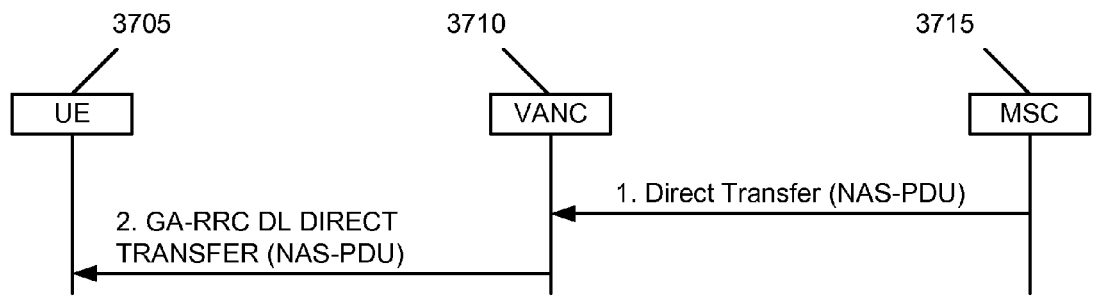
FIG. 37 illustrates subsequent NAS PDUs from the UE to the MSC transferred in the GA-RRC UPLINK DIRECT TRANSFER message, in some embodiments.

FIG. 37 illustrates subsequent NAS PDUs from the UE to the MSC transferred in the GA-RRC UPLINK DIRECT TRANSFER message, in some embodiments. Here, the UE 3705 receives (in step 1) a request from the NAS layer to transfer an uplink NAS PDU. Assuming the required signaling connection already exists, the UE 3705 encapsulates the NAS PDU within a GA-RRC UL DIRECT TRANSFER message and sends the message to the VANC 3710. In some embodiments, the message includes the CN Domain identity (CS). The VANC 3710 relays (in step 2) the received NAS PDU to the MSC 3715 via the RANAP Direct Transfer message.

Figure 38:
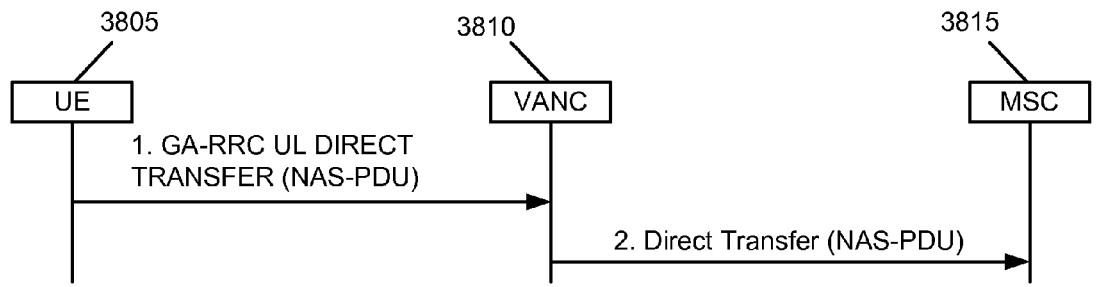
FIG. 38 illustrates NAS PDUs from the MSC to the UE transferred in the GA-RRC DOWNLINK DIRECT TRANSFER message, in some embodiments.

FIG. 38 illustrates NAS PDUs from the MSC to the UE transferred in the GA-RRC DOWNLINK DIRECT TRANSFER message, in some embodiments. As shown, for MSC-to-UE NAS signaling, the MSC 3815 sends (in step 1) a NAS PDU to the VANC 3810 via the RANAP Direct Transfer message. The VANC 3810 encapsulates (in step 2) the NAS PDU within a GA-RRC DL DIRECT TRANSFER message and forwards the message to the UE 3805 via the existing TCP connection. In some embodiments, the message includes the CN Domain identity (CS).

F. Mobile-Originated Call (Iu)

Figure 39:
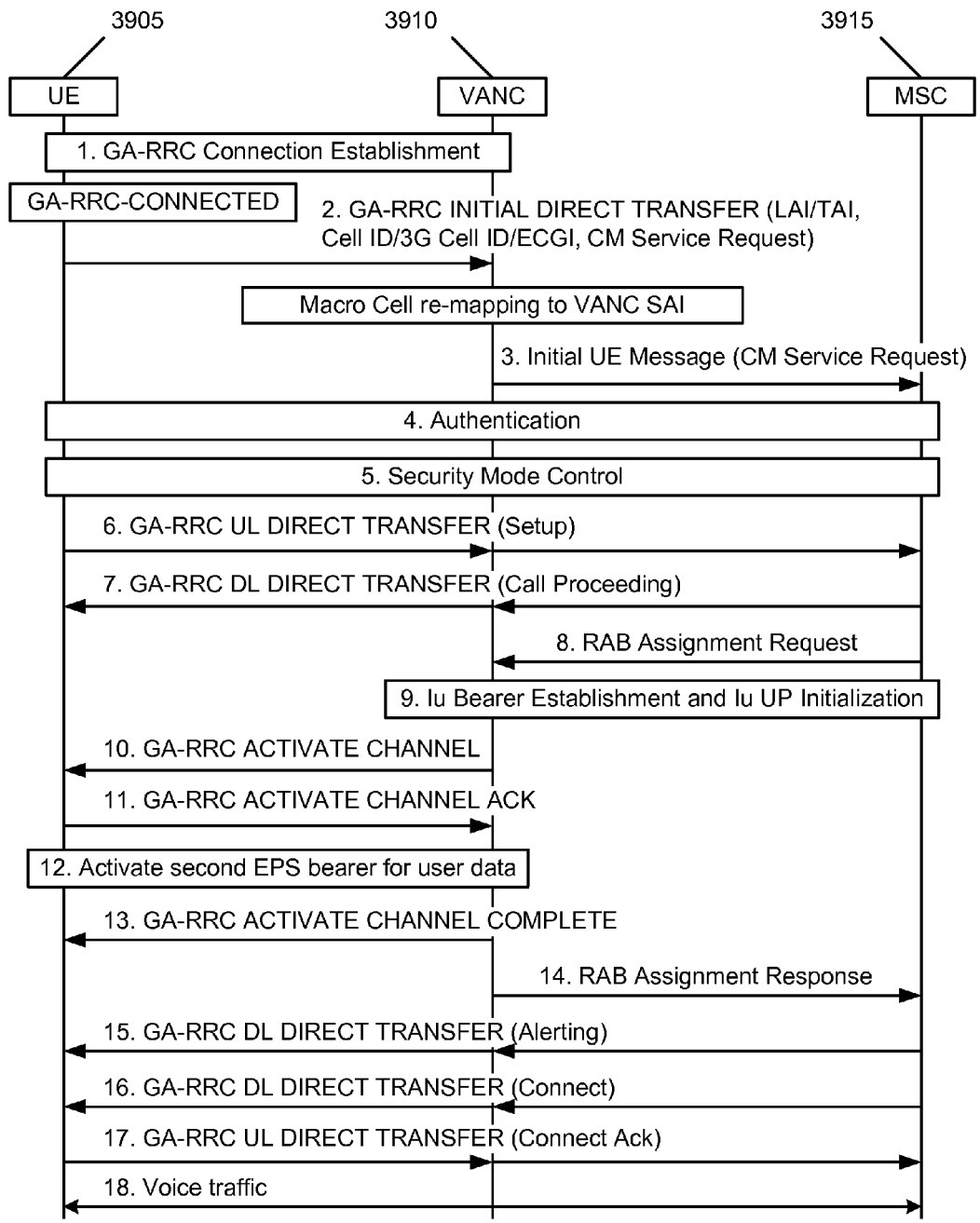
FIG. 39 illustrates the procedure for a mobile-originated call in Iu-mode, in some embodiments.

FIG. 39 illustrates the procedure for a mobile-originated call in Iu-mode, in some embodiments. The description of the procedure in this section assumes the UE 3905 is in VoLGA Iu-mode; i.e., it has successfully registered with the VANC 3910 and GA-RRC is the serving RR entity for CS services in the UE 3905. It also assumes that no GA-RRC signaling connection for the CS domain exists between the UE 3905 and VANC 3910; i.e., the CS domain GA-RRC entity in the UE 3905 is in the GA-RRC-IDLE state. If the CS domain GA-RRC entity in the UE 3905 is already in the GA-RRC-CONNECTED state, step 1 is skipped.

Here, the CS GA-RRC connection establishment procedure is performed (in step 1). The UE 3905 sends (in step 2) the CM Service Request message to the VANC 3910 within the GA-RRC INITIAL DIRECT TRANSFER message. The UE 3905 also includes the Evolved Cell Global Identifier (ECGI) (i.e., the identity of the serving E-UTRAN cell) in the message. In some embodiments, the message includes the CN Domain identity (CS).

In some embodiments, the VANC 3910 maps the ECGI value provided by the UE3905 into a corresponding UTRAN SAI value. The VANC 3910 establishes (in step 3) an SCCP connection to the MSC 3915 and forwards the SAI value and the NAS PDU (i.e., the CM Service Request message) to the MSC 3915 using the RANAP Initial UE Message. In some embodiments, the message includes the Domain Indicator set to value 'CS domain'. In some embodiments, subsequent NAS messages between the UE 3905 and MSC 3915 will be sent between the VANC 3910 and MSC 3915 using the RANAP Direct Transfer message. In some embodiments, the MSC 3915 may optionally authenticate (in step 4) the UE 3905 using standard UTRAN authentication procedures. The MSC 3915 normally initiates (in step 5) the Security Mode Control procedure.

The UE 3905 sends (in step 6) the Setup message providing details on the call to the MSC 3915 and its bearer capability and supported codecs. In some embodiments, this message is contained within the GA-RRC UL DIRECT TRANSFER between the UE 3905 and the VANC 3910. The VANC 3910 forwards the Setup message to the MSC 3915. The MSC 3915 indicates (in step 7) it has received the call setup and it will accept no additional call-establishment information using the Call Proceeding message to the VANC 3910. In some embodiments, the VANC 3910 forwards this message to the UE 3905 in the GA-RRC DL DIRECT TRANSFER message. The MSC 3915 requests (in step 8) the VANC 3910 to assign call resources using the RANAP Radio Access Bearer (RAB) Assignment Request message. In some embodiments, the MSC 3915 includes the RAB ID, the CN Transport Layer Address and the CN Iu Transport Association for user data.

The Iu bearer is established (in step 9) per standard Iu procedures. In the case of the asynchronous transfer mode (ATM)-based Iu-cs interface, this may include the exchange of access link control application part (ALCAP) signaling between the VANC 3910 and the MSC 3915 to setup the ATM virtual circuit. In some embodiments, for both ATM and IP-based Iu-cs interface types, Iu bearer establishment may also include the Iu UP initialization exchange, if Iu UP support mode is required as indicated by the MSC 3915 in the RANAP RAB Assignment Request message.

In some embodiments, the VANC 3910 sends (in step 10) the GA-RRC ACTIVATE CHANNEL message to the UE 3905 including bearer path setup information such as: CN Domain ID (i.e., indicating CS domain); RAB ID (provided by the MSC 3915 in step 8); RAB configuration (based on RAB parameters provided by the MSC 3915 in step 8); multi-rate codec configuration; UDP port and the IP address for the uplink RTP stream; and voice sample size. The UE 3905 sends (in step 11) the GA-RRC ACTIVATE CHANNEL ACK to the VANC 3910 indicating that the UE 3905 has successfully established a CS bearer channel for the call and includes the UDP port for the downlink RTP stream. The VANC 3910 initiates (in step 12) the activation of a second EPS bearer for the CS voice call using the Rx interface to the PCRF.

The VANC 3910 signals (in step 13) the completion of the RAB establishment to the UE 3905 with the GA-RRC ACTIVATE CHANNEL COMPLETE message. The VANC 3910 signals (in step 14) to the MSC 3915 that the RAB has been established by sending a RANAP RAB Assignment Response message.

The MSC 3915 signals (in step 15) to the UE 3905, with the Alerting message, that the called party is ringing. In some embodiments, the message is transferred to the VANC 3910 and the VANC 3910 forwards the message to the UE 3905 in the GA-RRC DL DIRECT TRANSFER. In some embodiments, if the UE 3905 has not connected the audio path to the user, it generates ring back to the calling party. Otherwise, the network-generated ring back will be returned to the calling party. The MSC 3915 signals (in step 16) that the called party has answered, via the Connect message. In some embodiments, the message is transferred to the VANC 3910 and the VANC 3910 forwards the message to the UE 3905 in the GA-RRC DL DIRECT TRANSFER. The UE 3905 connects the user to the audio path. In some embodiments, if the UE 3905 is generating ring back, it stops and connects the user to the audio path.

The UE 3905 sends (in step 17) the Connect Ack message in response, and the two parties are connected for the voice call. In some embodiments, this message is contained within the GA-RRC UL DIRECT TRANSFER between the UE 3905 and the VANC 3910. The VANC 3910 forwards the Connect Ack message to the MSC 3915. Bi-directional voice traffic flows (in step 18) between the UE 3905 and MSC 3915 through the VANC 3910.

G. Mobile-Terminated Call (Iu)

Figure 40:
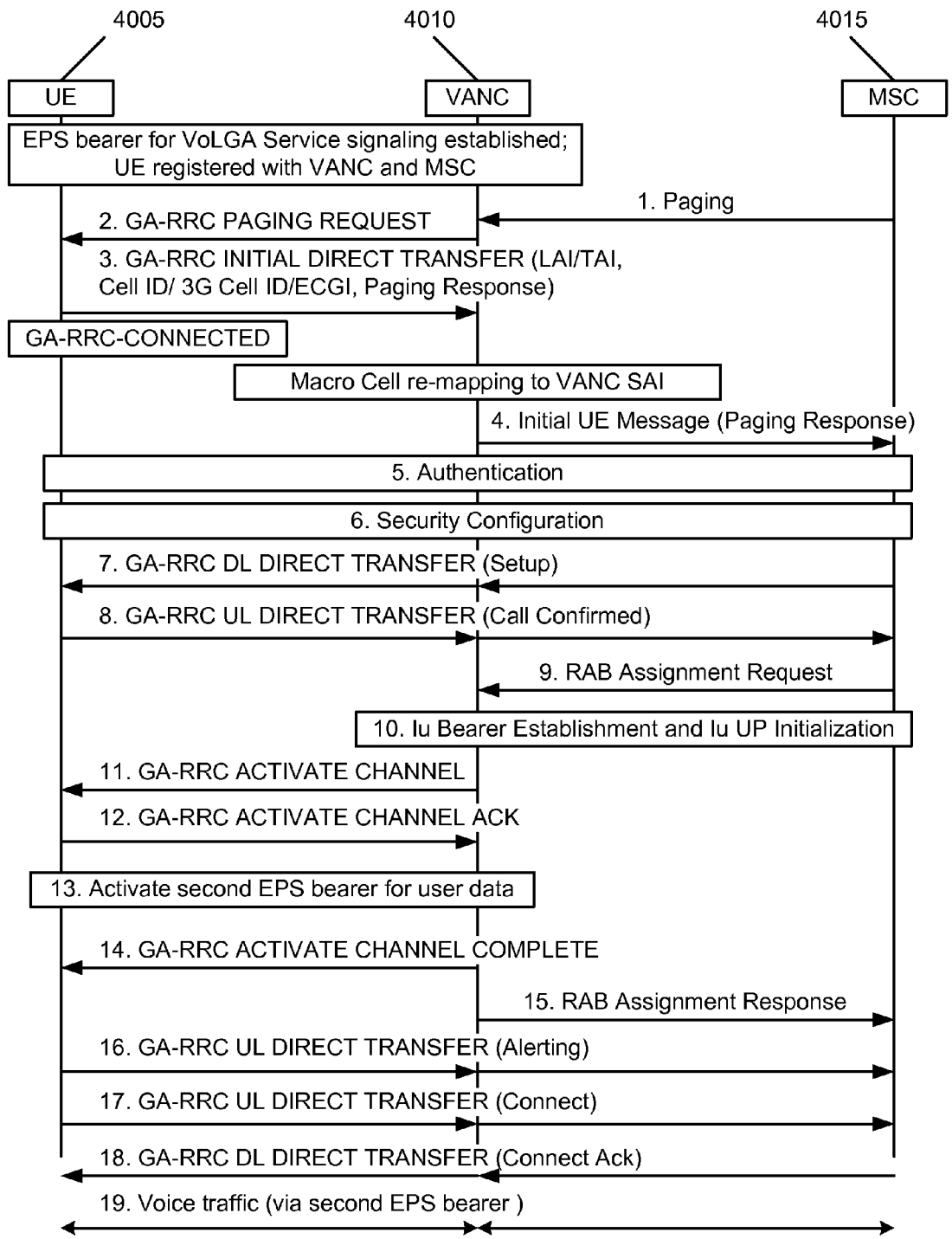
FIG. 40 illustrates the procedure for a mobile-terminated call operating in Iu-mode, in some embodiments.

FIG. 40 illustrates the procedure for a mobile-terminated call operating in Iu-mode, in some embodiments. It is assumed the UE 4005 is in VoLGA Iu-mode; i.e., it has successfully registered with the VANC 4010 and GA-RRC is the serving RR entity for CS services in the UE 4005.

As shown, a mobile-terminated call arrives at the MSC 4015. The MSC 4015 sends (in step 1) a RANAP Paging message to the VANC 4010 identified through the last Location Update received by it and includes the TMSI if available. The IMSI of the mobile being paged is always included in the request. The VANC 4010 identifies the UE registration context using the IMSI provided by the MSC 4015 and pages (in step 2) the UE 4005 using the GA-RRC PAGING REQUEST message. The message includes the TMSI, if available in the request from the MSC 4015; else it includes only the IMSI of the UE 4005. In some embodiments, the message includes the CN Domain identity (CS). In some embodiments, the message includes the identity of the current camping cell (i.e. LAI and CGI in GERAN mode or LAI and 3G Cell ID in UTRAN or TAI and ECGI in E-UTRAN mode) and, in some embodiments, the VANC 4010 maps the macro cell information value provided by the UE4005 into a corresponding SAI value. In some embodiments, the VANC 4010 is configured such that ECGI-to-SAI mapping does not result in a change in the LAI value (i.e. from the LAI value provided to the UE in the last GA-RC REGISTER ACCEPT or GA-RC REGISTER UPDATE DOWNLINK message).

The UE 4005 responds (in step 3) with a GA-RRC INITIAL DIRECT TRANSFER message containing the Paging Response message. The UE 4005 also includes the Evolved Cell Global Identifier (ECGI) (i.e., the identity of the serving E-UTRAN cell) in the message. In some embodiments, the message includes the CN Domain identity (CS). The CS domain GA-RRC entity in the UE 4005 transitions to the GA-RRC-CONNECTED state. In some embodiments, the VANC 4010 maps the ECGI value provided by the UE4005 into a corresponding UTRAN SAI value. The VANC 4010 establishes (in step 4) an SCCP connection to the MSC 4015. The VANC 4010 then forwards the SAI value and the paging response to the MSC 4015 using the RANAP Initial UE Message. In some embodiments, subsequent NAS messages between the UE 4010 and core network will be sent between the VANC 4010 and the MSC 4015 using the RANAP Direct Transfer message. In some embodiments, the MSC 4015 may optionally authenticate (in step 5) the UE 4005 using standard UTRAN authentication procedures. The MSC 4015 normally updates (in step 6) the security configuration in the UE 4005, via the VANC 4010.

The MSC 4015 initiates (in step 7) call setup using the Setup message sent to the UE 4005 via the VANC 4010. The VANC 4010 forwards this message to the UE 4005 in the GA-RRC DL DIRECT TRANSFER message. The UE 4005 responds (in step 8) with Call Confirmed using the GA-RRC UL DIRECT TRANSFER after checking it's compatibility with the bearer service requested in the Setup and modifying the bearer service as needed. In some embodiments, if the Setup included the signal information element, the UE 4005 alerts the user using the indicated signal, otherwise the UE 4005 alerts the user after the successful configuration of the user plane. The VANC 4010 forwards the Call Confirmed message to the MSC 4015.

The MSC 4015 initiates (in steps 9-15) the assignment procedure with the VANC 4010, which triggers the establishment of the second EPS bearer for the CS voice call and the setup of the RTP stream (voice bearer channel) between the VANC 4010 and the UE 4005, same as steps 8-14 in the MO call scenario described in the "Mobile-Originated Call (Iu)" Section above. In some embodiments, the UE 4005 signals (in step 16) that it is alerting the user, via the Alerting message contained in the GA-RRC UL DIRECT TRANSFER. The VANC 4010 forwards the Alerting message to the MSC 4015. The MSC 4015 sends a corresponding alerting message to the calling party.

The UE 4005 signals (in step 17) that the called party has answered, via, in some embodiments, the Connect message contained in the GA-RRC UL DIRECT TRANSFER. The VANC 4010 forwards the Connect message to the MSC 4015. The MSC 4015 sends a corresponding Connect message to the calling party and through connects the audio. The UE 4005 connects the user to the audio path. The MSC 4015 acknowledges (in step 18) via the Connect Ack message to the VANC 4010. The VANC 4010 forwards this message to the UE 4005 in the GA-RRC DL DIRECT TRANSFER. The two parties on the call are connected on the audio path. Bi-directional voice traffic flows (in step 19) between the UE 4005 and the MSC 4015 through the VANC 4010.

H. Handover (Iu)

1. Handover from E-UTRAN to UTRAN a. Handover of an Active Call

Figure 41:
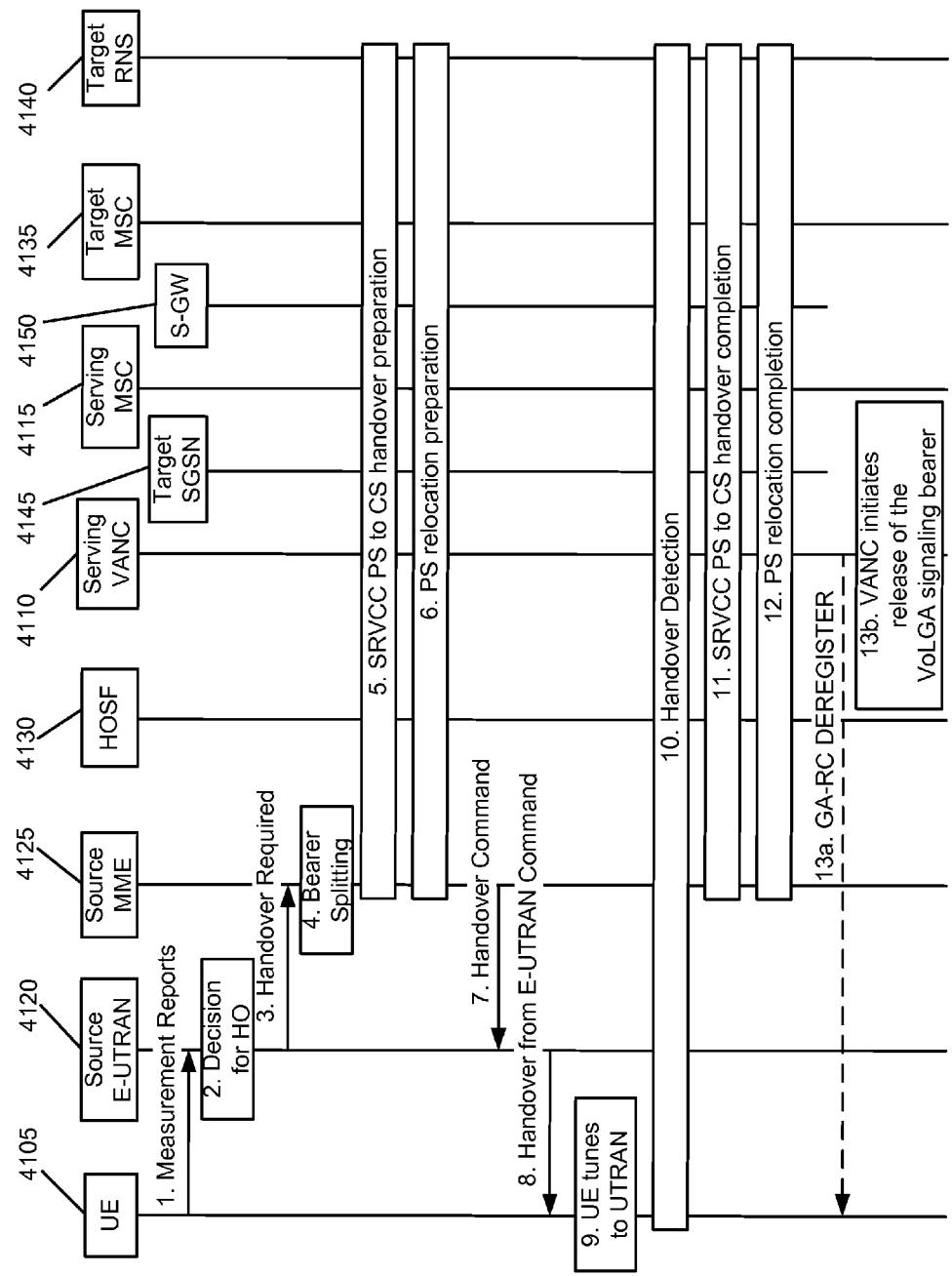
FIG. 41 illustrates a VoLGA call handover from E-UTRAN to UTRAN procedure, in some embodiments.

FIG. 41 illustrates a VoLGA call handover from E-UTRAN to UTRAN procedure, in some embodiments. This figure includes: the UE 4105; the (source) E-UTRAN 4120; the Serving VANC 4110; the Serving MSC 4115; the Source MME 4125, HOSF 4130; Target MSC 4135; Target RNS 4140; Target SGSN 4145; and S-GW 4150. It is assumed a VoLGA call is established.

As shown, the UE 4105 sends (in step 1) measurement reports to E-UTRAN 4120. Based on UE measurement reports, the source E-UTRAN 4120 decides (in step 2) to trigger an SRVCC handover to UTRAN. The source E-UTRAN 4120 sends (in step 3) a Handover Required message (in some embodiments, comprising Target ID, generic Source to Target Transparent Container) to the source MME 4125. In some embodiments, the E-UTRAN 4120 also indicates to the source MME 4125 that this is for CS and PS HO. Based on the QCI associated with the voice bearer (QCI 1) and the handover indication (e.g. number of containers and HO indication), the source MME 4125 splits (in step 4) the voice bearer from all other PS bearers and initiates their relocation towards the HOSF 4130 and SGSN 4145, respectively.

The SRVCC PS to CS handover preparation procedure is performed (in step 5), as described in steps 5-12 associated with FIG. 29 found in the "Handover of Active Call to GERAN without DTM Handover Support" Section, above, with the exception that the target MSC 4135 exchanges the Relocation Request/Request Ack messages with the target RNS 4140 in step 8. In parallel with the SRVCC PS to CS handover preparation procedure, the PS relocation preparation procedure is performed (in step 6), with the target SGSN 4145 exchanging the Relocation Request/Request Ack messages with the target RNS 4140 (versus PS Handover Request/Request Ack with the target BSS in "Handover of Active Call to GERAN with DTM Handover Support" Section, above).

The source MME 4125 synchronizes (in step 7) the two prepared relocations and sends a Handover Command (Target to Source Transparent Container) message to the source E-UTRAN 4120. The E-UTRAN 4120 sends (in step 8) a Handover from E-UTRAN Command message to the UE 4105. The UE 4105 tunes (in step 9) to the target UTRAN cell (not shown). Handover detection at the target RNS 4140 occurs (in step 10).

The SRVCC PS to CS handover completion procedure is performed (in step 11) per the standard procedures in TS 23.216. In parallel to the previous step, the PS relocation is completed (in step 12) per the standard procedures in TS 23.401.

In some embodiments, the VANC 4110 may deregister the UE immediately or after some period of time. If so, the VANC 4110 sends (in step 13a) the GA-RC DEREGISTER message to the UE 4105 and initiates (in step 13b) the release of the VoLGA signaling bearer via the Rx interface to the PCRF.

b. Handover with No Active Call (Iu)

Figure 42:
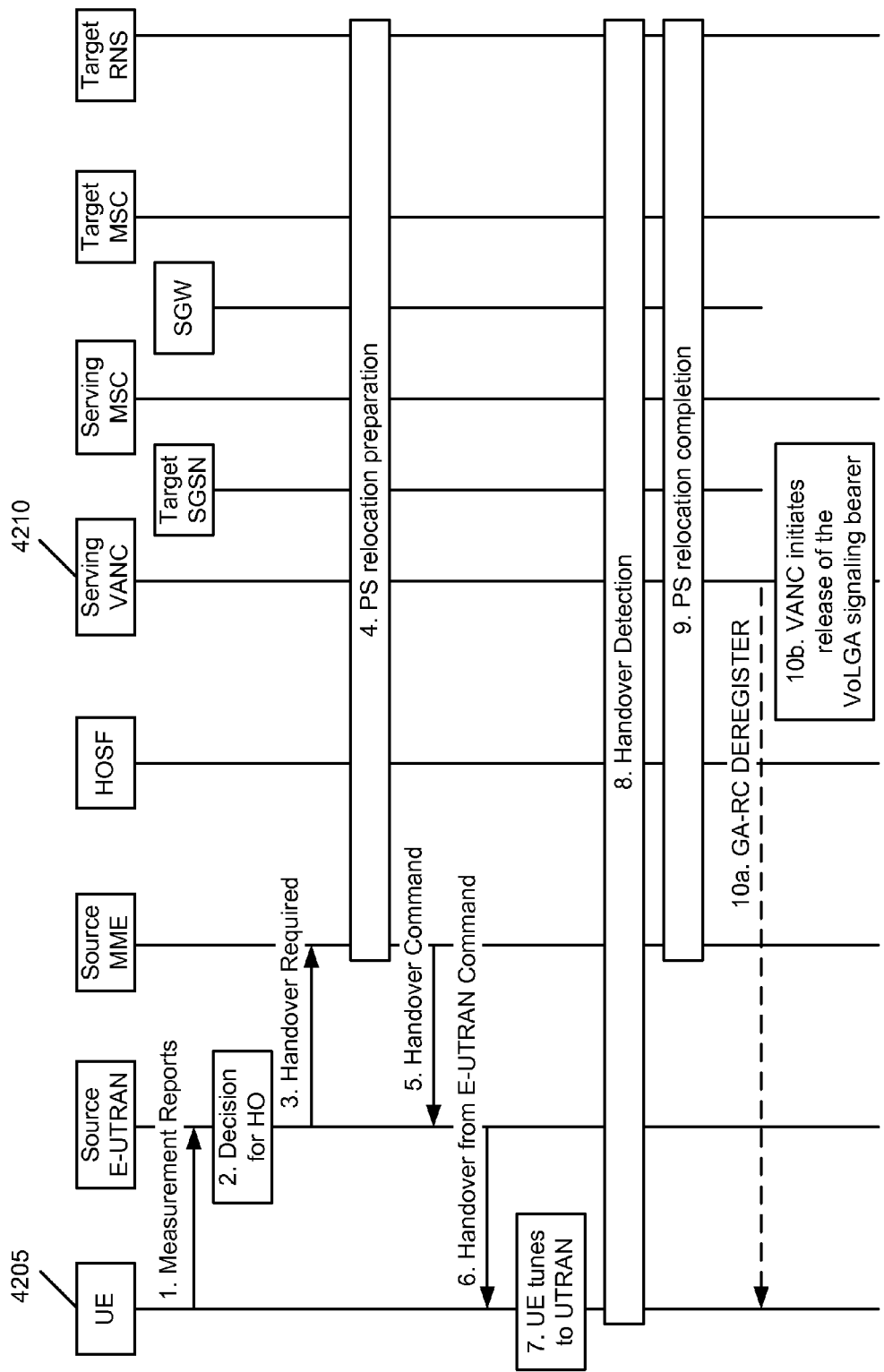
FIG. 42 illustrates the handover of the VoLGA signaling channel from E-UTRAN to UTRAN (i.e. no active call), in some embodiments.

FIG. 42 illustrates the handover of the VoLGA signaling channel from E-UTRAN to UTRAN (i.e. no active call), in some embodiments.

As shown, the active PS bearers are relocated (in steps 1-9) to UTRAN per the procedures described in TS 23.401. The VANC 4210 may deregister (in step 10) the UE 4205 immediately or after some period of time. If so, the VANC 4210 sends (in step 10a) the GA-RC DEREGISTER message to the UE 4205 and initiates (in step 10b) the release of the VoLGA signaling bearer via the Rx interface to the PCRF.

2. Handover from UTRAN to E-UTRAN

Figure 43:
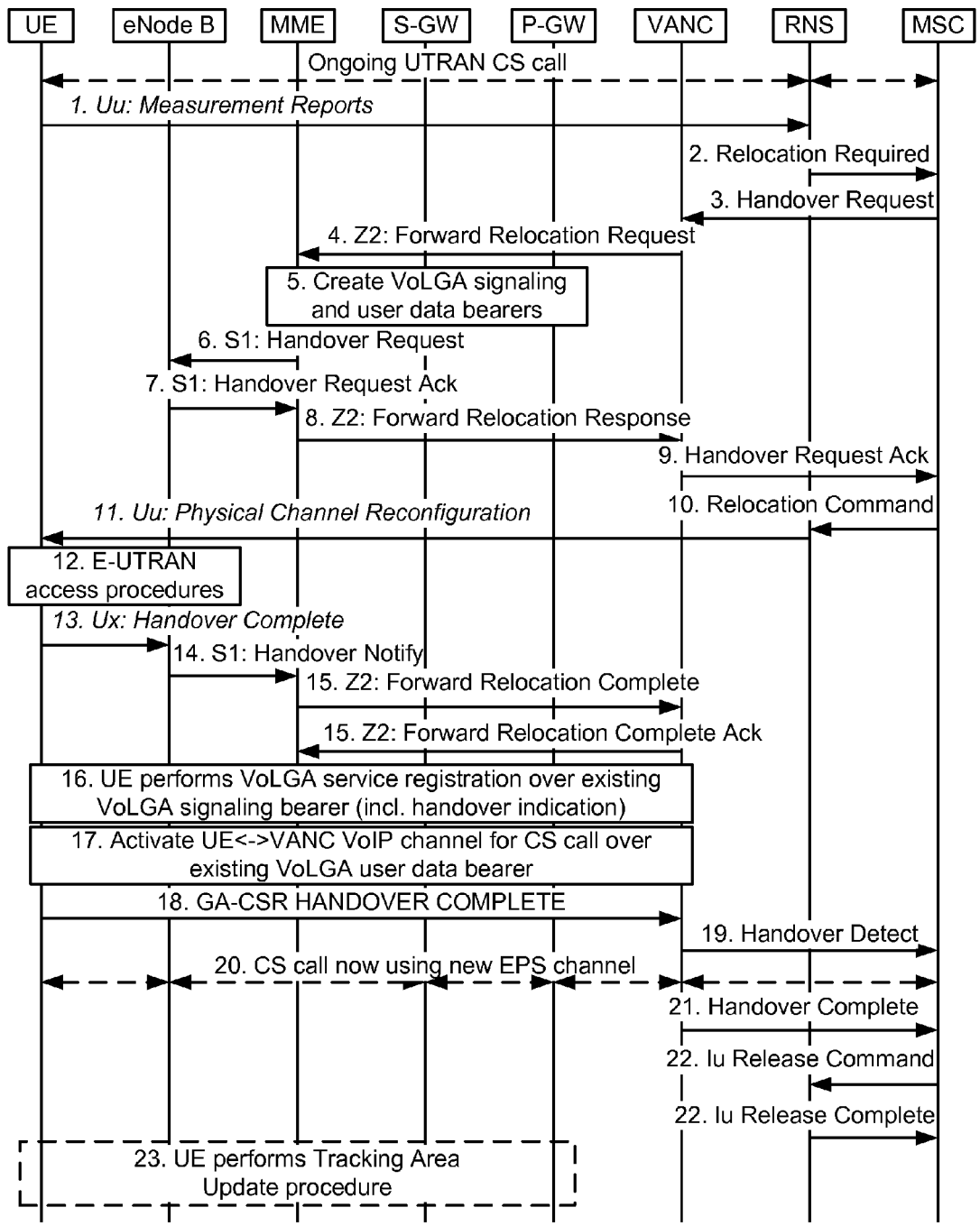
FIG. 43 illustrates a handover from UTRAN to E-UTRAN procedure, in some embodiments.

FIG. 43 illustrates a handover from UTRAN to E-UTRAN procedure, in some embodiments.

I. Short Message Service (Iu)

In some embodiments, SMS support in VoLGA Iu-mode is based on the same mechanism that is utilized for UMTS mobility management and call control. On the UE side, the SMS layers (including the supporting CM sub layer functions) utilize the services of the MM layer to transfer SMS messages per standard circuit switched UMTS implementation. In some embodiments, the SM-CP protocol is effectively tunneled between the UE and the MSC, using GA-RRC messages from the UE to the VANC, where the VANC relays the SM-CP to RANAP Direct Transfer messages for transport over the Iu-cs interface. As with UMTS mobility management and call control procedures, the secure IPsec tunnel and TCP session are used to provide secure and reliable SMS delivery over the IP network. See the "Short Message Service (A-mode)" Section above for more information.

1. MO SMS (Iu)

Figure 44:
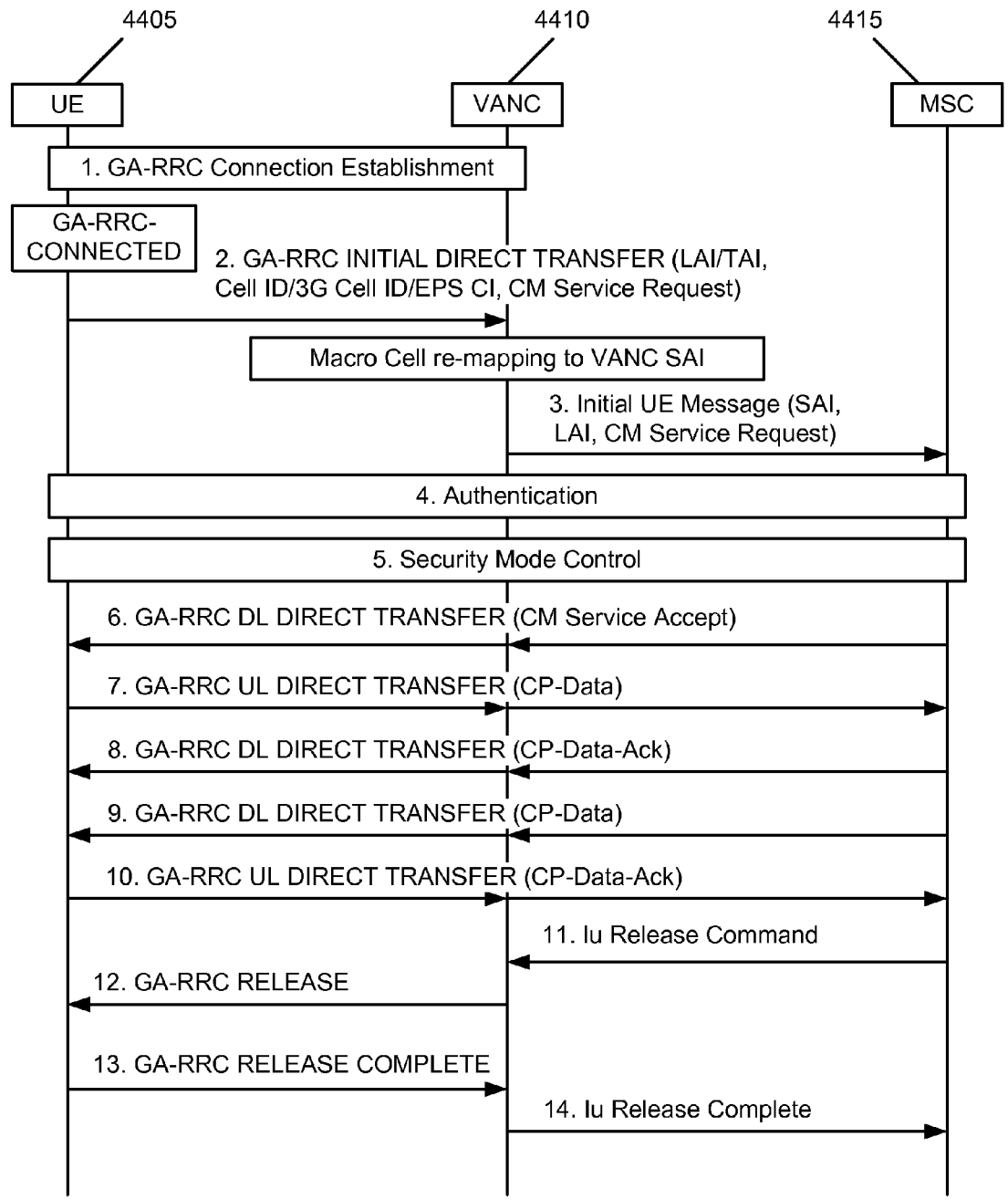
FIG. 44 illustrates a mobile-originated SMS in VoLGA Iu mode procedure, in some embodiments.

FIG. 44 illustrates a mobile-originated SMS in VoLGA Iu mode procedure, in some embodiments. The description of the procedure in this section assumes that the UE has successfully registered with the VANC and GA-RRC is the serving RR entity for CS services in the UE. It also assumes that no GA-RRC signaling connection exists between the UE and VANC; i.e., the CS domain GA-RRC entity in the UE is in the GA-RRC-IDLE state. If the CS domain GA-RRC entity in the UE is already in the GA-RRC-CONNECTED state, step 1 is skipped.

As shown, the CS GA-RRC connection establishment procedure is performed (in step 1). The UE 4405 sends (in step 2) the CM Service Request message to the VANC 4410 within the GA-RRC INITIAL DIRECT TRANSFER message. The UE also includes the Evolved Cell Global Identifier (ECGI) (i.e., the identity of the serving E-UTRAN cell) in the message. In some embodiments, the message includes the CN Domain identity (CS).

In some embodiments, the VANC 4410 maps the ECGI value provided by the UE 4405 into a corresponding UTRAN SAI value. The VANC 4410 establishes (in step 3) an SCCP connection to the MSC 4415 and forwards the SAI value and the NAS PDU (i.e., the CM Service Request message) to the MSC 4415 using the RANAP Initial UE Message. The message includes the Domain Indicator set to value 'CS domain'. In some embodiments, subsequent NAS messages between the UE 4405 and MSC 4415 will be sent between the VANC 4410 and MSC 4415 using the RANAP Direct Transfer message. The MSC 4415 may optionally authenticate (in step 4)

the UE 4405 using standard UTRAN authentication procedures and normally initiates (in step 5) the Security Mode Control procedure.

The MSC 4415 signals (in step 6) acceptance of the MO SMS request. The UE 4405 sends (in step 7) the SMS message encapsulated in a CP-DATA message to the VANC 4410, which relays it to the MSC 4415. The MSC 4415 sends (in step 8) CP-DATA-ACK to acknowledge the message. The VANC 4410 relays the acknowledgement to the UE 4405. The MSC 4415 relays (in step 9) the response received from the Interworking MSC (IWMSC) (not shown) to the VANC 4410 in the CP-DATA message. The VANC 4410 relays this to the UE 4405. The UE 4405 sends (in step 10) CP-DATA-ACK to acknowledge the message. The VANC 4410 relays the acknowledgement to the MSC 4415.

The MSC 4415 directs (in step 11) the VANC 4410 to release the resources allocated to the UE 4405, via the RANAP Iu Release Command message. The VANC 4410 commands (in step 12) the UE 4405 to release resources, using the GA-RRC RELEASE message. In some embodiments, the message includes the CN Domain Identity (CS). The UE 4405 confirms (in step 13) resource release to the VANC 4410 using the GA-RRC RELEASE COMPLETE message and the GA-RRC state of the CS domain GA-RRC entity in the UE 4405 changes to GA-RRC-IDLE. The VANC 4410 confirms in step 14) resource release to the MSC 4415 using the Iu Release Complete message.

For A/Gb mode VoLGA, the same procedure applies for GA-CSR Uplink Direct Transfer message when used for CM Service Request (SMS MO call establishment).

2. MT SMS (Iu)

Figure 45:
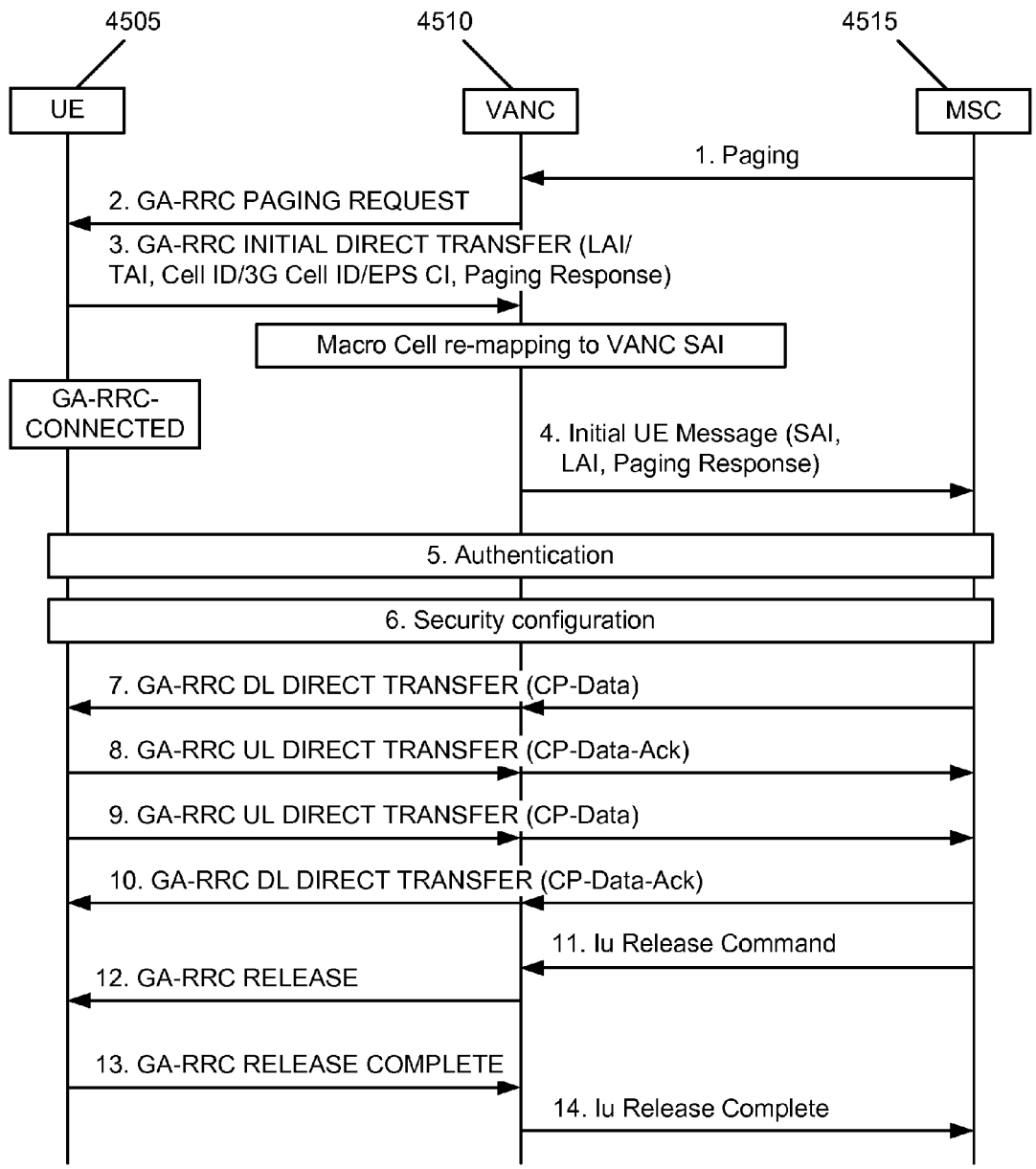
FIG. 45 illustrates a mobile-terminated SMS in VoLGA Iu mode procedure, in some embodiments.

FIG. 45 illustrates a mobile-terminated SMS in VoLGA Iu mode procedure, in some embodiments. The description of the procedure in this clause assumes that the UE has successfully registered with the VANC and GA-RRC is the serving RR entity for CS services in the UE.

As shown, a mobile-terminated SMS arrives at the MSC 4515. The MSC 4515 sends (in step 1) a RANAP Paging message to the VANC 4510 identified through the last Location Update received by it and includes the TMSI if available. The IMSI of the mobile being paged is always included in the request. The VANC 4510 identifies (in step 2) the UE registration context using the IMSI provided by the MSC 4515. It then pages the UE 4505 using the GA-RRC PAGING REQUEST message. In some embodiments, the message includes the TMSI, if available in the request from the MSC 4515; in other embodiments, it includes only the IMSI of the UE 4505. In some embodiments, the message includes the CN Domain identity (CS).

The UE 4505 responds (in step 3) with a GA-RRC INITIAL DIRECT TRANSFER message containing the Paging Response message. The UE also includes the Evolved Cell Global Identifier (ECGI) (i.e., the identity of the serving E-UTRAN cell) in the message. In some embodiments, the message includes the CN Domain identity (CS).

In some embodiments, the VANC 4510 maps the ECGI value provided by the UE 4505 into a corresponding UTRAN SAI value. The VANC 4510 establishes (in step 4) an SCCP connection to the MSC 4515. The VANC 4510 then forwards the SAI value and the paging response to the MSC 4515 using the RANAP Initial UE Message. In some embodiments, subsequent NAS messages between the UE 4505 and core network will be sent between the VANC 4510 and MSC 4515 using the RANAP Direct Transfer message. The MSC 4515 may optionally authenticate (in step 5) the UE 4505 using standard UTRAN authentication procedures and normally updates (in step 6) the security configuration in the UE 4505, via the VANC 4510.

The MSC 4515 sends (in step 7) the SMS message encapsulated in a CP-DATA message to the VANC 4510, which relays it to the UE 4505. The UE 4505 sends (in step 8) CP-DATA-ACK to acknowledge the message. The VANC 4510 relays the acknowledgement to the MSC 4515. The UE 4505 sends (in step 9) a response to the VANC 4510 in the CP-DATA message. The VANC 4510 relays this to the MSC 4515. The MSC 4515 sends (in step 10) CP-DATA-ACK to acknowledge the message. The VANC 4510 relays the acknowledgement to the UE 4505.

The MSC 4515 directs (in step 11) the VANC 4510 to release the resources allocated to the UE 4505, via the RANAP Iu Release Command message. The VANC 4510 commands (in step 12) the UE 4505 to release resources, using the GA-RRC RELEASE message. In some embodiments, the message includes the CN Domain Identity (CS). The UE 4505 confirms (in step 13) resource release to the VANC 4510 using the GA-RRC RELEASE COMPLETE message and the GA-RRC state of the CS domain GA-RRC entity in the UE 4505 changes to GA-RRC-IDLE. The VANC 4510 confirms (in step 14) resource release to the MSC 4515 using the Iu Release Complete message.

For A/Gb mode VoLGA, the same procedure applies for GA-CSR Paging Response message (SMS MT call establishment).

J. Supplementary Services (Iu)

VoLGA has a large number of standardized supplementary services. These supplementary services involve procedures that operate end-to-end between the UE and the MSC. In some embodiments, the NAS messages used for the supplementary service are relayed between the UE and MSC in the same manner as in the other call control and mobility management scenarios described in this specification.

K. Location Services (Iu)

See, "Location Services (A-mode)" Section, above, for more information.

1. Emergency Services (Iu)

See, "Emergency Services (A-mode)" Section, above, for more information.

VII. VANC SELECTION BY MME

Consider the scenario illustrated in "Handover of Active Call to GERAN without DTM Handover Support" Section, above, discussing how the MME determines the destination VANC for the PS to CS Request message in step 3.

In some embodiments, the MME selects the target SGSN based on the value of the 'Target Identifier' IE (as described in TS 23.401 Section 4.3.8.4).

However, applying this same assumption to the VANC selection assumes that there is a one-to-one relationship between Target ID (e.g., GERAN CGI) and serving VANC. However, in some embodiments, the relationship may be one-to-many for reasons of scalability and fault tolerance, for example. Also, even if one-to-one mapping of Target ID and VANC is used, the UE may have started the call on VANC-1 then moved to an area where the Target ID maps to VANC-2.

In some embodiments, the UE is directed to a particular VANC during registration based on the EPS cell information (or, more generally, on location information). However, it is not assumed there is a one-to-one relationship between EPS cell information and VANCs.

A. Alternative Embodiments

In some embodiments, the VANC sends its address to the MME. Possible approaches include:

The VANC sends it address to the MME via the PCRF/P-GW/S-GW in the request to establish the second EPS bearer (for the voice channel), assuming VANC-initiated bearer establishment (see TS 23.401 FIG. 5.4.1.1). The MME must ensure that this address is relayed to the target MME in the case of inter eNodeB handover with MME relocation.

In some embodiments, the VANC sends its address to the MME directly, as follows: (1) the UE sends its assigned GUTI (see 3GPP TS 23.003, "Numbering, Addressing, and Identification", incorporated herein by reference, and hereinafter, TS 23.003) to the serving VANC in the registration message, (2) the serving VANC extracts the serving MME ID from the GUTI and sends a message to the MME, indicating that the serving VANC is now serving the UE. The MME stores this information, (3) the MME should ensure that this address is relayed to the target MME in the case of inter eNodeB handover with MME relocation. The alternative is that the UE update the VANC when the MME is changed and a new GUTI is assigned, and then the VANC performs step 2 above with the new MME.

In some embodiments, the UE sends the VANC address to the MME in the request to establish the second EPS bearer (for the voice channel), assuming UE-initiated bearer establishment (see TS 23.401, FIG. 5.4.5.1). The MME must ensure that this address is relayed to the target MME in the case of inter eNodeB handover with MME relocation.

In some embodiments, the MME selects the VANC based on the same kind of logic that is used for SGSN selection (see TS 23.401, Section 4.3.8.4). If the selected VANC is not currently serving the UE, it is up to the VANC to forward the MME request to the serving VANC (and possibly to relay the response to the MME or allow direct response from serving VANC to MME). Possible approaches include:

In some embodiments, maintain VANC affinity information in each VANC, such that VANCs serving a particular EPS area (or Target ID area) know about VANC neighbors and can forward the MME request to neighbors. The response from the actual serving VANC and wait for a positive response.

In some embodiments, maintain a new "UE Location Register" in the VoLGA network. Selected VANC queries location register to determine serving VANC.

In some embodiments, the MME-to-VANC association is one-to-one or many-to-one and each VANC is provisioned with this MME-to-VANC mapping information. Based on this assumption, the following steps can be used to route the handover request from the MME to the correct serving VANC: (1) the UE sends its assigned GUTI to the serving VANC in the registration message (i.e., GA-RC REGISTER REQUEST and GA-RC REGISTER UPDATE UPLINK), (2) the serving VANC extracts the serving MME ID from the GUTI and determines the associated VANC based on the provisioned MME-to-VANC mapping information, (3) the serving VANC sends a message to the associated VANC, indicating that the serving VANC is now serving the UE. The associated VANC stores this information, and (4) when the associated VANC receives a request from the MME for a particular UE, it looks up the serving VANC information and forwards the MME request to the serving VANC.

Figure 46:
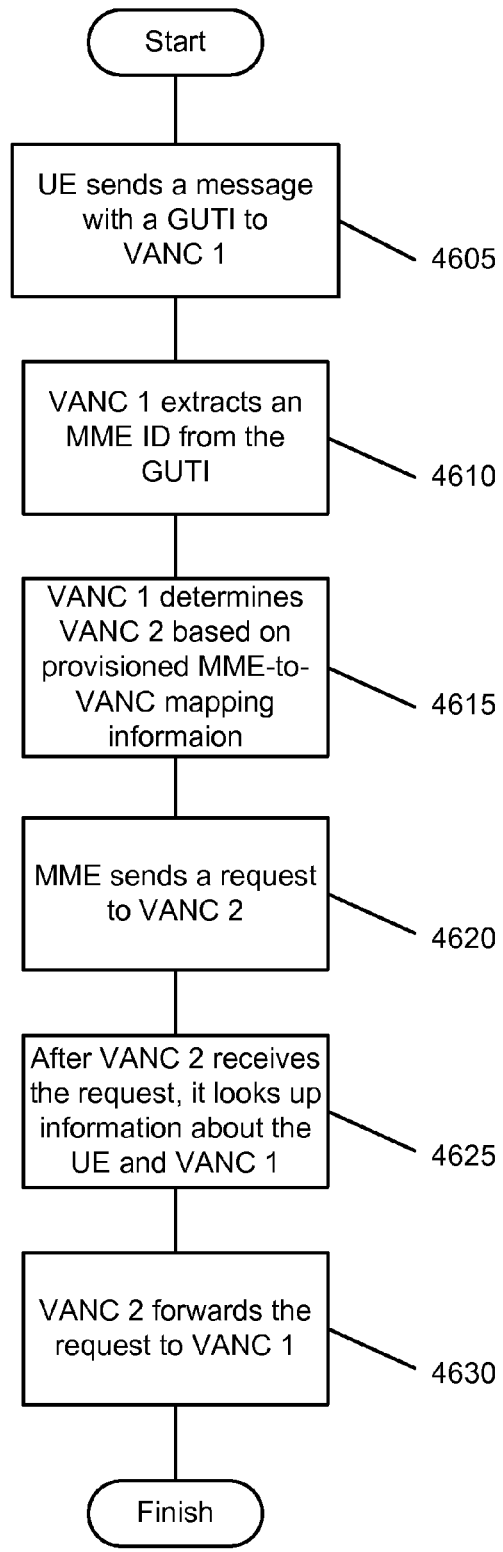
FIG. 46 illustrates a method of network controller selection in a mobility management entity, in some embodiments.

FIG. 46 illustrates the method of routing the handover request from the MME to the correct serving VANC, in some embodiments. As shown, the UE sends a message with a GUTI to a first VANC, this VANC being the serving VANC (block 4605). The first VANC extracts the MME ID from the GUTI (block 4610). From the MME ID, the first VANC determines the second VANC (the VANC that would be selected by the MME if a handover from E-UTRAN were required) based on provisioned MME-to-VANC mapping information (block 4615). The first VANC sends a message to the second VANC (i.e., the Handover Selection Function within the second VANC) indicating that the first VANC is now serving the UE. The HOSF in the second VANC stores this information. If a handover from E-UTRAN is required, the MME sends a handover request to the HOSF in the second VANC (block 4620). After the HOSF in the second VANC receives this request, it looks up information about the first VANC (block 4625) based on the received UE identity and forwards the handover request message to the first VANC (block 4630).

VIII. COMPUTER SYSTEM

Many of the above-described protocol stacks are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor (e.g., HNB and HNB-GW). Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 47:
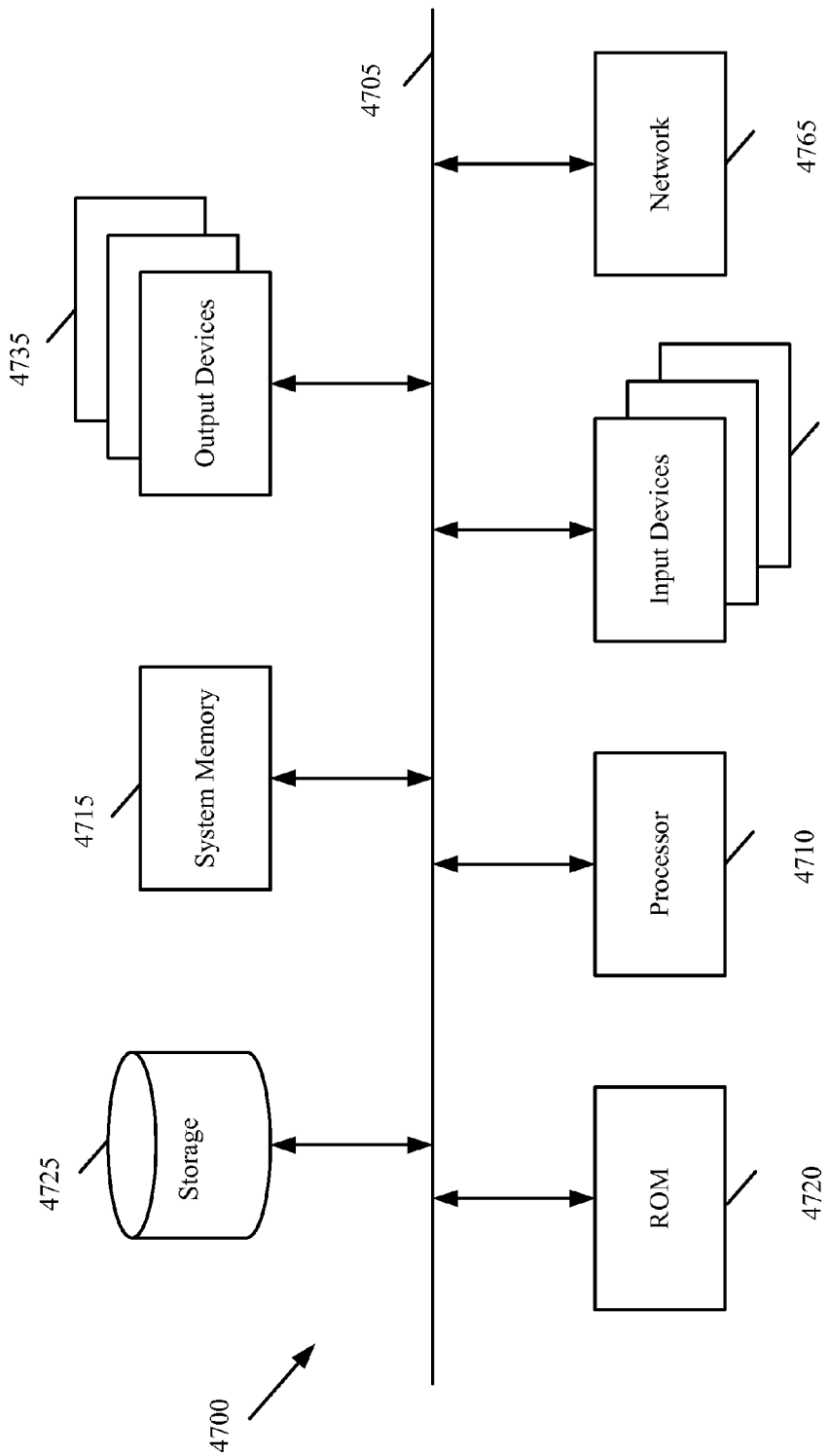
FIG. 47 conceptually illustrates a computer system with which some embodiments of the invention are implemented.

FIG. 47 conceptually illustrates a computer system with which some embodiments of the invention are implemented. The computer system 4700 includes a bus 4705, a processor 4710, a system memory 4715, a read-only memory 4720, a permanent storage device 4725, input devices 4730, and output devices 4735.

The bus 4705 collectively represents all system, peripheral, and chipset buses that support communication among internal devices of the computer system 4700. For instance, the bus 4705 communicatively connects one or more processors 4710 with the read-only memory 4720, the system memory 4715, and the permanent storage device 4725.

From these various memory units, the processor 4710 retrieves instructions to execute and data to process in order to execute the processes of the invention. In some embodiments the processor comprises a Field Programmable Gate Array (FPGA), an ASIC, or various other electronic components for executing instructions. The read-only-memory (ROM) 4720 stores static data and instructions that are needed by the processor 4710 and other modules of the computer system. The permanent storage device 4725, on the other hand, is a read-and-write memory device. This device is a non-volatile memory unit that stores instruction and data even when the computer system 4700 is off. Some embodiments of the invention use a mass-storage device (such as a magnetic or optical disk and its corresponding disk drive) as the permanent storage device 4725. Some embodiments use one or more removable storage devices (flash memory card or memory stick) as the permanent storage device.

Like the permanent storage device 4725, the system memory 4715 is a read-and-write memory device. However, unlike storage device 4725, the system memory is a volatile read-and-write memory, such as a random access memory. The system memory stores some of the instructions and data that the processor needs at runtime.

Instructions and/or data needed to perform processes of some embodiments are stored in the system memory 4715, the permanent storage device 4725, the read-only memory 4720, or any combination of the three. For example, the various memory units include instructions for processing multimedia items in accordance with some embodiments. From these various memory units, the processor 4710 retrieves instructions to execute and data to process in order to execute the processes of some embodiments.

The bus 4705 also connects to the input and output devices 4730 and 4735. The input devices enable the user to communicate information and select commands to the computer system. The input devices 4730 include alphanumeric keyboards and cursor-controllers. The output devices 4735 display images generated by the computer system. The output devices include printers and display devices, such as cathode ray tubes (CRT) or liquid crystal displays (LCD). Finally, as shown in FIG. 47, bus 4705 also couples computer 4700 to a network 4765 through a network adapter (not shown). In this manner, the computer can be a part of a network of computers (such as a local area network ("LAN"), a wide area network ("WAN"), or an Intranet) or a network of networks (such as the Internet).

Any or all of the components of computer system 4700 may be used in conjunction with the invention. For instance, some or all components of the computer system described with regards to FIG. 47 comprise some embodiments of the UE, HNB, HNB-GW, and SGSN described above. However, one of ordinary skill in the art will appreciate that any other system configuration may also be used in conjunction with the invention or components of the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter. In some embodiments, the user equipment (e.g., a cellular phone), VANC, different entities in EPS, etc. include one or more of the above described computer-readable medium, memory, or storage.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals. In some embodiments, the user equipment (e.g., a cellular phone), VANC, different entities in EPS, etc. include one or more of the above described processors.

It should be recognized by one of ordinary skill in the art that any or all of the components of computer system %4700 may be used in conjunction with the invention. For instance, some or all components of the computer system described with regards to Figure %47 comprise some embodiments of the UE, VANC, EPS and E-UTRAN described above. Moreover, one of ordinary skill in the art will appreciate that any other system configuration may also be used in conjunction with the invention or components of the invention.

IX. DEFINITIONS, ACRONYMS, AND ABBREVIATIONS

A. Definitions

The following is a list of definitions used in this document:

Terms from relevant 3GPP Technical Specifications may be used in this document. A term defined in the present document takes precedence over the definition of the same term, if any, in 3GPP TSs.

VoLGA Access Network Controller (VANC): a GAN controller (GANC) as known from 3GPP GAN that has been modified to support CS services over EPS as specified by the VoLGA forum.

VANC pool: one or more VANCs that serve the same VANC service area.

VANC service area: one or more LTE cells where the UE can be served by the same VANC. A VANC service area may or may not be aligned with EPS tracking areas.

VoLGA: short for "Voice over LTE via Generic Access"—a collective term referring to the functionality of providing CS services over EPS/LTE.

VoLGA service area: one or more LTE cells that can be served by the same MSC (pool) for VoLGA services. Note: whenever the term "MSC" is used in this document, it applies equally to MSC pools in case of A/Iu flex, and comprises MSC server+MGW in case of post-Rel-99 architecture.

VoLGA services: the collection of CS services that can be provided via VoLGA.

B. Acronyms and Abbreviations

The following is a list of abbreviations used in this document:

3GPP $3^{rd}$ Generation Partnership Project
3GPP TS $3^{rd}$ Generation Partnership Project Technical Specifications
AA Access Attempt
AAA Authentication, Authorization and Accounting
Ack Acknowledgment
ACM Address Complete Message
ADC Analog to Digital Converter
AF Application Function
AKA Authentication and Key Agreement
ALCAP Access Link Control Application Part
AMR Adaptive Multi-Rate
AP Access Point
APN Access Point Name
ARFCN Absolute Radio Frequency Channel Number
AS Access Stratum
ATM Asynchronous Transfer Mode
BSC Base Station Controller
BSS Base Station Subsystem
BSSAP Base Station Application Part
BSSGP Base Station System GPRS Protocol
BSSMAP Base Station System Management Application Part
BTS Base Transceiver Station
CBC Cell Broadcast Center
CC Call Control
CGI Cell Global Identification
CK Cipher Key
CM Connection Management
CN Core Network
CS Circuit Switched
CSoEPS Circuit Switched domain services over the EPS
CTM Cellular Text Telephone Modem
DAC Digital to Analog Converter
DHCP Dynamic Host Configuration Protocol
DL Downlink
DNS Domain Name System
DTAP Direct Transfer Application Part
DTM Dual Transfer Mode
EAP Extensible Authentication Protocol
ECGI Evolved Cell Global Identifier
ECM EPS Connection Management
EDGE Enhanced Data Rates for GSM Evolution
EMM EPS Mobility Management
eMSC Emergency Mobile Switching Center
EPC Evolved Packet Core
EPS Evolved Packet System
ETSI European Telecommunications Standards Institute
E-UTRAN Evolved UTRAN
FCC US Federal Communications Commission
FQDN Fully Qualified Domain Name
GAD Geographical Area Description
GAN Generic Access Network
GANC Generic Access Network Controller
GA-CSR Generic Access—Circuit Switched Resources
GA-PSR Generic Access—Packet Switched Resources
GA-RC Generic Access—Resource Control
GA-RRC Generic Access Radio Resource Control
GBR Global Broadband Roaming
GERAN GSM EDGE Radio Access Network
GGSN Gateway GPRS Support Node
GMLC Gateway Mobile Location Center
GMM/SM GPRS Mobility Management and Session Management
GPRS General Packet Radio Service
GSM Global System for Mobile communications
GSN GPRS Support Node
GTP-C GPRS Tunneling Protocol for Control Plane
GTP-U GPRS Tunneling Protocol for User Plane
GUTI Globally Unique Temporary Identity
GW Gateway
HC Handover Command
HLR Home Location Register
HO Handover
HOSF Handover Selection Function
HPLMN Home PLMN
HSS Home Subscriber Server
IAM Identity and Access Management
ICS IMS Centralized Services
IDNNS Intra Domain NAS Node Selector
IE Information Element
IETF Internet Engineering Task Force
IK Integrity Key
IKE Internet Key Exchange
IKEv2 IKE Version 2
IMEI International Mobile station Equipment Identity
IMEISV International Mobile station Equipment Identity and Software Version number
IMS IP Multimedia Subsystem
IMSI International Mobile Subscriber Identity
INC IP Network Controller
IP Internet Protocol
IP-CAN Internet Protocol Connectivity Access Network
IPSec Internet Protocol Security
IPSec ESP Internet Protocol Security Encapsulating Security Payload
ISUP Integrated Services Digital Network (ISDN) User Part
Kc Integrity Key
L1 Layer 1
L2 Layer 2
L3 Layer 3
LA Location Area
LAI Location Area Identity
LBS Location Based Services
LCS Location Services
LLC Logical Link Control
LTE Long Term Evolution
MAC Medium Access Control
MAC Message Authentication Code
ME Mobile Equipment
MGW Media Gateway
MM Mobility Management
MME Mobility Management Entity
MO Mobile-Originated
MS Mobile Station
MSC Mobile Switching Center
MSISDN Mobile Subscriber ISDN
MT Mobile-Terminated
MTP1 Message Transfer Part layer 1
MTP2 Message Transfer Part layer 2
MTP3 Message Transfer Part layer 3
NACC Network Assisted Cell Change
NAS Non-Access Stratum
NB Narrow Band
OA&M Operations, Administration, and Management
OMA Open Mobile Alliance
PCC Policy Control and Charging
PCM Pulse-code Modulation PCRF Policy and Charging Rules Function
PDCP Packet Data Convergence Protocol
PDN Packet Data Network
PDN-GW Packet Data Network Gateway
PDP Packet Data Protocol
PDU Protocol Data Unit
PHY Physical Layer
PLMN Public Land Mobile Network
PS Packet Switched
PSAP Public Safety Answering Point—A PSAP is an emergency services network element that is responsible for answering emergency calls
PSTN Public Switched Telephone Network
PTR RR Pointer Resource Record
P-GW PDN Gateway
P-TMSI Packet—TMSI
QCI QoS Class Identifier
QDN Qualified Domain Name
QoS Quality of Service
RA Routing Area
RAB Radio Access Bearer
RABM RAB Management
RAC Routing Area Code
RAI Routing Area Identity
RANAP Radio Access Network Application Part
RAT Radio Access Technology
RAU Routing Area Update
RLC Radio Link Control
RNC Radio Network Controller
RNS Radio Network Subsystem
RR Resource Record
RRC Radio Resource Control
RTCP Real Time Control Protocol
RTP Real Time Protocol
S Source
SAE System Architecture Evolution
SAI Service Area Identifier
SAP Service Access Point
SCCP Signaling Connection Control Part
SCTP Stream Control Transmission Protocol
SEGW SEcurity GateWay
SGSN Serving GPRS Support Node
SIM Subscriber Identity Module
SMLC Serving Mobile Location Center
SM Session Management
SMS Short Message Service
SM-CP Short Message Control Protocol
SNDCP Sub-Network Dependent Convergence Protocol
SRVCC Single-Radio Voice Call Continuity
SS Supplementary Services
STN-SR Session Transfer Number for SRVCC
SUPL User Plane Solution
S-GW Serving Gateway
S1AP S1 (interface between EPC and E-UTRAN) Application Part
T Target
TA Tracking Area
TAC Tracking Area Code
TAI Tracking Area Identity
TAU Tracking Area Update
TBF Temporary Block Flow
TC Transport Channel
TC Transparent Container
TCP Transmission Control Protocol
TFO Tandem Free Operation
TLS Transport Layer Security
TMSI Temporary Mobile Subscriber Identity
TrFO Transcoder Free Operation
TTY Text Telephone or TeletYpewriter
UE User Equipment
UDP User Datagram Protocol
UL Uplink
UMTS Universal Mobile Telecommunication System
UTRAN UMTS Terrestrial Radio Access Network
Up Up is the Interface between UE and GANC
VANC VoLGA Access Network Controller
VLR Visited Location Register
VoIP Voice over Internet Protocol
VoLGA Voice over LTE via Generic Access
VPLMN Visited Public Land Mobile Network
WB Wide Band What claimed is:

1. A method of associating Mobile Management Entities (MMEs) of an evolved packet system (EPS) and Voice over long term evolution (LTE) via Generic Access (VoLGA) network controllers (VANCs), the method comprising:
at a serving VANC, receiving a registration message from a user equipment (UE), the registration message comprising an assigned Globally Unique Temporary Identity (GUTI) of the UE, the serving VANC provisioned with MME-to-VANC mapping information;
extracting an identification of a MME from the GUTI;
determining an associated VANC based on the provisioned MME-to-VANC mapping information; and
sending a message from the serving VANC to the associated VANC, the message indicating that the serving VANC is now serving the UE.

2. The method of claim 1, wherein the provisioned MME-to-VANC mapping information is related to network topology.

3. The method of claim 1, wherein the provisioned MME-to-VANC mapping information is determined by the serving VANC's ability to service a particular UE.

4. The method of claim 1, wherein the mapping information is determined by a service area of a VoLGA communication system associated with the serving VANC.

5. The method of claim 1, wherein the MME-to-VANC mapping information is one-to-one.

6. The method of claim 1, wherein the MME-to-VANC mapping information is many-to-one.

7. The method of claim 1 further comprising:
at the associated VANC, storing the indication that the serving VANC is now serving the UE;
at the associated VANC, receiving a request from the MME for a particular UE;
at the associated VANC, finding the serving VANC information associated with the particular UE; and
forwarding the MME request from the associated VANC to the serving VANC associated with the particular UE.

8. The method of claim 7, wherein said MME request is a handover request from the serving VANC.

9. The method of claim 7, wherein the provisioned MME-to-VANC mapping information is related to network topology.

10. The method of claim 7, wherein the provisioned MME-to-VANC mapping information is determined by the serving VANC's ability to service a particular UE.

11. The method of claim 7, wherein the mapping information is determined by a service area of a VoLGA communication system associated with the serving VANC.

12. The method of claim 7, wherein the MME-to-VANC mapping information is one-to-one.

13. The method of claim 7, wherein the MME-to-VANC mapping information is many-to-one.

14. A computer readable storage medium of a Voice over long term evolution (LTE) via Generic Access (VoLGA) network controller (VANC) storing a computer program for associating Mobile Management Entities (MMEs) of an evolved packet system (EPS) and VANCs, the computer program executable by at least one processor, the computer program comprising:
- a set of instructions for receiving a registration message from a user equipment (UE), the registration message comprising an assigned Globally Unique Temporary Identity (GUTI) of the UE, the VANC provisioned with MME-to-VANC mapping information;
- a set of instructions for extracting an identification of a MME from the GUTI;
- a set of instructions for determining an associated VANC based on the provisioned MME-to-VANC mapping information; and
- a set of instructions for sending a message from the VANC to the associated VANC, the message indicating that the VANC is now serving the UE.

15. The computer readable medium of claim 14, wherein the provisioned MME-to-VANC mapping information is related to network topology.

16. The computer readable medium of claim 14, wherein the provisioned MME-to-VANC mapping information is determined by the VANC's ability to service a particular UE.

17. The computer readable medium of claim 14, wherein the mapping information is determined by a service area of a VoLGA communication system associated with the VANC.

18. The computer readable medium of claim 14, wherein the MME-to-VANC mapping information is one-to-one.

19. The computer readable medium of claim 14, wherein the MME-to-VANC mapping information is many-to-one.

20. The computer readable mediume of claim 14, the computer program further comprising:
- a set of instructions for storing the indication that the VANC is now serving the UE;
- a set of instructions for receiving a request from the MME for the UE;
- a set of instructions for finding the VANC information associated with the UE; and
- a set of instructions for forwarding the MME request from the VANC to another VANC associated with the UE.

21. The computer readable medium of claim 20, wherein said MME request is a handover request from the VANC.

22. The computer readable medium of claim 20, wherein the provisioned MME-to-VANC mapping information is related to network topology.

23. The computer readable medium of claim 20, wherein the provisioned MME-to-VANC mapping information is determined by the VANC's ability to service a particular UE.

24. The computer readable medium of claim 20, wherein the mapping information is determined by a service area of a VoLGA communication system associated with the VANC.

25. The computer readable medium of claim 20, wherein the MME-to-VANC mapping information is one-to-one.

26. The computer readable medium of claim 20, wherein the MME-to-VANC mapping information is many-to-one.

* * * * *